US00RE41751E

(19) United States
(12) Reissued Patent
Heishi et al.

(10) Patent Number: US RE41,751 E
(45) Date of Reissued Patent: Sep. 21, 2010

(54) INSTRUCTION CONVERTING APPARATUS USING PARALLEL EXECUTION CODE

(75) Inventors: Taketo Heishi, Osaka (JP); Tetsuya Tanaka, Kyoto (JP); Nobuo Higaki, Hyogo (JP); Shuichi Takayama, Hyogo (JP); Kensuke Odani, Kyoto (JP)

(73) Assignee: Panasonic Corporation, Osaka (JP)

(21) Appl. No.: 10/720,030

(22) Filed: Nov. 24, 2003

Related U.S. Patent Documents

Reissue of:
(64) Patent No.: 6,324,639
Issued: Nov. 27, 2001
Appl. No.: 09/280,777
Filed: Mar. 29, 1999

(30) Foreign Application Priority Data

Mar. 30, 1998 (JP) ..... 10-083368
Apr. 8, 1998 (JP) ..... 10-095647

(51) Int. Cl.
*G06F 9/30* (2006.01)

(52) U.S. Cl. ..... 712/210; 712/212; 712/213
(58) Field of Classification Search ..... 712/210, 712/213
See application file for complete search history.

(56) References Cited

U.S. PATENT DOCUMENTS 3,955,180 A * 5/1976 Hirtle ..... 703/26
4,611,281 A * 9/1986 Suko et al. ..... 714/39
4,785,393 A * 11/1988 Chu et al. ..... 712/221
4,858,105 A * 8/1989 Kuriyama et al. ..... 712/235
5,006,980 A * 4/1991 Sanders et al. ..... 712/219
5,408,625 A 4/1995 Narita et al.
5,448,746 A * 9/1995 Eickemeyer et al. ..... 712/210
5,452,461 A * 9/1995 Umekita et al. ..... 717/149
5,488,710 A * 1/1996 Sato et al. ..... 711/125
5,901,301 A 5/1999 Matsuo et al.

FOREIGN PATENT DOCUMENTS

JP 03-053325 3/1991
JP 03-147021 6/1991
JP 05-289870 11/1993
JP 09-026878 1/1997

* cited by examiner

*Primary Examiner*—Eddie P Chan
*Assistant Examiner*—William B Partridge
(74) *Attorney, Agent, or Firm*—McDermott Will & Emery LLP

(57) ABSTRACT

A processor can decode short instructions with a word length equal to one unit field and long instructions with a word length equal to two unit fields. An opcode of each kind of instruction is arranged into the first unit field assigned to the instruction. The number of instructions to be executed by the processor in parallel is s. When the ratio of short to long instructions is s-1:1, the s-1 short instructions are assigned to the first unit field to the s-1$^{th}$ unit field in the parallel execution code, and the long instruction is assigned to the s$^{th}$ unit field to the (s+k−1)$^{th}$ unit field in the same parallel execution code.

50 Claims, 29 Drawing Sheets

SUPPLYING OF INSTRUCTIONS FROM THE INSTRUCTION FETCH UNIT TO THE INSTRUCTION BUFFER

SUPPLYING OF INSTRUCTIONS FROM THE INSTRUCTION BUFFER TO THE INSTRUCTION REGISTER

ISSUING OF INSTRUCTIONS FROM THE INSTRUCTION REGISTER TO THE INSTRUCTION DECODER (IN UNITS OF PARALLEL EXECUTION CODES)

PARALLEL EXECUTION BOUNDARY INFORMATION f10
FORMAT INFORMATION f11

18 10 9 5 4 0
0 Op1 Rd Rs 18 10 9 5 4 0
0 Op1 Rd imm5

18 13 12 0
0 Op2 dsp13
21ビット

1 Op1 Rd dsp21

39 37 36 32 31 20 0
1 Op3 Rd imm32

39 31 30 20 0
1 Op1 disp31

PATTERNS FOR THE PARALLEL EXECUTION CODES

FIG. 22A
INSTRUCTION 1:ld(mem1),R0
INSTRUCTION 2:add 1,R0
INSTRUCTION 3:st R0,(mem2)
INSTRUCTION 4:mov R1,R0
INSTRUCTION 5:mov R2,R3
INSTRUCTION 6:add R3,R0
INSTRUCTION 7:st R0,(mem3)
FIG. 22B
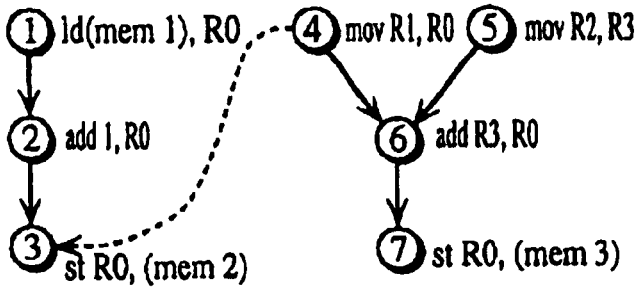
FIG. 22C
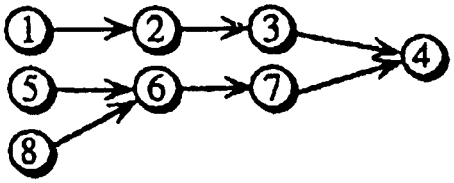
FIG. 22D
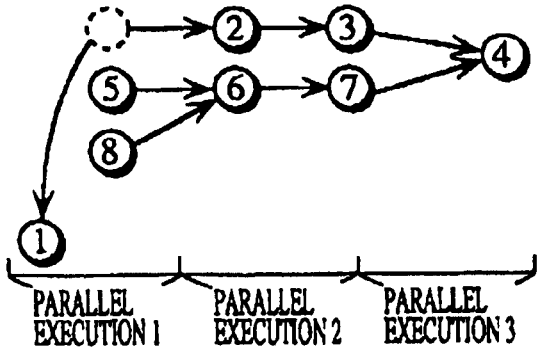
FIG. 22E
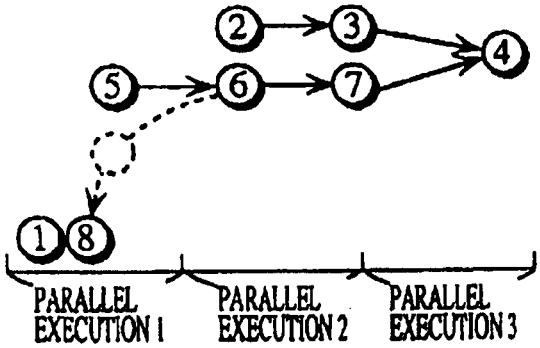
FIG. 22F
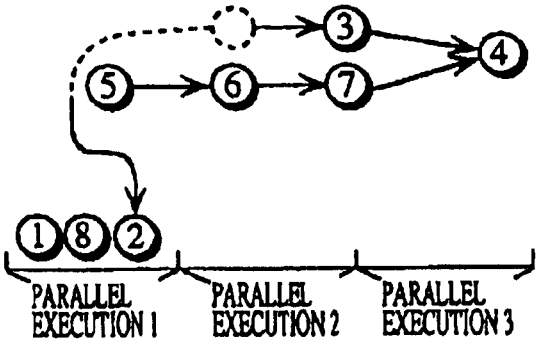

FIG. 27A
| | |
|---|---|
| INSTRUCTION 1 | mov 0x0100, R0 |
| INSTRUCTION 2 | st R0, (SP) |
| INSTRUCTION 3 | mov R1, R2 |
| INSTRUCTION 4 | mov R3, R4 |
| INSTRUCTION 5 | add R2, R4 |
FIG. 27B
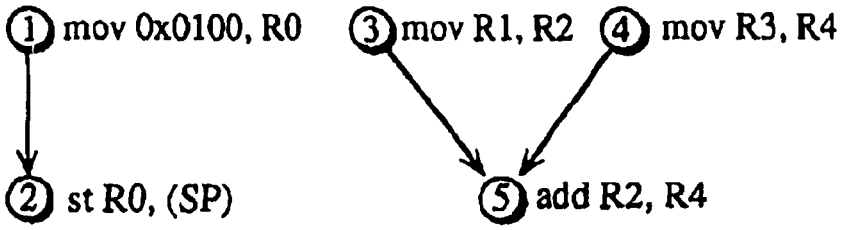
FIG. 27C
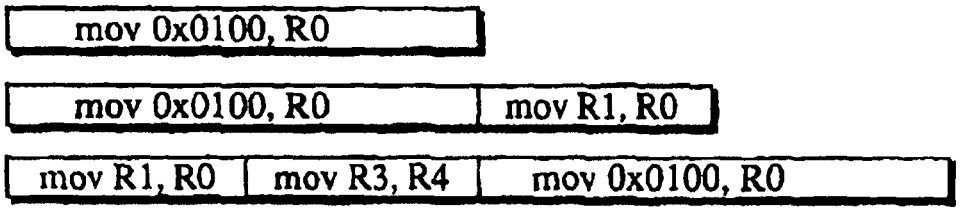
FIG. 27D
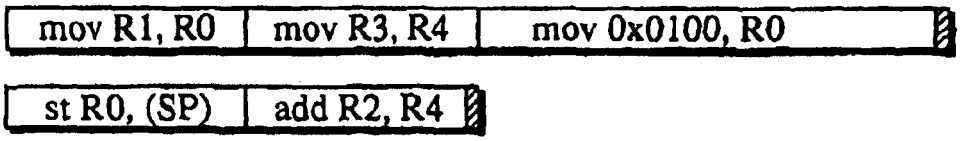
FIG. 27E
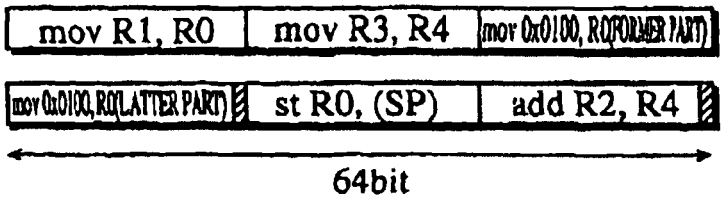

FIG. 28A
| | |
|---|---|
| INSTRUCTION 6 | ld (mem 1), R0 |
| INSTRUCTION 7 | st R0, (SP) |
| INSTRUCTION 8 | mov R1, R2 |
| INSTRUCTION 9 | mov R3, R4 |
| INSTRUCTION 10 | add R2, R4 |
FIG. 28B
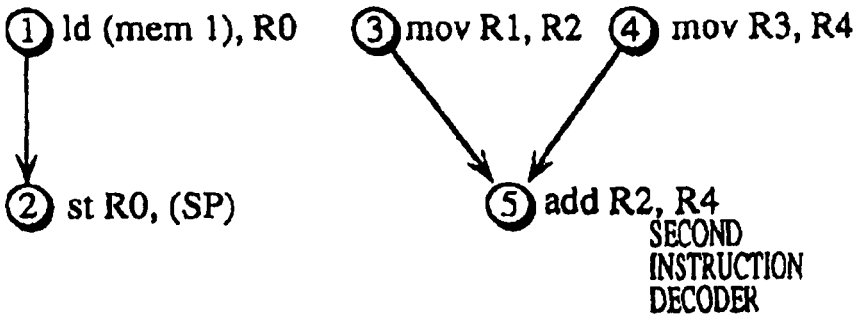
FIG. 28C
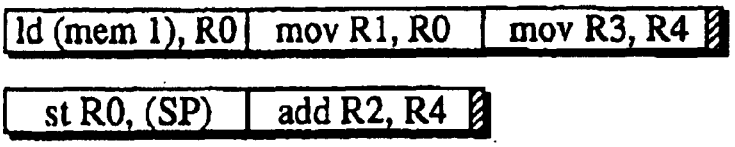
FIG. 28D
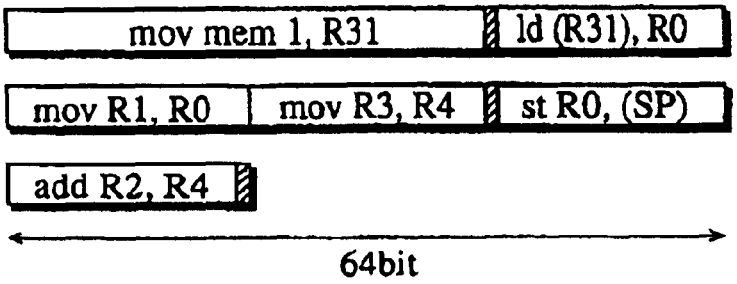

FIG. 29B EXECUTION IMAGE

FIG. 30B EXECUTION IMAGE

FIG. 31B EXECUTION IMAGE

INSTRUCTION CONVERTING APPARATUS USING PARALLEL EXECUTION CODE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an instruction conversion apparatus, a processor, a storage medium storing parallel execution codes to which a plurality of instructions have been assigned, and a computer-readable storage medium storing an instruction conversion program that generates such parallel execution codes. In particular, the invention relates to a technique for decreasing the number of execution cycles and improving code efficiency by using parallel processing.

2. Description of the Background Art

In recent years, parallel processing methods have been widely used in the development of microprocessors. Parallel processing refers to the execution of a plurality of instructions in each machine cycle. Examples of classic parallel processing techniques are superscalar methods and VLIW (Very Long Instruction Word) methods.

In superscalar methods, specialized circuitry in the processor dynamically analyzes which instructions can be executed in parallel and then has these instructions executed in parallel. These methods have an advantage in that superscalar processors can be made compatible with serial processing methods. This means that object code that has been generated by a compiler for a serial processor can be executed in its original state by a superscalar processor. A disadvantage of superscalar techniques is that specialized hardware needs to be provided in the processor to dynamically analyze the parallelism of instructions, which leads to an increase in hardware costs. Another disadvantage is that the provision of specialized hardware makes it difficult to raise the operation clock frequency.

In VLIW methods, a plurality of instructions that can be executed in parallel are arranged into an executable code of a fixed length, with the instructions in the same executable code being executed in parallel. For VLIW methods, an "executable code" is a unit of data that is fetched from memory in one cycle or is decoded and executed in one cycle.

For VLIW methods, there is no need during execution for the processor to analyze which instructions can be executed in parallel. This means that little hardware is required, and that raising the operation clock frequency is easy. However, the use of fixed-length instructions leads to the problems described below.

In VLIW executable codes, there is a significant variation in the number of bits required to define different kinds of instructions. As examples, instructions that deal with a long constant, such as an address or an immediate, require a large number of bits, while instructions that perform calculations using registers may be defined using fewer bits. As stated above, VLIW deal with executable codes of a fixed length, so that NOP codes need to be inserted into instructions that only require a low number of bits. This increases code size.

To solve this problem, a technique that fetches a fixed amount of code from memory in each cycle but decodes and executes a variable amount of code has been proposed in recent years. Hereafter, this technique will be referred to as the "fixed-supply/variable-execution method".

FIG. 1A shows the instruction supply unit used in the fixed-supply/variable-execution method. Since there is variation in the number of bits needed to define different instructions, two different formats are used. Instructions that require a large number of bits use a first format composed of two units, units 1 and 2, while instructions that only require few bits use a second format composed of one unit, unit3. Here, instructions that have a length of one unit are called "short instructions", while instructions that have a length of two units are called "long instructions".

While there are both short and long instructions, instructions are supplied three units at a time, with no attention being paid to the differences in types.

FIG. 1B shows the units (hereafter called "packets") for fetching instructions from memory in each cycle in this fixed-supply/variable-execution method. FIG. 1C, meanwhile, shows the minimum units (hereafter called "execution units") for decoding and execution by this processor.

During execution, all instructions in an area in FIG. 1B demarcated by parallel processing boundaries are executed in parallel in one cycle. This means that in each cycle instructions are executed in parallel as far as the instruction that is set the next parallel processing boundary shown in FIG. 1B using shading. Instructions that have been supplied but are not executed are accumulated in an instruction buffer and are executed in a following cycle.

In FIG. 1B, the parallel processing boundary is set at unit6, so that all units from unit1 to unit6 are set as one execution unit. Of these units, unit1~unit2, unit3~unit4, and unit5~unit6 each compose a long instruction, so that these three long instructions are executed in parallel.

The next parallel processing boundary in FIG. 1B is set at unit11, so that all units from unit7 to unit11 are executed in one execution unit. Of these units, unit7~unit8 compose a long instruction, unit9 composes a short instruction, and unit10~unit11 compose a long instruction. These three instructions are executed in parallel.

In this method, instructions are supplied using a fixed-length packet, and a suitable number of units is issued in each cycle based on information that is found through static analysis. Using this method, there is absolutely no need to insert the no operation instructions (NOP codes) that are required in conventional VLIW methods with fixed length instructions. As a result, code size can be reduced.

The following describes the hardware construction of a processor for this fixed-supply/variable-execution method.

FIG. 2 is a block diagram showing the construction of the instruction register and periphery in a processor that is capable of executing three instructions in parallel. The broken lines in FIG. 2 show the control flows. The unit queue in FIG. 2 is a sequence of units. These units are transferred to the instruction registers in the order in which they were supplied from the instruction memory (or similar).

In this construction, the instruction register A 52a and the instruction register B 52b form one pair, as do the instruction register C 52c~the instruction register D 52d and the instruction register E 52e~the instruction register F 52f. Instructions are always arranged so as to start from one of the instruction register A 52a, the instruction register C 52c, and the instruction register E 52e. Only when an instruction is formed of two linked units is part of the instruction sent to the other instruction register in a pair. As a result, when the unit transferred to the instruction register 52a is a complete instruction in itself, no unit is transferred to the instruction register B 52b.

The main characteristic of the above processor is that parallel processing can be performed for any combination of short and long instructions.

When three long instructions are to be executed in parallel, the three long instructions will be composed of three pairs unit1~unit2, unit3~unit4, and unit5~unit6 in the unit queue 50. The present processor stores the first long instruction in the pair of the instruction register A 52a~instruction register B 52b, the second long instruction in the pair of the instruction register C 52c~instruction register D 52d, and the third long instruction in the pair of the instruction register E 52e~instruction register F 52f. After being stored in this way, the three long instructions are executed by the first instruction decoder 53a~third instruction decoder 53c.

When the three instructions to be executed in parallel are the long instruction composed of unit1~unit2, the short instruction composed of unit3, and the long instruction composed of unit5~unit6, the present processor stores the first instruction in the pair of the instruction register A 52a~instruction register B 52b, the second instruction in the instruction register C 52c, and the third instruction in the pair of the instruction register E 52e~instruction register F 52f. Nothing is stored in the instruction register D 52d. After being stored in this way, the three instructions are executed by the first instruction decoder 53a~third instruction decoder 53c.

When unit1~unit2 and unit3~unit4 in the unit queue 50 compose two long instructions and unit5 composes one short instruction, the present processor stores the first instruction in the pair of the instruction register A 52a~instruction register B 52b, the second instruction in the pair of the instruction register C 52c~instruction register D 52d, and the third instruction in the instruction register E 52e. Nothing is stored in the instruction register F 52f. After being stored in this way, the three instructions are executed by the first instruction decoder 53a~third instruction decoder 53c.

As should be clear from the above description, there is no universal definition of the instruction register to which each unit is the unit queue is to be transferred. There is also no universal definition of the units in the unit queue that are to be transferred to each instruction register. For this reason, the selectors 51a~51d are provided to determine the destinations of units transferred from the unit queue. These selectors 51a~51d are controlled in the following way. First, control is performed to determine the output destination of selectors 51a and 51b, and the units to be transferred to the instruction registers C 52c~instruction register D 52d are determined. Once the units to be transferred have been determined, information regarding the length of the instruction in the unit transferred to the instruction register C 52c is examined and control is performed as shown by the broken lines in FIG. 2 to determine the output destinations of the selectors 51c and 51d.

While the above processor can decode instructions regardless of the combination of short and long instructions and regardless of how the opcodes are located in the units, the bit width of the input ports for the first-third instruction decoders 53a~53c is two units, which increases the overall hardware scale. Putting this another way, the processor is deficient in having an overly large hardware scale. The processor includes selectors that switch the output destinations of the instructions after referring to information regarding the lengths of the instructions in the units that are transferred to the instruction registers, so that the hardware construction becomes increasingly complex as the number of instruction to be executed in parallel increases.

One conventional method for reducing hardware scale is that described for the GMICRO/400 processor in the article The Approach to Multiple Instruction Execution in the GMICRO/400 Processor given in PROCEEDINGS, The Eighth TRON Project Symposium (International) 1991.

FIG. 3A is a block diagram showing the construction of the instruction register and periphery for the instruction issuing control method used by the GMICRO/400 processor. In FIG. 3A, the broken lines show the control flows. The constant operands 54a~54b are indicated by the output of the first instruction decoder 53i~the third instruction decoder 53k. Each instruction decoder decodes an inputted instruction and outputs signals to the execution control unit to control the execution of the instruction, as well as outputting the constant operands indicated in the instruction.

The instruction issuing control method of the GMICRO/400 processor decodes the combination unit1~unit2, and unit2 and unit3 separately. After the decoding of the first instruction decoder 53i has clarified whether the first instruction is a one-unit instruction or a two-unit instruction, the selector 51g is controlled so that the decoding result of only one of the second instruction decoder 53j and the third instruction decoder 53k is selected and used. As a result, the processor can execute both instructions in either the short instruction-short instruction combination or the short instruction-long instruction combination of FIG. 3B in parallel.

As shown in FIG. 3A, the GMICRO/400 decreases the number of instructions that can be executed in parallel from three to two, so that only two decoders are provided[2]. The second instruction decoder 53j and the third instruction decoder 53k also have input ports that are only one unit wide, so that hardware reductions can be made.

[2]Transistor's note: Apparent mistake in the original Japanese. Three decoders are present.

The above processor has a different problem, however, in that despite being equipped with three decoders, only two instructions can be executed in parallel, representing a marked decrease in parallelism when compared with the hardware shown in FIG. 2. The second of the two instructions that can be processed in parallel is also limited to one unit, giving rise to the further restriction of short instruction-long instruction combinations also be prohibited.

SUMMARY OF THE INVENTION

It is a primary object of the present invention to provide a processor that does not need a large hardware scale and can execute a maximum of s instructions in parallel despite being equipped with only s decoders. The invention also aims to provide an instruction conversion apparatus, a recording medium storing parallel execution codes to which a plurality of instructions have been assigned, and a computer-readable recording medium storing an instruction conversion program that generates such parallel execution codes.

This primary object can be achieved by an instruction conversion apparatus that includes an assigning unit for successively assigning instructions in an instruction sequence to parallel execution codes and a control unit for controlling the assigning unit so that a combination of a plurality of instructions that have already been assigned to a parallel execution code and an instruction that the assigning unit is about to assign to the parallel execution code satisfy predetermined limitations of a target processor.

With the above instruction conversion apparatus, a plurality of instructions are assigned to a parallel execution code in keeping with the predetermined limitations of the processor. Accordingly, the bit width and circuit constructions of the plurality of decoders that are including in the decoding unit of the processor can be simplified.

Here, when instructions to be assigned to a parallel execution code include a long instruction whose word length is equal to at least two but no more than k unit fields, the assigning unit may assign one of an opcode and an operand of the long instruction to a $u^{th}$ (where u is any integer such that $1 \leqq u \leqq s$) unit field between the $1^{st}$ unit field and the $s^{th}$ unit field, and only an operand of the long instruction to unit fields from a $(u+1)^{th}$ unit field to a $(u+k-1)^{th}$ unit field.

With the stated construction, when up to s instructions are arranged into a parallel execution code, the s or fewer opcodes included in the s or fewer instructions are arranged without fail into the start of the unit fields between the $1^{st}$ unit field and the $s^{th}$ unit field. Since the s opcodes are arranged at the start of unit fields, parallel execution of all of the opcodes included in an executable code will be possible with only s decoders.

Here, the instruction conversion apparatus may also include a grouping unit for forming an instruction group of a plurality of instructions that do not exhibit a dependency relation (hereafter "data dependency relation"), a data dependency relation being a relation between an instruction defining a resource and an instruction referring to the same resource; and a first detecting unit for detecting, when a $1^{st}$ to an $s^{th}$ unit field in a parallel execution code have been assigned at least one instruction by the assigning means and an instruction (hereafter "short instruction") with a shorter word length than a long instruction is left in the instruction group, a long instruction assigned to unit fields between the $1^{st}$ unit field and the $s^{th}$ unit field, wherein the control unit may include a first control subunit for controlling the assigning unit to rearrange instructions that have already been assigned to the parallel execution code so that the detected long instruction is assigned to unit fields between the $s^{th}$ unit field and the $(s+k-1)^{th}$ unit field and the short instruction remaining in the instruction group is assigned to a unit field between the $1^{st}$ unit field and the $(s-1)^{th}$ unit field.

With the stated construction, all of the opcodes included in a parallel execution code can be executed in parallel even when the $1^{st}$ to $s^{th}$ unit fields in a parallel execution code are occupied by a plurality of instructions and a short instruction is left.

Here, the instruction group may include instructions that exhibit an anti-dependence and instructions that exhibit an output dependence, an anti-dependence being a relation between an instruction that refers to a resource and an instruction that thereafter defines the resource, and an output dependence being a relation between an instruction that defines a resource and another instruction that defines the resource, the control unit may include a search unit for searching for a combination pattern, composed of a plurality of instructions in the instruction group, that is unaffected by an anti-dependence and an output dependence, and the control unit may control the assigning unit to rearrange the plurality of instructions in accordance with the combination pattern found by the search unit, to assign the long instruction found by the detecting means to unit fields from the $s^{th}$ unit field to the $(s+k-1)^{th}$ unit field, and to assign a short instruction left in the instruction group to a unit field between the $1^{st}$ unit field and the $(s-1)^{th}$ unit field.

When there is an instruction in an anti- or an output dependence with one of the instructions in the instruction group, such instruction may be assigned to a parallel execution code to increase the number of instructions executed in parallel. When doing so, the assigning of instructions in an order that affects the dependency is prevented beforehand.

Here, the instruction conversion apparatus may also include: an address resolving unit for assigning a real address to a parallel execution code; and a second detecting means for detecting, when a real address has been assigned to a parallel execution code, an instruction including the real address than cannot be expressed by an original word length of the instruction, a flag setting unit setting the boundary flag at a unit field located one of before and after unit fields to which the instruction detected by the second detecting unit has been assigned.

With the stated construction, processing following the assignment of instructions to parallel execution codes converts the parallel execution codes into object codes and assign real addresses. When the word length of any of the instructions needs to be increased, appropriate changes are made to the parallel execution codes in the converted object code state. As a result, there is no need to reassign the plurality of instructions to the parallel execution codes or to reconvert such parallel execution codes to object codes. Accordingly, such processing can be performed without reducing the efficiency of program development.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIGS. 22A~22F show examples of assembler codes and a dependency graph;

FIG. 27A shows example assembler codes;

FIG. 27B shows an example dependency graph that corresponds to FIG. 27A;

FIG. 27C shows the content of the parallel execution codes;

FIGS. 27D, E show the codes after the addition of parallel execution boundaries;

FIG. 28A shows example assembler codes;

FIG. 28B shows an example dependency graph that corresponds to FIG. 28A;

FIG. 28C shows the content of the parallel execution codes;

FIG. 28D shows the codes after the addition of parallel execution boundaries;

FIGS. 29A~29B respectively show an example of the executable codes in a program that has a conventional VLIW processor with a fixed instruction length of 32 bits execute the processing shown in FIG. 25 and an execution image;

FIGS. 30A~30B respectively show an example of the executable codes in a program that has a conventional processor that executes 32-bit instructions including parallel execution boundary information execute the processing shown in FIG. 25 and an execution image; and FIGS. 31A–31B respectively show an example of the executable codes in a program that has a conventional processor that executes 40-bit instruction including parallel execution boundary information execute the processing shown in FIG. 25 and an execution image.

DESCRIPTION OF THE PREFERRED EMBODIMENTS

The following describes a processor that is an embodiment of the present invention, with reference to the accompanying drawings.

Hardware Construction of the Processor

Figure 1A:
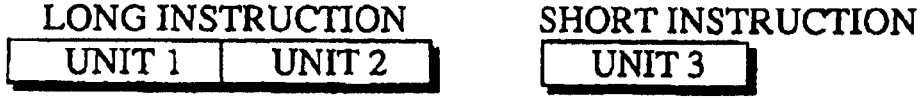
BACKGROUND ART FIG. 1A
FIG. 1A shows a format composed of two units, unit1~unit2, for instructions that require a large number of bits, and a format composed of one unit, unit3, for other instructions.
Figure 1B:
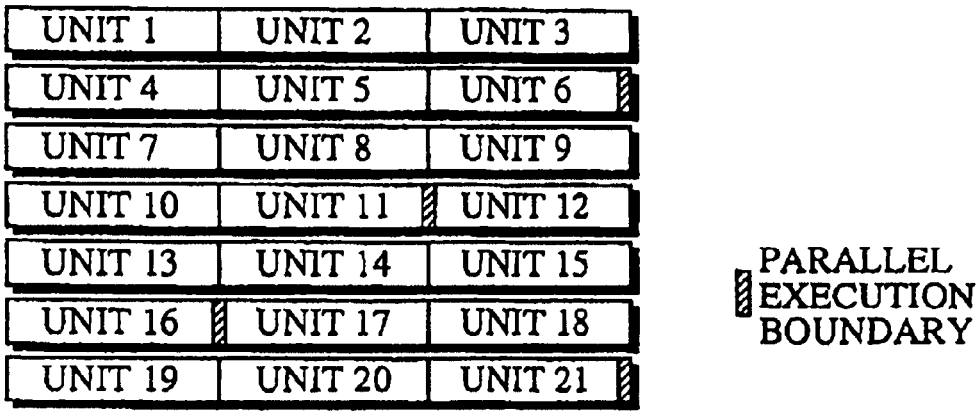
FIG. 1B shows the unit (packet) of data that is fetched from memory in one cycle in the fixed-supply/variable-execution method.
Figure 1C:
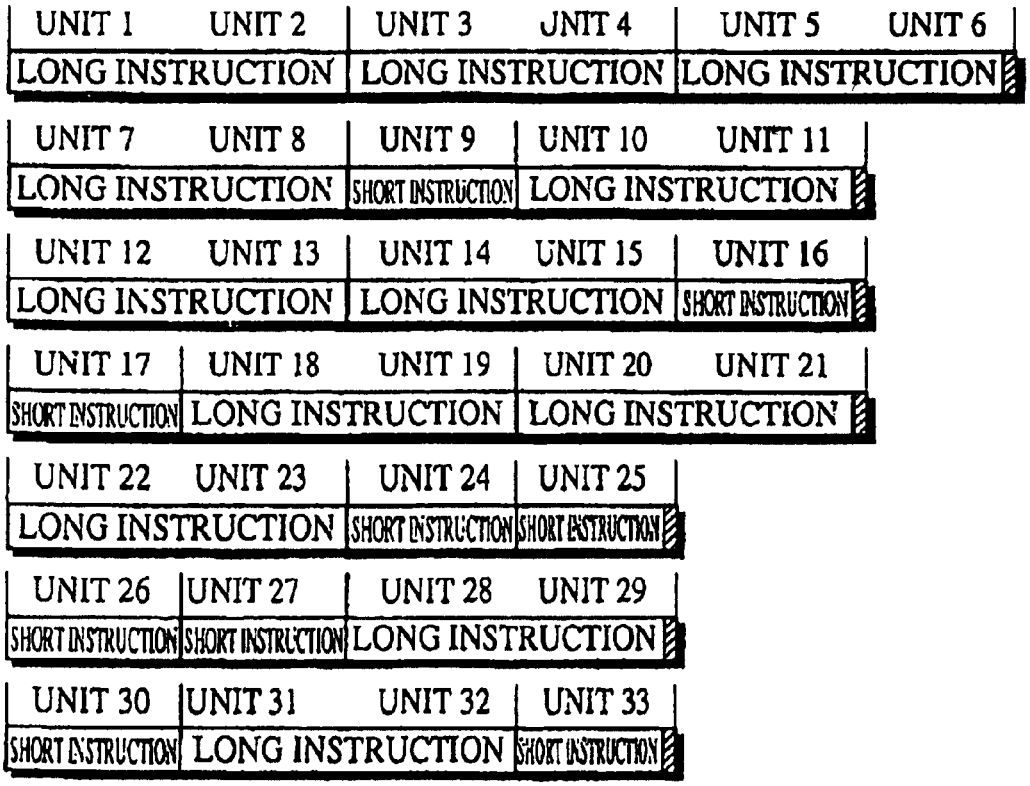
FIG. 1C is a block diagram showing the smallest units that are decoded and executed by a processor.
Figure 2:
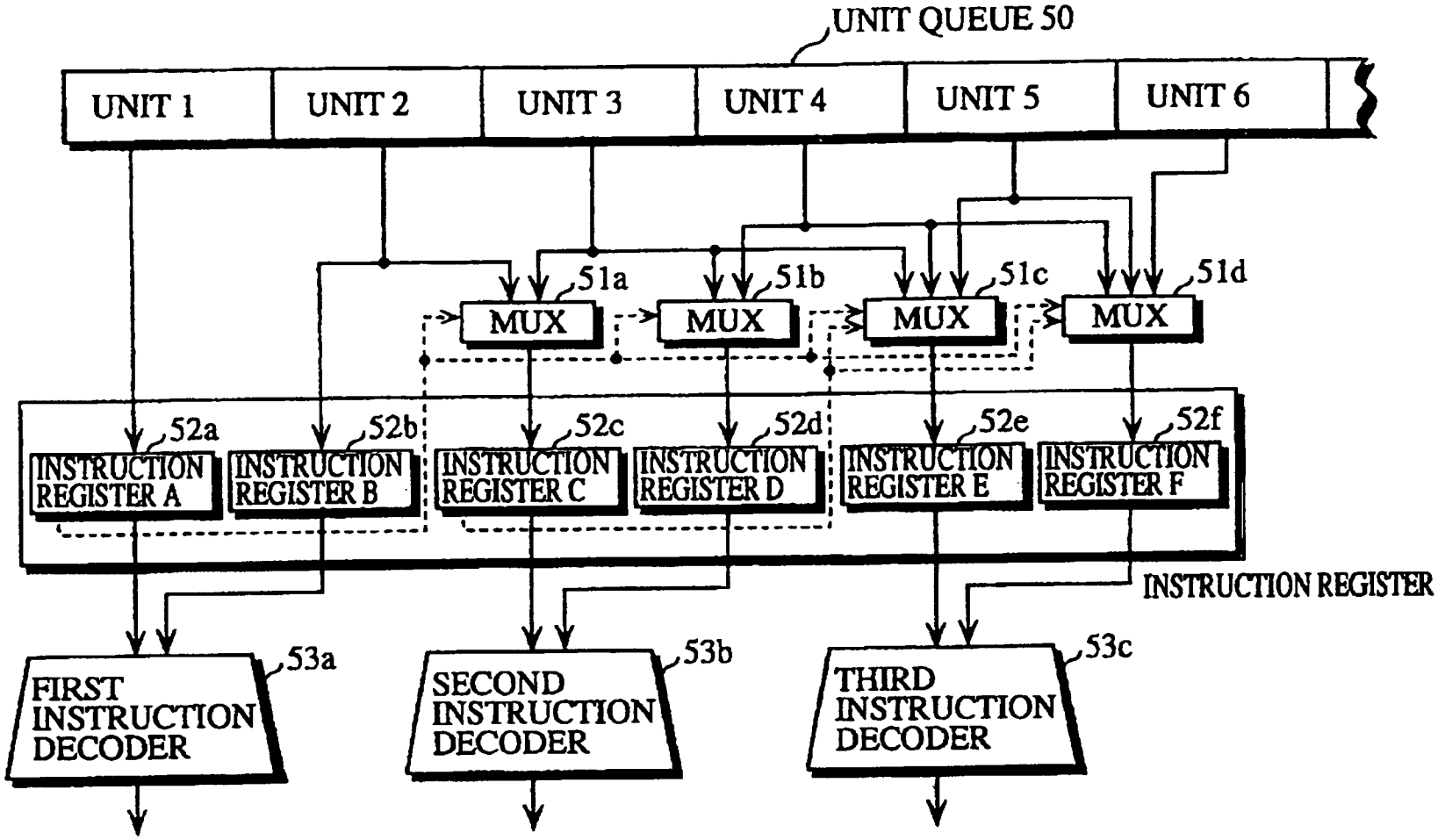
FIG. 2 BACKGROUND ART
FIG. 2 is a block diagram showing the construction of the instruction register and periphery in a processor that can execute three instructions in parallel.
Figure 3A:
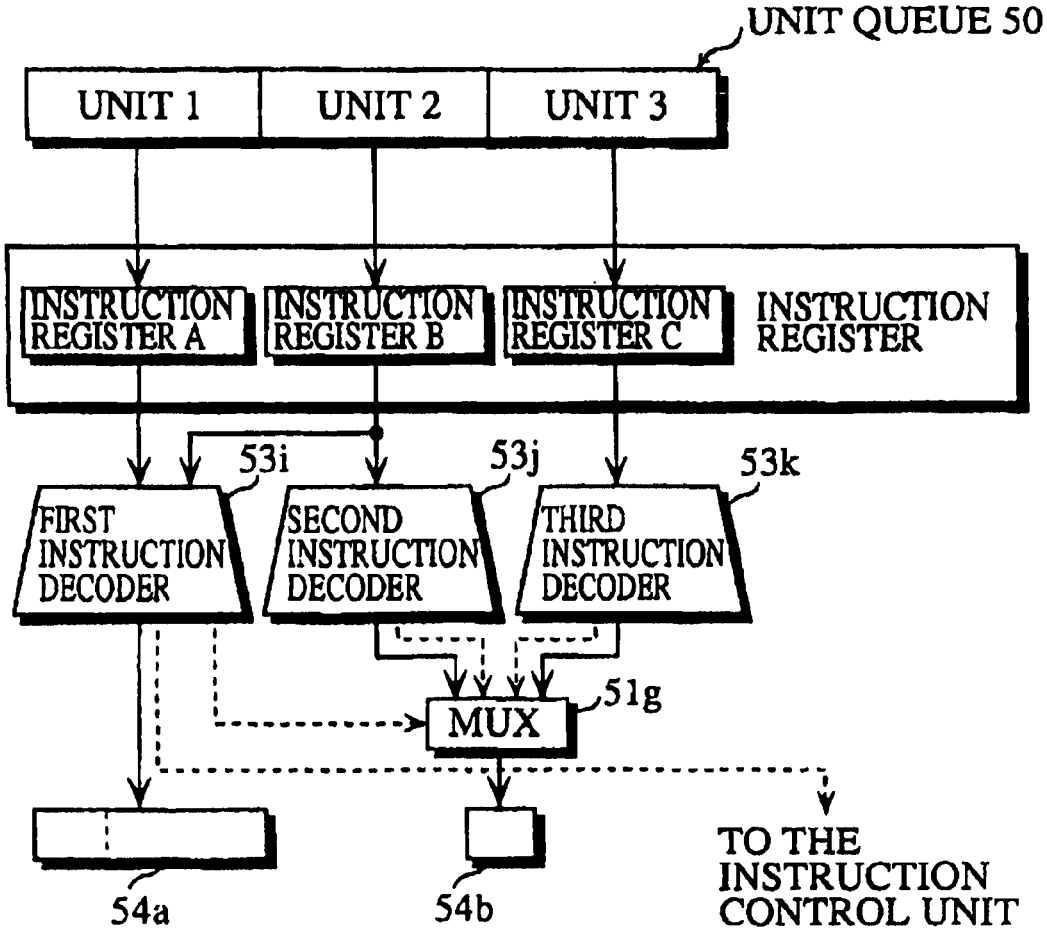
FIG. 3A BACKGROUND ART
FIG. 3A is a block diagram showing the construction of the instruction register and periphery when the instruction issuing control method used by the GMICRO/400 is used.
Figure 3B:
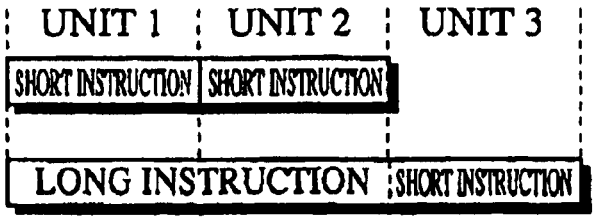
FIG. 3B BACKGROUND ART
FIG. 3B shows the combinations of instructions that can be executed in parallel by the hardware shown in FIG. 3A.
Figure 4:
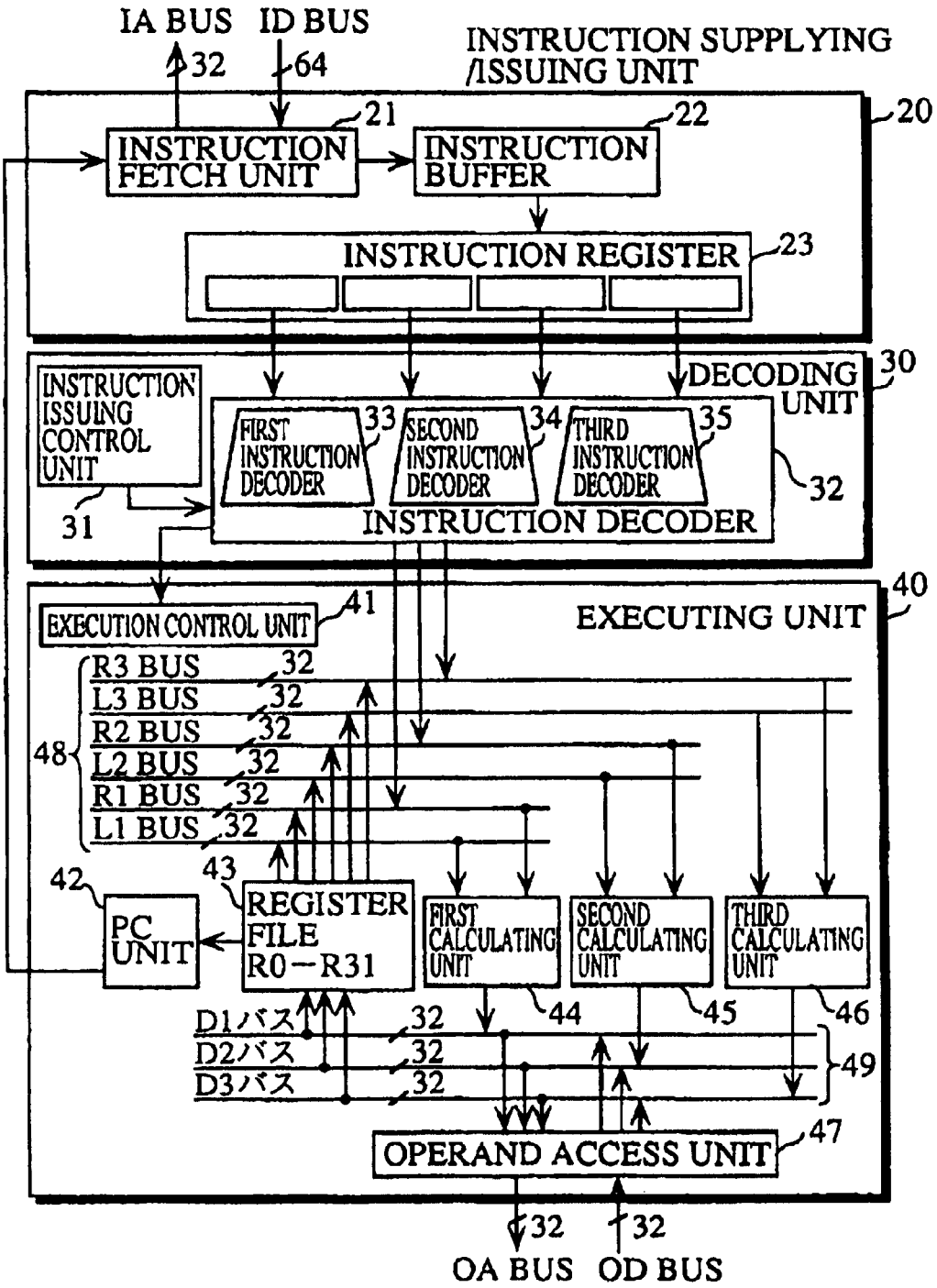
FIG. 4 is a block diagram showing the hardware construction of the processor of the first embodiment.

FIG. 4 is a block diagram showing the hardware construction of the processor of the first embodiment.

This processor executes a maximum of three instructions in parallel in one cycle. The hardware of this processor can be roughly divided into an instruction supplying/issuing unit 20, a decoding unit 30, and an executing unit 40.

The instruction supplying/issuing unit 20 supplies sets of instructions that it receives from an external memory (not illustrated) to the decoding unit 30. This instruction supplying/issuing unit 20 includes an instruction fetch unit 21, an instruction buffer 22, and an instruction register 23.

The instruction fetch unit 21 fetches instruction units (hereafter "units") from the external memory (not illustrated) via a 32-bit 1A bus (instruction address) and a 64-bit ID (instruction data) bus and stores the fetched units in an internal instruction cache. The instruction fetch unit 21 also supplies addresses outputted by the PC unit 42 to the instruction buffer 22.

Figure 5A:
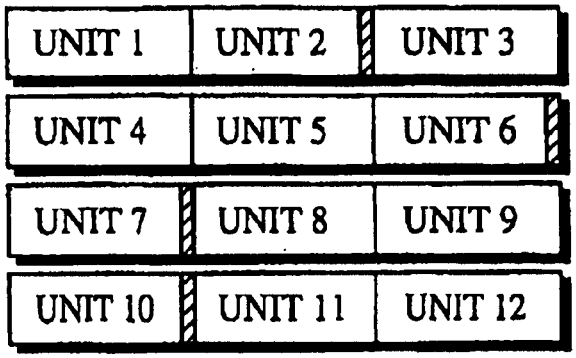
FIG. 5A shows the amounts of data used when the instruction fetch unit 21 fetches instructions into the instruction buffer 22.

FIG. 5A shows the amounts of data used when the instruction fetch unit 21 fetches instructions into the instruction buffer 22. As shown in FIG. 5A, fetching is performed in 64-bit length blocks (hereafter called "packets") including three units. The total length of three units is 63 bits, so that one bit in the 64 bits is left unused.

Figure 5B:
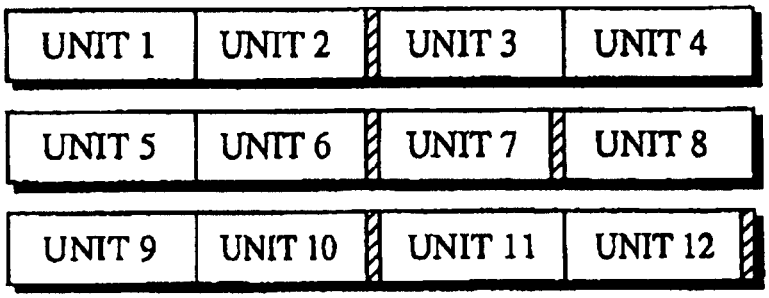
FIG. 5B shows the amounts of data used when the instruction buffer 22 outputs units to the instruction register 23.

The instruction buffer 22 has two 64-bit buffers in a two-stage construction, and accumulates the packets supplied by the instruction fetch unit 21. The instruction buffer 22 outputs four of the units stored in the two accumulated packets to the instruction register 23. FIG. 5B shows the amounts of data used when the instruction buffer 22 outputs units to the instruction register 23. In FIG. 5B, the top level shows that the instruction buffer 22 outputs the first four units unit1, unit2, unit3, and unit4 to the instruction register 23 out of the units unit1~unit6 that were supplied to three-unit packets in FIG. 5A. The second level shows that the instruction buffer 22 outputs the next four units unit5, unit6, unit7, and unit8 to the instruction register 23 out of the units unit4~unit9 that were supplied in three-unit packets in FIG. 5A.

Figure 5C:
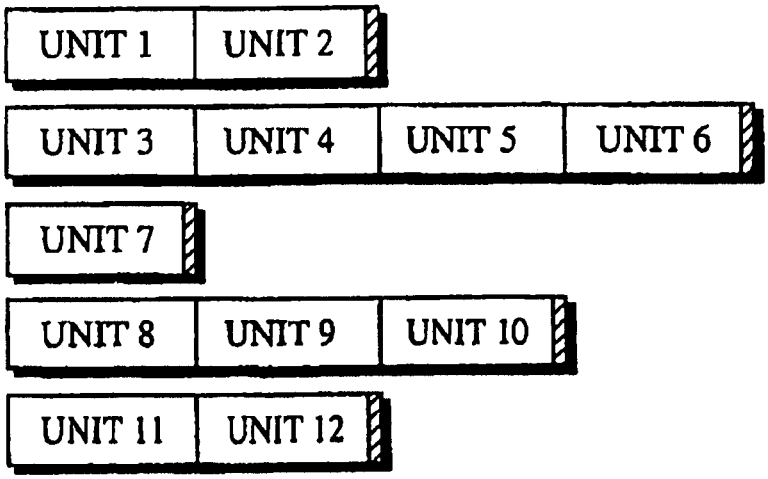
FIG. 5C shows how the instruction register 23 issues units to the decoding unit 30.

The instruction register 23 is composed of four 21-bit registers and stored the four units that are transferred from the instruction buffer 22. The instruction register 23 issues up to four of these units to the decoding unit 30. FIG. 5C shows how the instruction register 23 issues units to the decoding unit 30. The top level in FIG. 5C shows that the instruction register 23 first issues unit1 and unit2 to the decoding unit 30, while the second level shows that the instruction register 23 next issues unit3–unit6 to the decoding unit 30. The third level shows that the instruction register 23 then only issues unit7, the fourth level shows that the instruction register 23 issues unit8~unit10 and the fifth level shows that the instruction register 23 issues unit 11~unit12. As shown in FIG. 5C, the instruction register 23 issues between one and four units, out of the four units transferred from the instruction buffer 22, to the decoding unit 30.

The shaded parts of FIGS. 5A and 5B show the boundaries (parallel execution boundaries) when units are outputted from the instruction register 23 to the decoding unit 30. As can be seen from these parallel execution boundaries, the supplying of units from the instruction fetch unit 21 to the instruction buffer 22 and the transferring of units from the instruction buffer 22 to the instruction register 23 are both performed with no relation to the output units used for outputting from the instruction register 23 to the decoding unit 30.

The instruction issuing control unit 31 refers to the parallel execution boundary information and format information in the units stored in the four registers of the instruction register 23 and performs control so that two units are treated as one instruction when necessary. The instruction issuing control unit 31 also performs control so that the issuing of units is not performed beyond a parallel execution boundary.

The following first explains the construction of the instructions stored in the instruction register 23 and the storage position of the parallel execution boundary information f10 and the format information f11.

FIGS. 6A~6F show the instruction formats used by the present processor. Each instruction of the present processor is composed of a minimum of 21 bits, with there being both one-unit instructions that are 21-bit instructions and two-unit instructions that are 42-bit instructions. The length of each kind of instruction is decided by the format information f11 that is one bit long. When the format information f11 is "0", one unit forms an instruction by itself, while when the format information f11 is "1", that unit and the following unit together form one 42-bit instruction.

The MSB (most significant bit) in each instruction is the parallel execution boundary information f10. This parallel execution boundary information f10 shows whether a parallel execution boundary is present between the present instruction and the following instruction. When the parallel execution boundary information f10 is "1", a parallel execution boundary is present between this instruction and the following instruction, while when the parallel execution boundary information f10 is "0", no parallel execution boundary is present between this instruction and the following instruction. If the first to fourth units issued by the instruction register 23 are divided using the parallel execution boundary information f10 and the format information f11, these four units can be decoded as instructions in one of the patterns A–H shown in FIG. 7. However, due to the hardware construction of the decoding unit 30, the instructions of the patterns 1 and J shown in FIG. 7 cannot be executed in parallel. This means that if a 21-bit instruction is called a short instruction and a 42-bit instruction a long instruction, the following combinations of instructions cannot be executed.

| |
|---|
| short-long-long |
| long-short-short |
| long-short-long |
| long-long-short |
| long-long-long |

Figure 7:
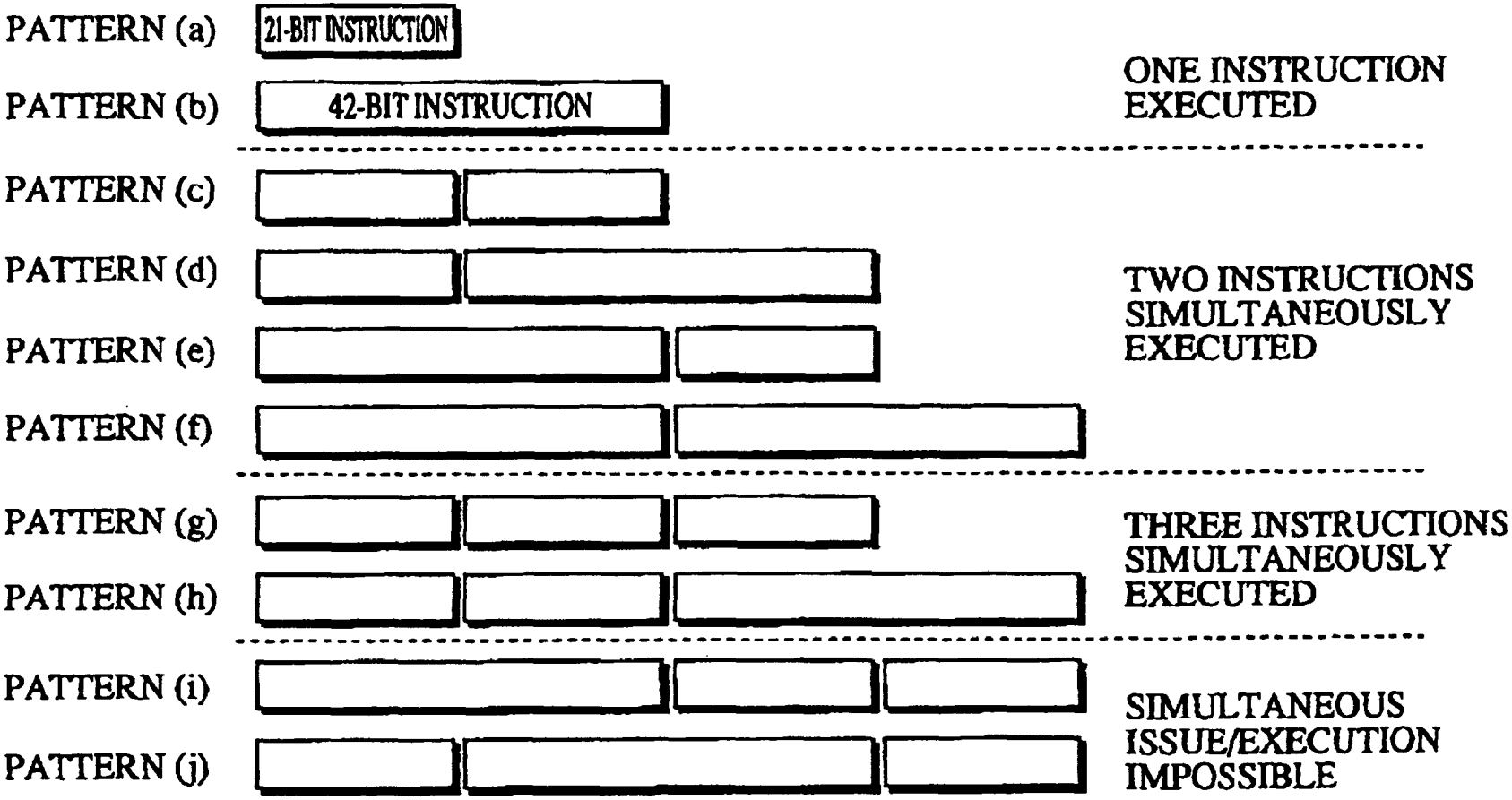
FIG. 7 shows the combinations of instructions that can be decoded by the decoding unit 30.

Also note that the instructions in the patterns A~H shown in FIG. 7 do not need to be simultaneously executed. When instructions cannot be timely supplied parallel execution codes may be divided into two or more parts that are separately executed. When doing so, the parallel-executable instructions are processed so that instructions that are closer to the MSB are executed in a first cycle and instructions that are closer to the LSB (least significant bit) are executed in a following cycle.

The operation of this instruction issuing control unit 31 is shown in more detail in other drawings.

The instruction decoder 32 includes a first instruction decoder 33, a second instruction decoder 34, and a third instruction decoder 35 which each have an input port that is 21 bits wide. These decoders fundamentally decode one 21-bit instruction in one cycle, and send control signals to the executing unit 40. These decoders also transfer the constant operands that are located in each instruction to the data bus 48 of the executing unit 40.

Figures 6A, 6B, 6C, 6D, 6E, 6F:
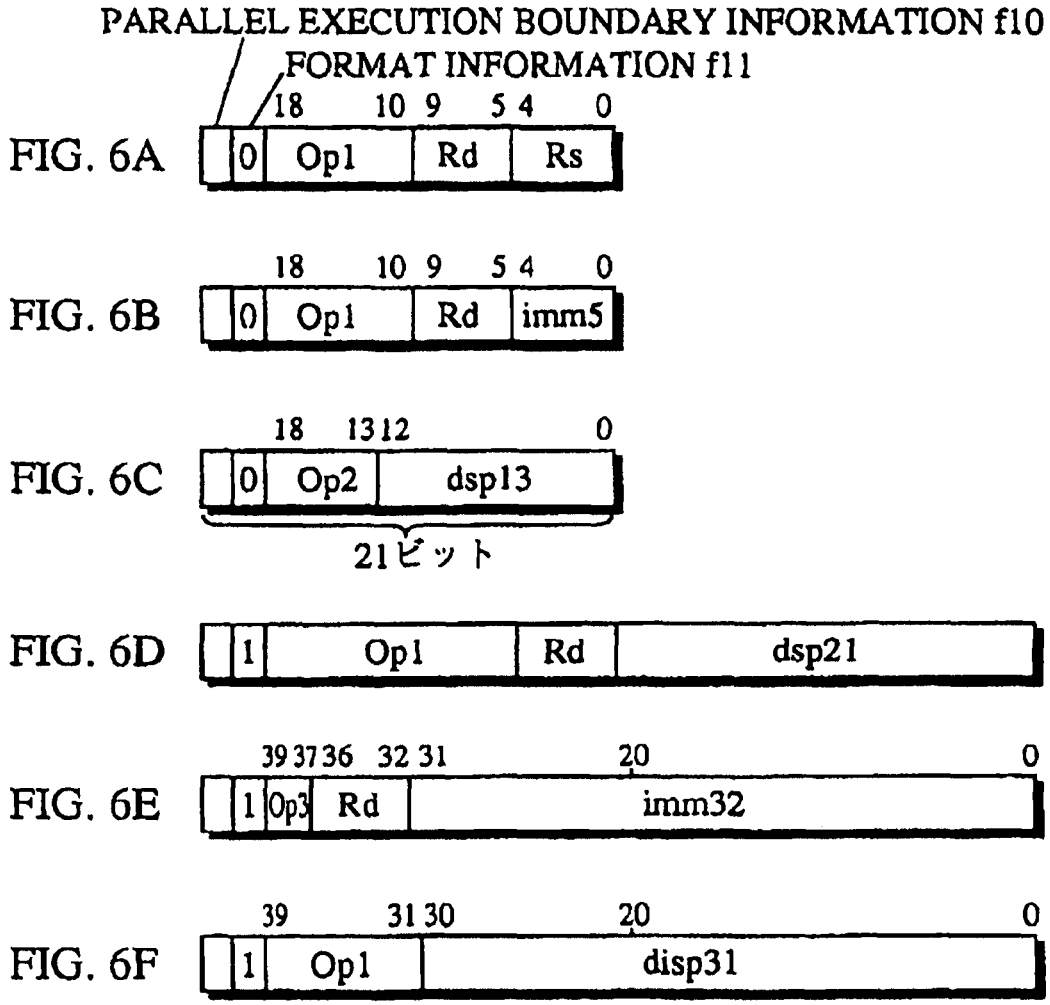
FIGS. 6A–6F show the instruction formats used by the present processor.

Aside from the format information f11 and the parallel execution boundary information f10, FIGS. 6A–6F also show the operation that are indicated by various kinds of instructions. FIGS. 6A–6C show the formats of 21-bit instructions, while FIGS. 6D–6F show the formats of 42-bit instructions.

In these formats, transfer instructions and arithmetic instructions that handle long constants such as 32-bit constants, and branch instructions that indicate a large displacement are defined as 42-bit instructions. Most other kinds of instructions are defined as 21-bit instructions.

These instructions are such that 19 bits may be used in a 21-bit instruction and 40 bits may be used in a 42-bit instruction. In detail, the format in FIG. 6A includes an opcode "Op1" that shows the type of operation, an "Rs" field that shows the register number of the register used as the source operand, and an "R" field that shows the register number of the register used as the destination operand.

The format in FIG. 6B includes an opcode "Op1" that shows the type of operation, an "imm5" field that shows a 5-bit immediate used as the source operand, and an "Rd" field that shows the register number of the register used as the destination operand.

The format in FIG. 6C includes an opcode "Op2" that shows the type of operation, and a "disp13" field that shows a 13-bit immediate used as the source operand.

The "imm5" field indicates a 5-bit constant that is used as an operand. The "disp13" field indicates a 13-bit displacement.

Each of the instructions shown in FIGS. 6A–6C may be inputted into one of the first instruction decoder 33~third instruction decoder 35. The opcode and any register numbers in an instruction are decoded by the first instruction decoder 33~third instruction decoder 35 which send control signals showing the decoding results to the executing unit 40. On the other hand, immediates and displacements are outputted by the first instruction decoder 33~third instruction decoder 35 to the third instruction decoder 35 in their original form.

The following explains the formats of 42-bit instructions.

The format in FIG. 6D includes an opcode "Op1" that shows the type of operation, a "disp21" field that shows a 21-bit displacement used as the source operand, and an "Rd" field that shows the register number of the register used as the destination operand.

The format in FIG. 6E includes an opcode "Op3" that shows the type of operation, an "imm32" field that shows a 32-bit immediate used as the source operand, and an "Rd" field that shows the register number of the register used as the destination operand.

The format in FIG. 6F includes an opcode "Op1" that shows the type of operation, and a "disp31" field that shows a 31-bit displacement used as the source operand.

Since each of the first instruction decoder 33 to third instruction decoder 35 only have a 21-bit input port, none of these decoders is able to receive an input of an entire 42-bit instruction. Accordingly, the first instruction decoder 33~third instruction decoder 35 only receives as input of a part of a 42-bit instruction shown in FIGS. 6D to 6F as the $20^{th}$ to $39^{th}$ bits, which is to say, only the first unit. The second unit in such an instruction is not inputted into any of the first instruction decoder 33~third instruction decoder 35 and is instead inputted directly into the executing unit 40 without passing the first instruction decoder 33~third instruction decoder 35.

The second unit may skip the first instruction decoder 33~third unit decoder 35 for the following reason. As can be seen from the instruction formats shown in FIGS. 6E and 6F, the second of the two units that form a 42-bit instruction only includes part of a constant operand. This means that the second unit is an instruction format that does not include an opcode, so that the second unit does not need to be inputted into the first instruction decoder 33~third instruction decoder 35. Accordingly, such input can be skipped.

The constant operand of a 42-bit instruction is therefore composed by linking a constant in the unit that is outputted by an instruction decoder with a constant that skips the first instruction decoder 33~third instruction decoder 35 and is directly transferred in the executing unit 40.

The executing unit 40 is a circuit for executing a maximum of three units in parallel, based on the control signals received from the decoding unit 30. This executing unit 40 includes an execution control unit 41, a PC unit 42, a register file 43, a first calculating unit 44, a second calculating unit 45, a third calculating unit 46, an operand access unit 47, and data buses 48 and 49.

The execution of instructions is such that units (hereafter "execution units") between parallel execution boundaries are executed in parallel in one cycle. This means that in each cycle, instructions are executed as far as the first instruction whose parallel execution boundary information f10 is "1". Instructions that have been supplied but which are not executed are accumulated in the instruction buffer and are executed in a later cycle.

The execution control unit 41 is a general name for the control circuitry and wiring that controls the components 42~49 in the executing unit 40 according to the decoding results of the decoding unit 30. This execution control unit 41 includes circuits for timing control, execution permission/prohibition control status management, and interrupt control.

The PC (program counter) unit 42 outputs an address in the external memory at which a next instruction to be decoded and executed is located to the instruction fetch unit 21 of the instruction supplying/issuing unit 20.

The register file 43 is composed of thirty-two 32-bit registers numbered register R0~R31. The values stored in these registers are transferred to the first calculating unit 44, the second calculating unit 45, and the third calculating unit 46 via the data bus 48, based on the decoding results of the first instruction decoder 33, the second instruction decoder 34, and the third instruction decoder 35. The calculating units perform calculations on the register data or simply allow the values to pass, before outputting values to the register file 43 or the operand access unit 47 via the data bus 49.

The first calculating unit 44, the second calculating unit 45, and the third calculating unit 46 each include an ALU (arithmetic logic unit) and multiplier that perform calculations on two pieces of 32-bit data, as well as a barrel shifter that performs shift operations. These calculating units execute calculations under the control of the execution control unit 41.

The operand access unit 47 transfers operands between the register file 43 and the external memory. When, for example, an instruction has "ld" (load) as its opcode, one word (32 bits) of data located in the external memory is loaded into an indicated register in the register file 43 via the operand access unit 47. When an instruction has "st" (store) as its opcode, the stored value of an indicated register in the register file 43 is stored into the register file 43.

As shown in FIG. 4, the PC unit 42, the register file 43, the first calculating unit 44, the second calculating unit 45, the third calculating unit 46, and the operand access unit 47 are all connected to the data bus 48 (L1 bus, R1 bus, L2 bus, R2 bus, L3 bus, and R3 bus) and the data bus 49 (D1 bus, D2 bus, and D3 bus). Note that the L1 bus and R1 bus are respectively connected to the two input ports of the first calculating unit 44, the L2 bus and R2 bus are respectively connected to the two input ports of the second calculating unit 45, and the L3 bus and R3 bus are respectively connected to the two input ports of the third calculating unit 46. The D1 bus, D2 bus, and D3 bus are respectively connected to the outputs of the first calculating unit 44, the second calculating unit 45, and the third calculating unit 46.

With this architecture, instructions are supplied in packets of a fixed length, and a suitable number of units for the degree of parallelism is issued based on statically obtained information. This method does not require any no operation (NOP) instructions that are issued in conventional VLIW methods with fixed-length instructions, so that the overall code size is reduced.

According to the value of the format information f11, two units may be executed as one instruction or one unit may be executed as one instruction. As a result, a long instruction format is only used for certain instructions that require a large number of bits, with other instructions being defined using a short instruction format. This achieves a further reduction in code size.

Detailed Construction of the Instruction Buffer

Figure 8:
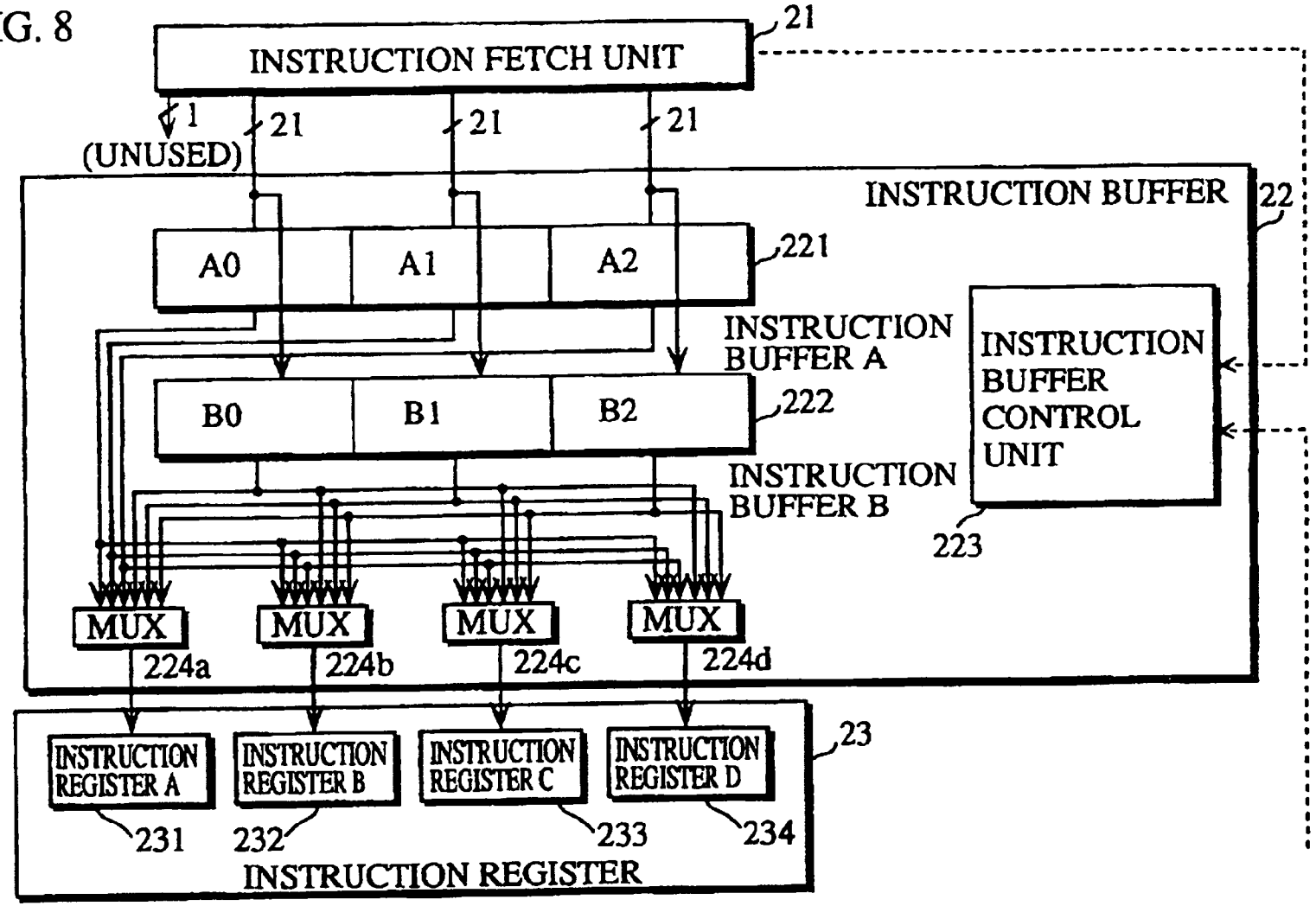
FIG. 8 shows the detailed construction of the instruction buffer 22.

The following describes the instruction buffer 22 in detail. FIG. 8 shows the detailed construction of the instruction buffer 22.

The instruction buffer 22 is composed of two 63-bit buffers, the instruction buffer A221 and the instruction buffer B222, that each store three units. The instruction buffer A221 is composed of three 21-bit buffers A0, A1, and A2 that each store one unit. In the same way, the instruction buffer B222 is composed of three 21-bit buffers B0, B1, and B2 that each store one unit.

The instruction buffer 22 is supplied with 64-bit packets by the instruction fetch unit 21. However, the MSB of the packet is not used as information. When a packet is received, the 63 valid bits in the packet are stored into one of the instruction buffer A221 and the instruction buffer B222 with no crossover between the two. The units stored in the instruction buffer 22 are stored in the order in which they were supplied, with the instruction buffer control unit 223 managing the status of the instruction buffer 22, such as this supplying order and whether either instruction buffer stores valid data.

The instruction buffer control unit 223 assigns a predetermined transfer order to the six units stored in the instruction buffer A221 and the instruction buffer B222, and controls the selectors 224a, 224b, 224c, and 224d so as to transfer units to the instruction registers A231~D234 in accordance with this order. This transfer order is determined based on the order in which packets are transferred from the instruction fetch unit 21 to the instruction buffer 22 and the positions of the various units within these packets.

In detail, the packets stored in the instruction buffers A221 and B222 are given a transfer order in accordance with the order in which they were supplied from the instruction supplying/issuing unit 20.

The three units in each packet are given a transfer order that treats the units as a first unit, a second unit, and a third unit, starting from the unit closest to the MSB. In order starting from the first unit to be received, units are transferred from the instruction buffers A221 and B222 to the instruction registers A231~D234. By assigning this transfer order to units, a waiting queue is formed using the six units in the instruction buffers A221 and B222. This waiting queue is hereafter called the "unit queue".

In this unit queue composed of six units, the first four units are transferred to the instruction registers A231–D234 as shown in FIG. 5B. After this transfer, the four units may be issued from the instruction registers A231–D234 to the first instruction decoder 33~the third instruction decoder 35, as shown in FIG. 5C. Here, up to four units may be issued, so that there are cases when units that have not been issued remain in the instruction registers A231–D234. In such cases, the instruction buffer control unit 223 invalidates the units in the instruction registers A231–D234 that have been issued to the first instruction decoder 33~third instruction decoder 35 and validates the remaining units. The validated units are then moved upward in the unit queue.

When a branch occurs, if the branch destination is a unit that is stored in the unit queue, the branch destination unit and following units in the unit queue are validated. Units positioned before the branch destination unit in the unit queue are invalidated.

This invalidating and moving up of units in the unit queue is performed based on information showing which units in the instruction register 23 were not issued to the first instruction decoder 33~third instruction decoder 35 and on information showing which units in the instruction buffers A221 and B222 should be validated. Of these, the former information is received from the instruction fetch unit 21, while the latter information is received as feedback from the instruction issuing control unit 31 of the decoding unit 30.

The following explains the control of buffer states by the instruction buffer control unit 223 with reference to FIGS. 9A–9F and FIGS. 10–10F. FIGS. 9A–9F show the supplying of packets from the instruction fetch unit 21 to the instruction buffer 22 and the outputting of units to the instruction register 23. In the same way, FIGS. 10A–10F show the supplying of packets from the instruction fetch unit 21 to the instruction buffer 22 and the outputting of units to the instruction register 23, though in FIGS. 10A–10F some of the units are not issued by the instruction register 23.

Figure 9A:
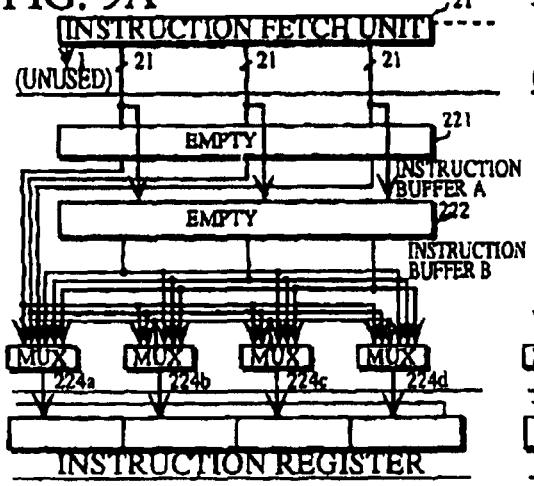
FIGS. 9A–9F show supplying of packets from the instruction fetch unit 21 to the instruction buffer 22 and the outputting of units to the instruction register 23.
Figure 9B:
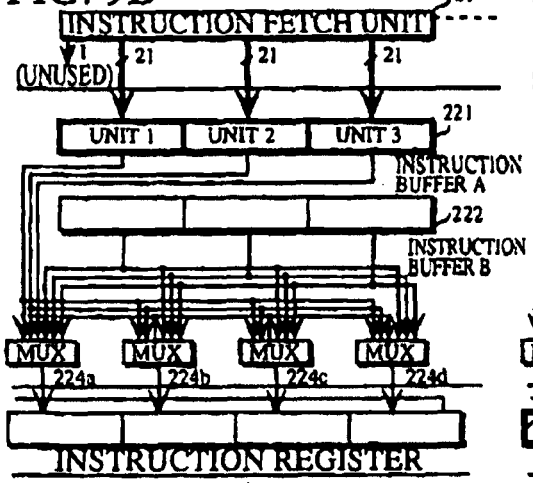

FIG. 9A corresponds to when the instruction buffer 22 is empty and a branch is performed to the second unit in a packet (unit2). In this case, the packet (composed of unit1, unit2, and unit3) including this unit2 is supplied from the instruction fetch unit 21, as shown in FIG. 9B, and is stored in the instruction buffer A221.

Figure 9C:
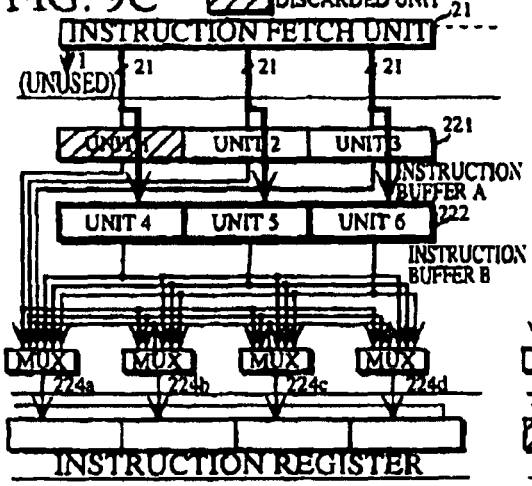

Since the unit at the start of this packet is invalid, the instruction buffer control unit 223 performs control as shown in FIG. 9C so that the state of the instruction buffer 22 is that only the buffers A1 and A2 are valid.

If in the next cycle, none of the units transferred from the instruction buffer 22 to the instruction register 23 is issued and a valid 64-bit packet composed of unit4, unit5, and unit6 is supplied from the instruction fetch unit 21, the packet is transferred to the instruction buffer B222, so that the state of the instruction buffer 22 changes so that buffers A1, A2, B0, B1, and B2 are all valid.

Figure 9D:
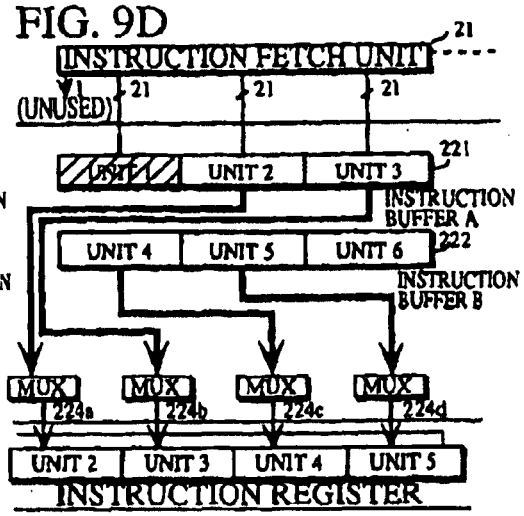

In the next cycle, there is no space in the instruction buffer 22, as shown in FIG. 9D, so that no supplied packet is received from the instruction fetch unit 21. Unit2 in buffer a1, unit3 in buffer A2, unit4 in buffer B0, and unit5 in buffer B1 are transferred in order to the instruction register 23.

In this way, the supplying of a packet from the instruction fetch unit 21 is only performed when there is a 63-bit space in the instruction buffer 22. Packets are managed in the order in which they were supplied, so that in each cycle, the four units that were supplied first are transferred from the instruction buffer 22 to the instruction register 23.

Figure 9E:
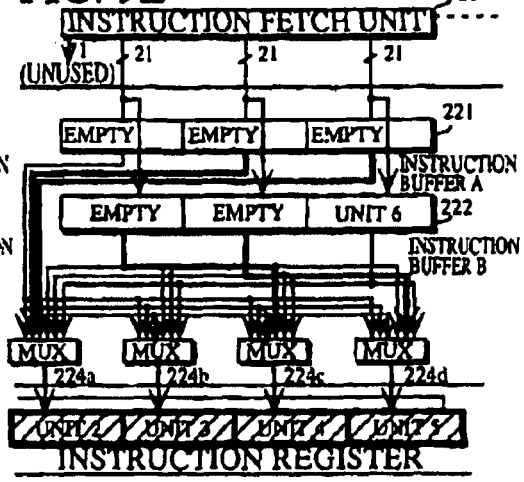
Figure 9F:
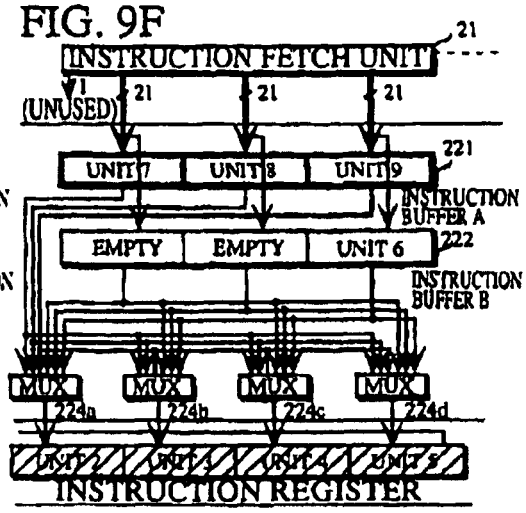
Figure 10A:
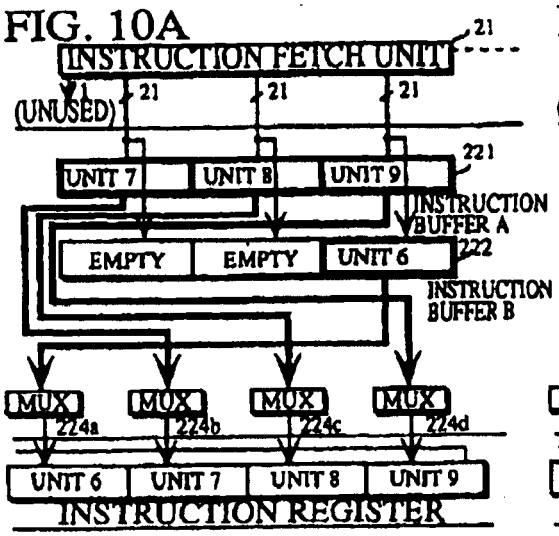
FIGS. 10A–10E show the supplying of packets from the instruction fetch unit 21 to the instruction buffer 22 and the outputting of units to the instruction register 23, though some of the units are not issued by the instruction register 23.
Figure 10B:
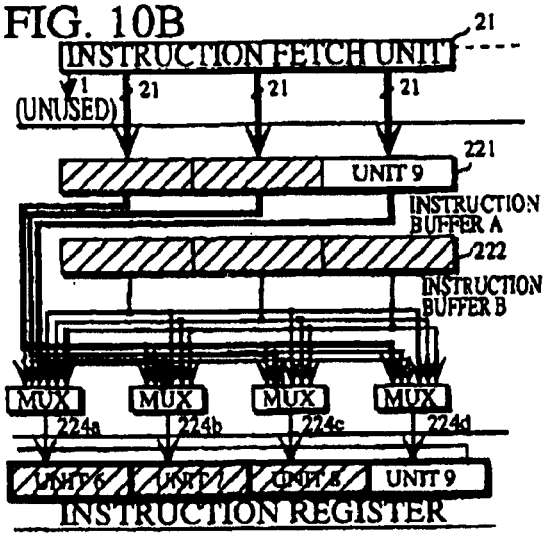
Figure 10C:
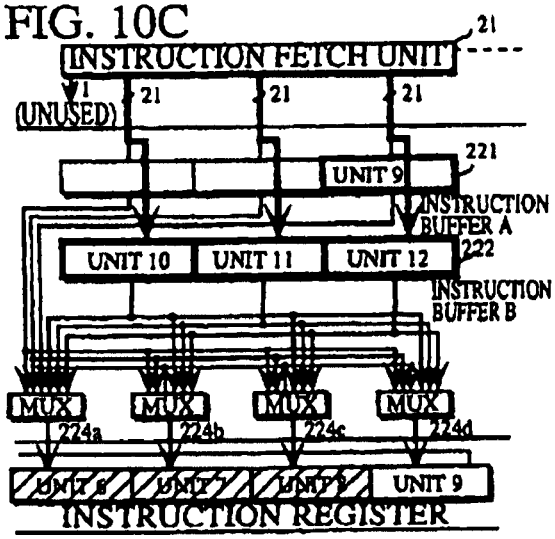
Figure 10D:
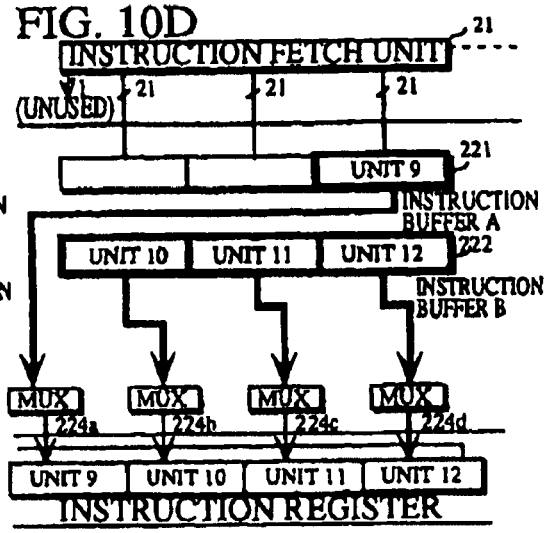
Figure 10E:
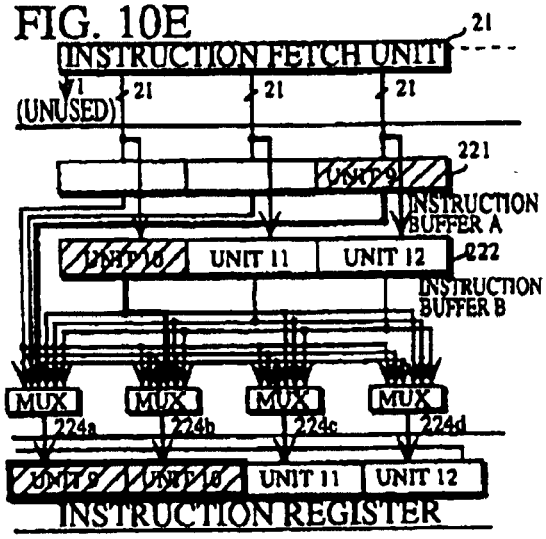

When unit2~unit5 have been issued by the instruction register 23, all of unit1~unit5 are invalided as shown in FIG. 9E, resulting in the instruction buffer A221 becoming empty. As shown in FIG. 9F, this results in unit7~unit9 being supplied to the instruction buffer A221, so that unit6~unit9 will be stored in the instruction buffer 221A and instruction buffer 222B. In FIG. 10A, these units are transferred to the instruction register 23. Of these units, unit6~unit8 are issued by the instruction register 23 to the first instruction decoder 33 and second instruction decoder 34, so that only unit9 remains in the instruction register 23. As a result, all of the units in the instruction buffer 222B are invalidated, as shown in FIG. 10B, and all units aside from unit9 in the instruction buffer 221A are invalidated. This invalidation clears the instruction buffer 222B so that unit10~unit12 are supplied to the instruction buffer 222B as shown in FIG. 10C. After this, four units starting from unit9 (unit9~unit12) are transferred from the instruction buffer 221A and instruction buffer 222B to the instruction register 23. Of these transferred units, unit9 and unit10 are issued, while unit11 and unit12 remain in the instruction register 23. As a result, the instruction buffer control unit 223 validates only unit11 and unit12 and invalidates the other units. In the next transfer, three units starting from unit11 (unit11~unit13) are transferred to the instruction register 23.

Periphery of the Instruction Register 23 and Operation of the Instruction Issuing Control Unit 31

The following describes the construction of the periphery of the instruction register 23 and the detailed operation of the instruction issuing control unit 31.

Figure 11:
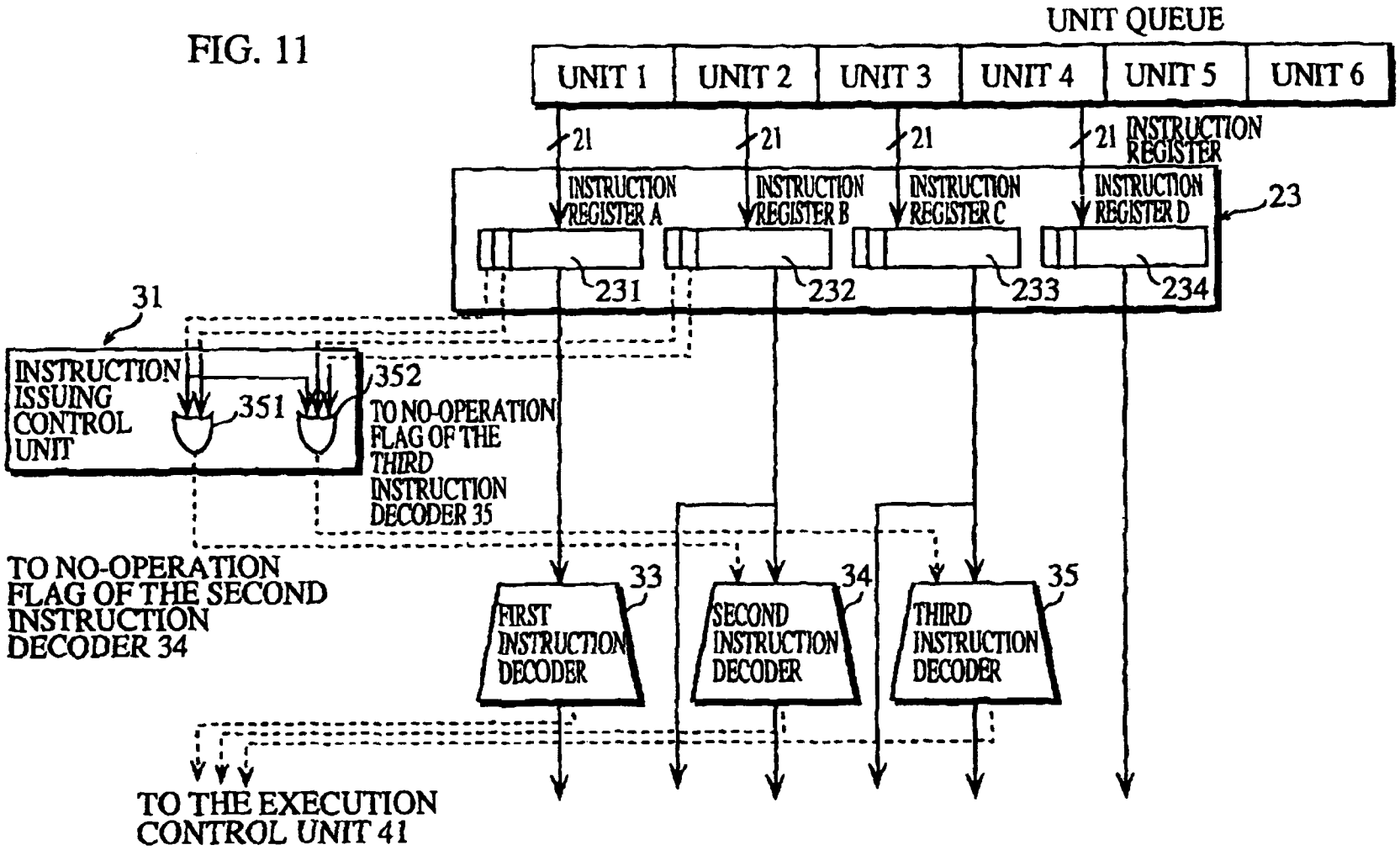
FIG. 11 is a block diagram showing the construction of the periphery of the instruction register 23.

FIG. 11 is a block diagram showing the construction of the periphery of the instruction register 23. In FIG. 11, arrows drawn using broken lines indicate control signals.

The instruction register 23 is composed of four 21-bit registers, the instruction registers A231~D234. For ease of understanding this instruction register 23 is shown as setting a sequence of units supplied by the instruction buffer 22 as a unit queue.

As shown in FIG. 11, the position in the instruction register 23 to which a unit is transferred is unequivocally determined by its position in the unit queue. This means, for example, that the first unit in the queue will be transferred to the instruction register A231 and the second unit will be transferred to the instruction register B232.

The first instruction decoder 33~third instruction decoder 35 each receive an input of a 21-bit unit, decode it, and output control signals relating to the operation of the instruction composed by this unit to the execution control unit 41, as well as outputting any constant operands located in the unit.

The first instruction decoder 33~third instruction decoder 35 also receive an input of a 1-bit no-operation flag as a control signal. When this flag is set at "1" for a decoder, the decoder outputs a no operation instruction. This means that by setting the no-operation flag, the decoder of an instruction by an instruction decoder can be invalidated.

The instruction issuing control unit 31 refers to the parallel execution boundary information f10 and the format information f11 of the units stored in the instruction register A231 and the instruction register B232, and judges which is the final unit that should be outputted from the instruction register 23 in this cycle. Based on this information, the instruction issuing control unit 31 outputs control signals (no-operation instruction flags) that show whether the decoding by the second instruction decoder 34 and third instruction decoder 35 should be invalidated. The instruction issuing control unit 31 then transmits information showing how many units were not issued and so remain in the instruction register 23 to the instruction buffer control unit 223 in the instruction buffer 22.

As can be seen from FIG. 11, the units that can be decoded as instructions are only the units stored in the instruction register A231, the instruction register B232, and the instruction register C233. The information in these units is examined, and decoding is invalidated for units that correspond to the second unit in a 42-bit instruction and units that are not issued. A unit that corresponds to the second unit in a 42-bit instruction is directly outputted as part of the constant operand of the instruction that is composed by the preceding unit.

In order to output these control signals, the instruction issuing control unit 31 is internally equipped with the OR circuit 351 and the OR circuit 352, as shown in FIG. 11.

The OR circuit 351 invalidates the decoding by the second instruction decoder 34 if the parallel execution boundary information f10 of the unit stored in the instruction register A231 is "1" or if the format information f11 of that unit is "1".

The OR circuit 352 invalidates the decoding by the third instruction decoder 35 if the parallel execution boundary information f11 of the unit stored in the instruction register B232 is "1" or if the format information f11 of that unit is "1".

The following explains the operation of the instruction issuing control unit 31~third instruction decoder 35 when decoding the instruction patterns A~H shown in FIG. 7, with reference to FIGS. 12~19.

Figure 12:
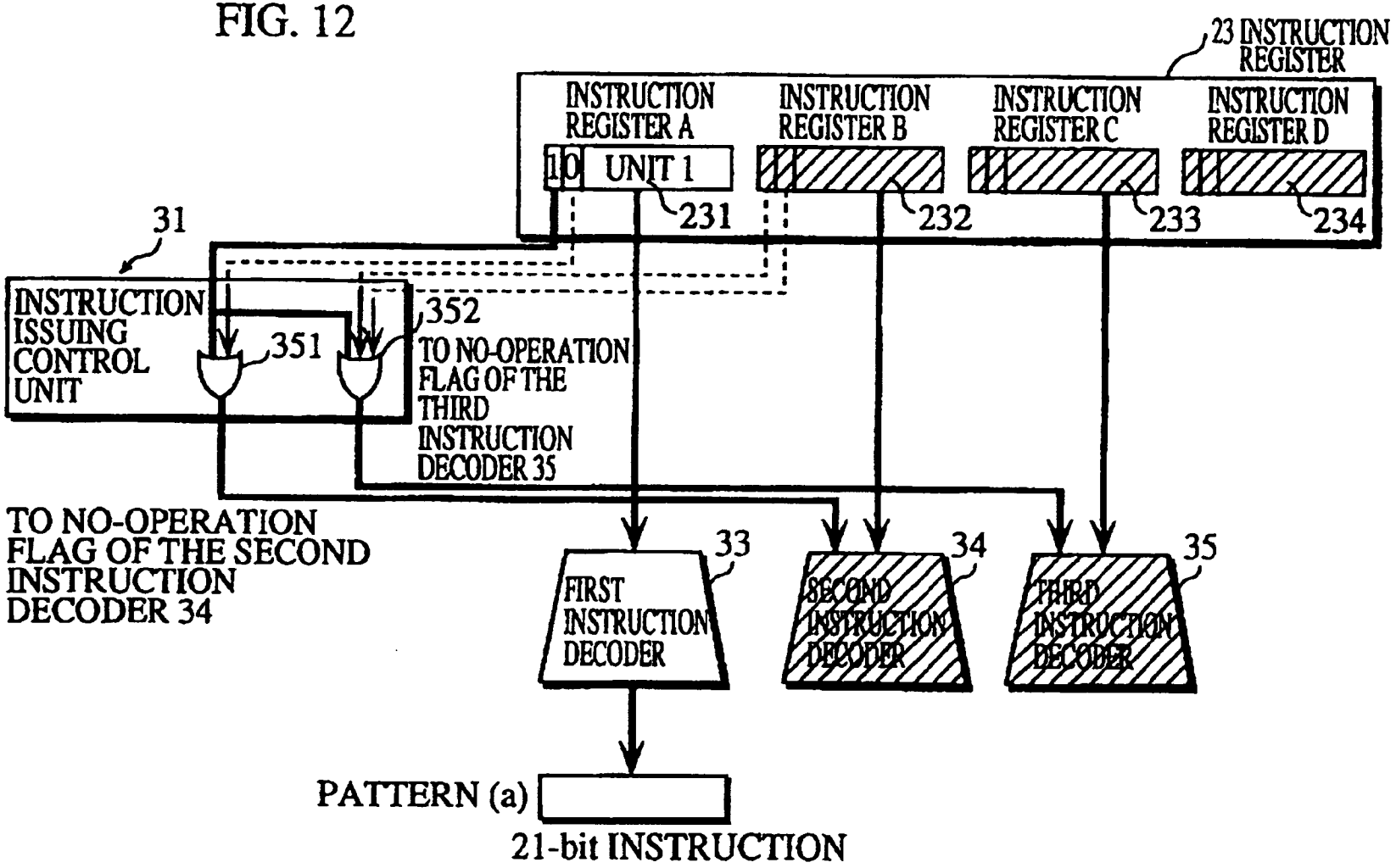
FIG. 12 shows the control content of the instruction issuing control unit 31, and the first instruction decoder 33~third instruction decoder 35 when the instruction pattern A shown in FIG. 7 is outputted to the first instruction decoder 33~third instruction decoder 35.

FIG. 12 shows the control content of the instruction issuing control unit 31, and the first instruction decoder 33~third instruction decoder 35 when the instruction pattern A shown in FIG. 7 is outputted to the first instruction decoder 33~third instruction decoder 35. In this figure, the parallel execution boundary information f10-format information f11 of the unit (unit′) stored in the instruction register A231 is "10". In this case, unit1 forms a 21-bit instruction, so that decoding of unit2 and unit3 as instructions is invalidated. This means that the instruction issuing control unit 31 sets the no-operation flags respectively outputted to the second instruction decoder 34 and the third instruction decoder 35 at "1".

Figure 13:
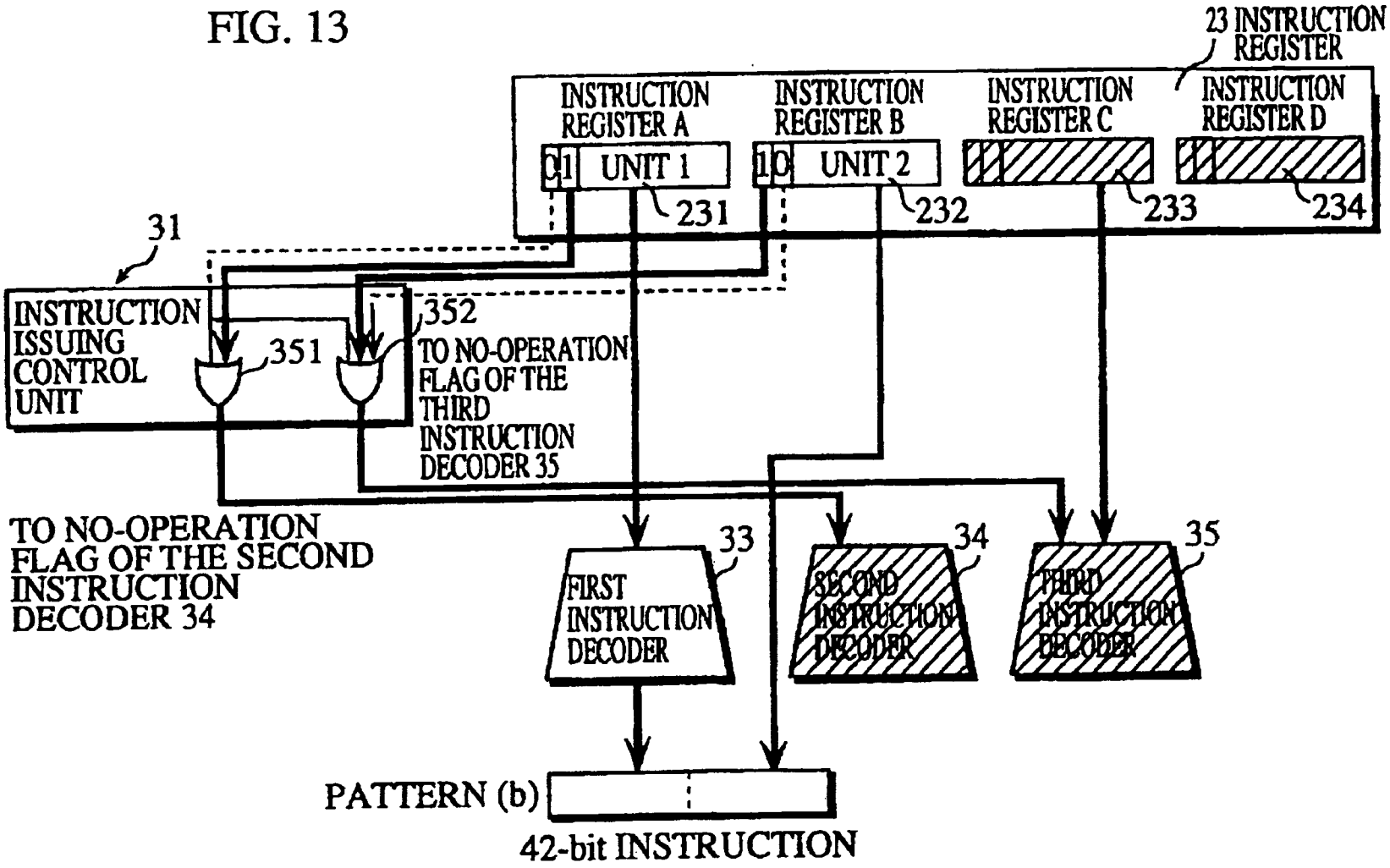
FIG. 13 shows the control content of the instruction issuing control unit 31, and the first instruction decoder 33~third instruction decoder 35 when the instruction pattern B shown in FIG. 7 is outputted to the first instruction decoder 33–third instruction decoder 35.

FIG. 13 shows the control content of the instruction issuing control unit 31, and the first instruction decoder 33~third instruction decoder 35 when the instruction pattern B shown in FIG. 7 is outputted to the first instruction decoder 33~third instruction decoder 35. In this figure, the parallel execution boundary information f10-format information f11 of the unit (unit1) stored in the instruction register A231 is "01". In this case, unit1 and unit2 stored in the instruction register B232 together form a 42-bit instruction, so that unit2 is not decoded as an instruction. This means that the instruction issuing control unit 31 sets the no-operation flags respectively outputted to the second instruction decoder 34 and the third instruction decoder 35 at "1".

Figure 14:
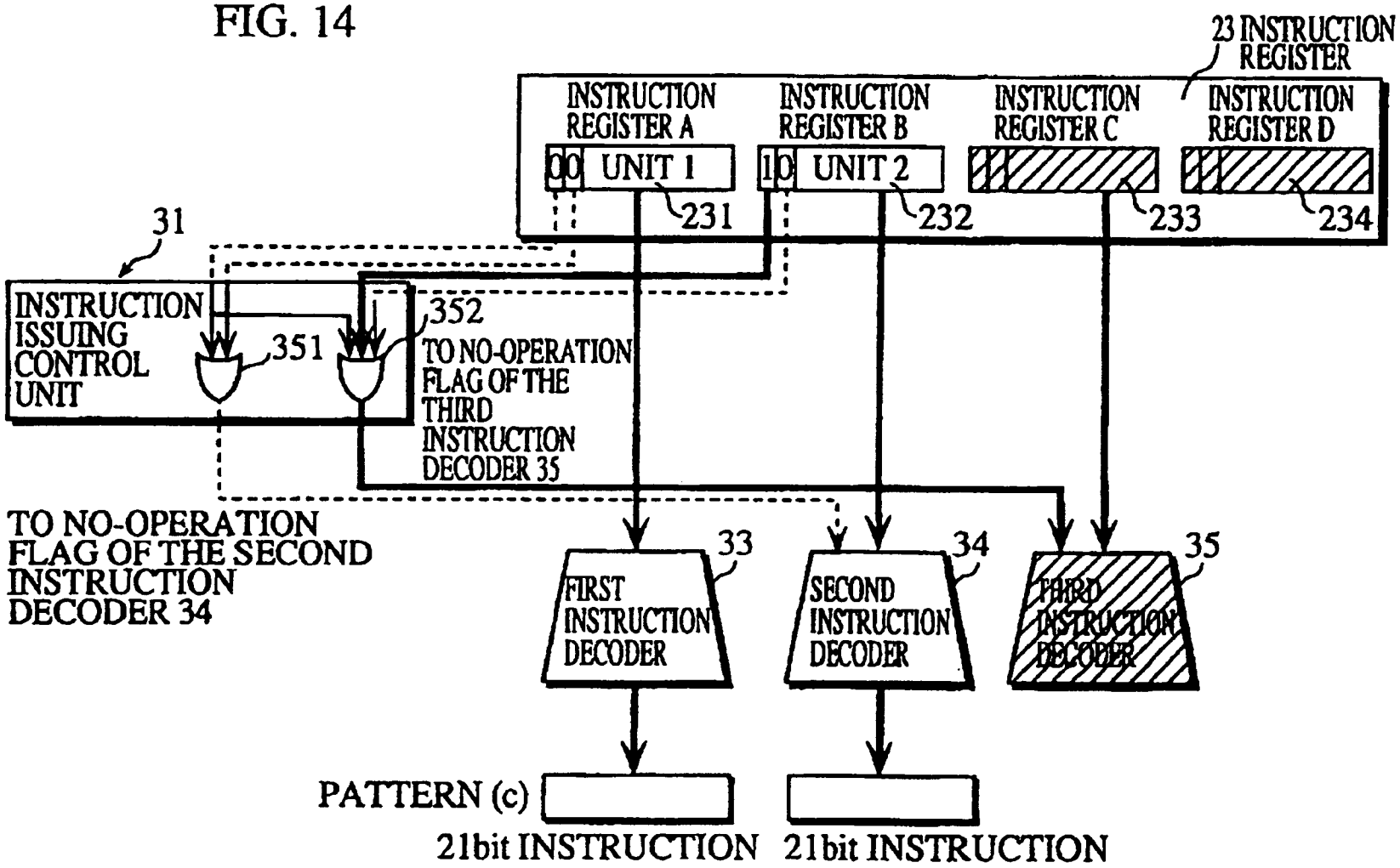
FIG. 14 shows the control content of the instruction issuing control unit 31, and the first instruction decoder 33~third instruction decoder 35 when the instruction pattern C shown in FIG. 7 is outputted to the first instruction decoder 33–third instruction decoder 35.

FIG. 14 shows the control content of the instruction issuing control unit 31, and the first instruction decoder 33~third instruction decoder 35 when the instruction pattern C shown in FIG. 7 is outputted to the first instruction decoder 33~third instruction decoder 35. In this figure, the parallel execution boundary information f10-format information f11 of the unit1 stored in the instruction register A231 is "00", and the parallel execution boundary information f10-format information f11 of the unit (unit2) stored in the instruction register B232 is "10". Since the format information f11 for both units is "0", only units up to unit2 are issued in this cycle, so that the decoding of unit3 as an instruction is invalidated. This means that the instruction issuing control unit 31 sets the no-operation flag outputted to the third instruction decoder 35 at "1".

Figure 15:
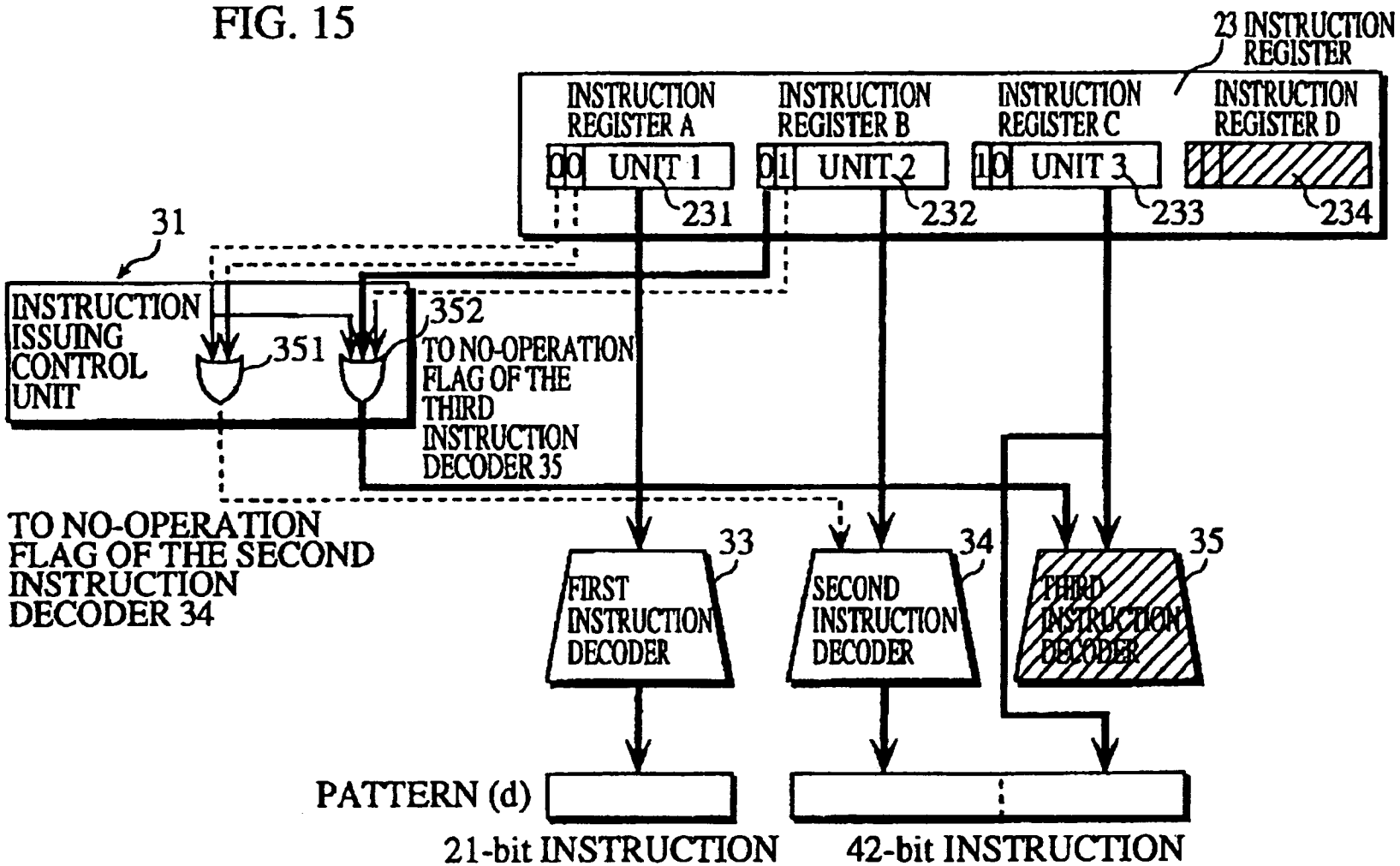
FIG. 15 shows the control content of the instruction issuing control unit 31, and the first instruction decoder 33~third instruction decoder 35 when the instruction pattern D shown in FIG. 7 is outputted to the first instruction decoder 33~third instruction decoder 35.

FIG. 15 shows the control content of the instruction issuing control unit 31, and the first instruction decoder 33~third instruction decoder 35 when the instruction pattern D shown in FIG. 7 is outputted to the first instruction decoder 33~third instruction decoder 35. In this figure, the parallel execution boundary information f10-format information f11 of the unit1 stored in the instruction register A231 is "00", the parallel execution boundary information f10-format information f11 of the unit2 stored in the instruction register B232 is "01", and the parallel execution boundary information f10-format information f11 of unit3 stored in the instruction register C233 is "10". In this case, unit1 stored in the instruction register A231 forms a separate 21-bit instruction. Meanwhile, unit2 stored in the instruction register B232 and unit3 stored in the instruction register C233 together form a 42-bit instruction, so that the decoding of unit3 as an instruction is invalidated. This means that the instruction issuing control unit 31 sets the no-operation flag outputted to the third instruction decoder 35 at "1".

Figure 16:
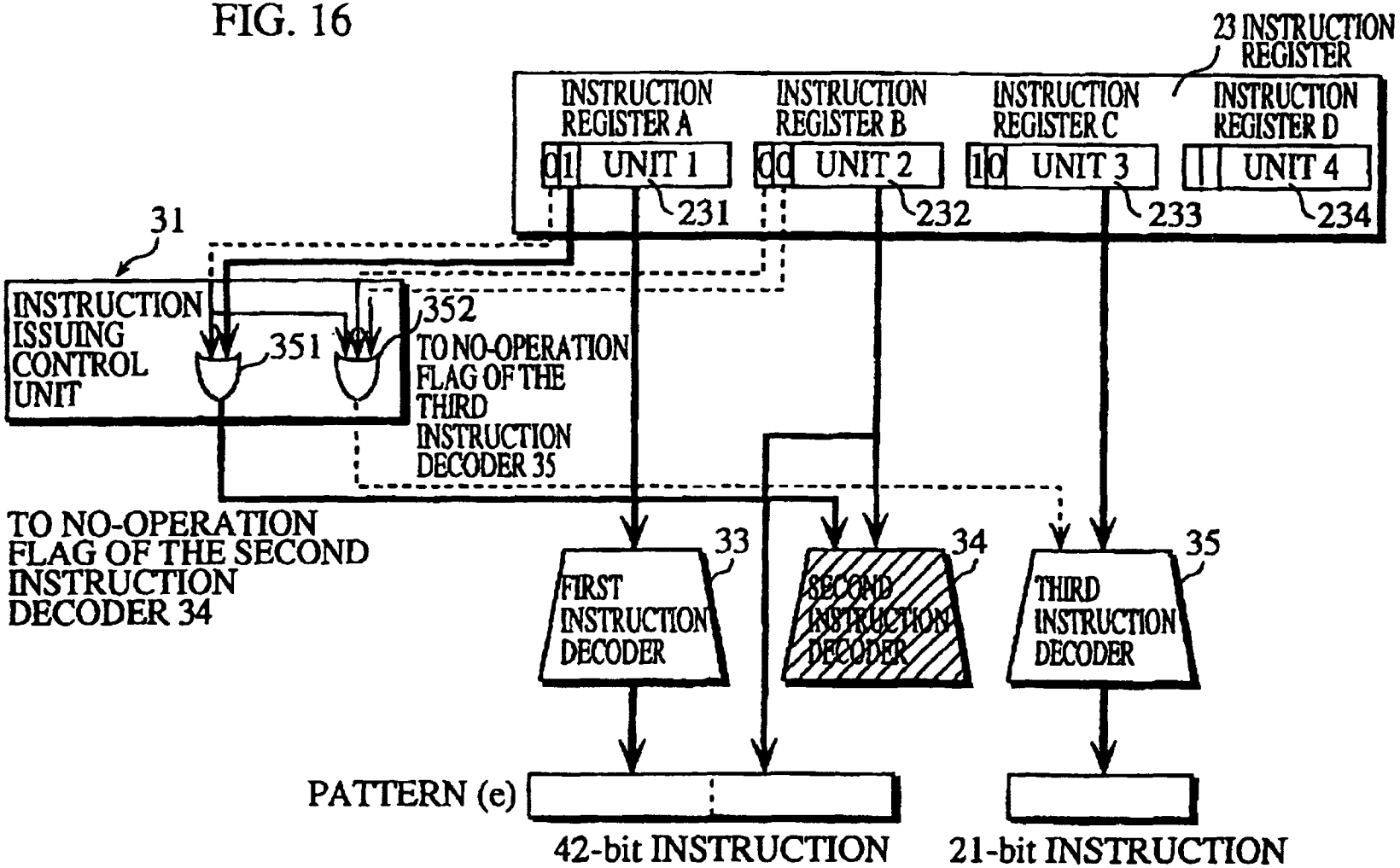
FIG. 16 shows the control content of the instruction issuing control unit 31, and the first instruction decoder 33–third instruction decoder 35 when the instruction pattern E shown in FIG. 7 is outputted to the first instruction decoder 33~third instruction decoder 35.

FIG. 16 shows the control content of the instruction issuing control unit 31, and the first instruction decoder 33~third instruction decoder 35 when the instruction pattern E shown in FIG. 7 is outputted to the first instruction decoder 33~third instruction decoder 35. In this figure, the parallel execution boundary information f10-format information f11 of unit1 stored in the instruction register A231 is "01", the parallel execution boundary information f10-format information f11 of the unit2 stored in the instruction register B232 is "00", and the parallel execution boundary information f10-format information f11 of unit3 stored in the instruction register C233 is "10". Since the format information f11 of unit1 is "1", unit1 and unit2 in the instruction register B232 together form a 42-bit instruction. On the other hand, unit3 forms a separate 21-bit instruction and so needs to be decoded. In this case, the instruction issuing control unit 31 sets only the no-operation flag outputted to the second instruction decoder 34 at "1".

Figure 17:
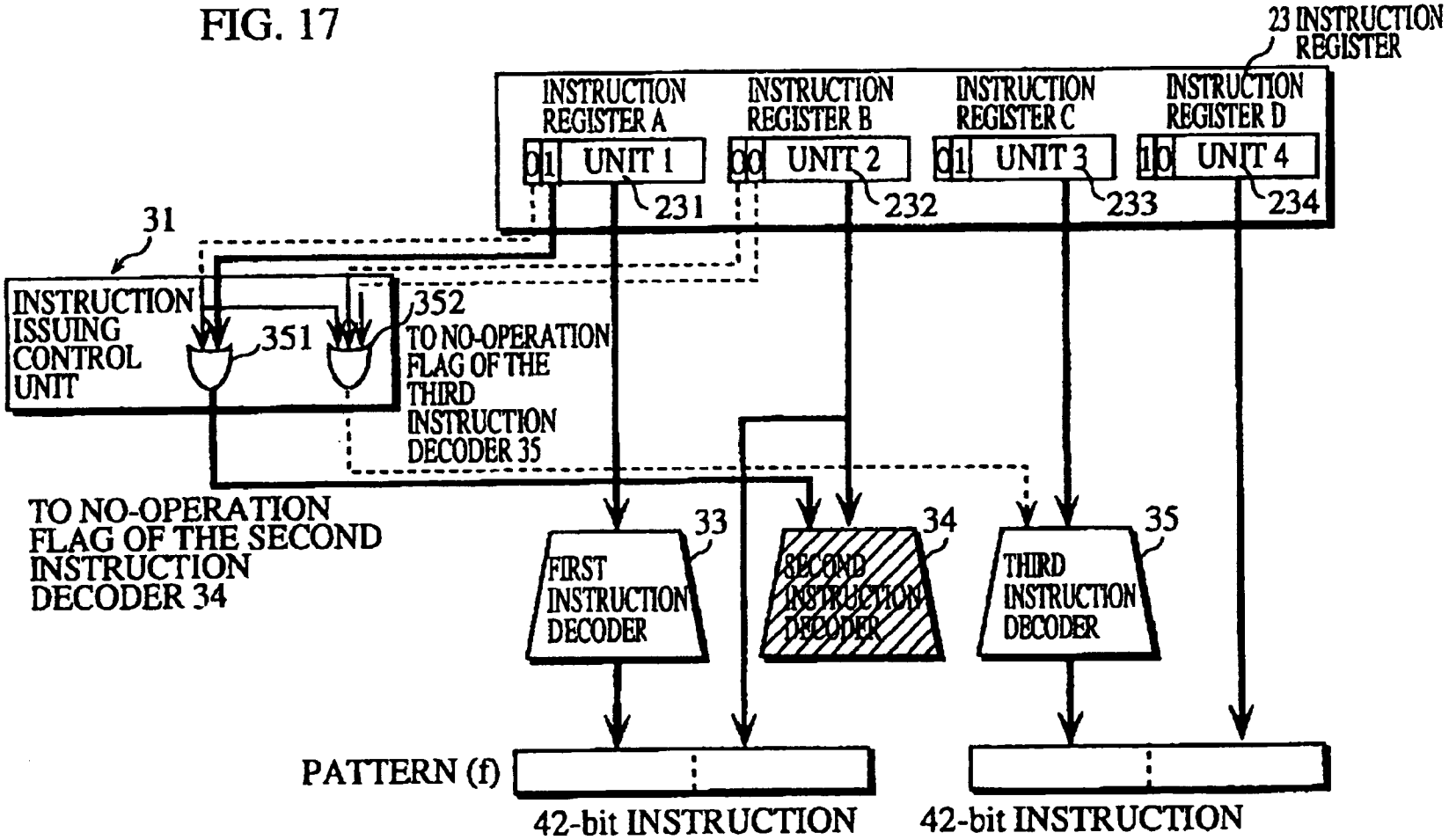
FIG. 17 shows the control content of the instruction issuing control unit 31, and the first instruction decoder 33–third instruction decoder 35 when the instruction pattern F shown in FIG. 7 is outputted to the first instruction decoder 33~third instruction decoder 35.

FIG. 17 shows the control content of the instruction issuing control unit 31, and the first instruction decoder 33~third instruction decoder 35 when the instruction pattern F shown in FIG. 7 is outputted to the first instruction decoder 33~third instruction decoder 35. In this figure, the parallel execution boundary information f10-format information f11 of unit1 stored in the instruction register A231 is "01", the parallel execution boundary information f10-format information f11 of the unit2 stored in the instruction register B232 is "00", the parallel execution boundary information f10-format information f11 of unit3 stored in the instruction register C233 is "01", and the parallel execution boundary information f10-format information f11 of unit4 stored in the instruction register D234 is "10". Since the format information f11 of unit1 is "1", unit1 and unit2 in the instruction register B232 together form a 42-bit instruction. The format information f11 of unit3 is also "01" so that unit3 and unit4 in the instruction register D234 together form another 42-bit instruction. In this case, the instruction issuing control unit 31 sets only the no-operation flag outputted to the second instruction decoder 34 at "1".

Figure 18:
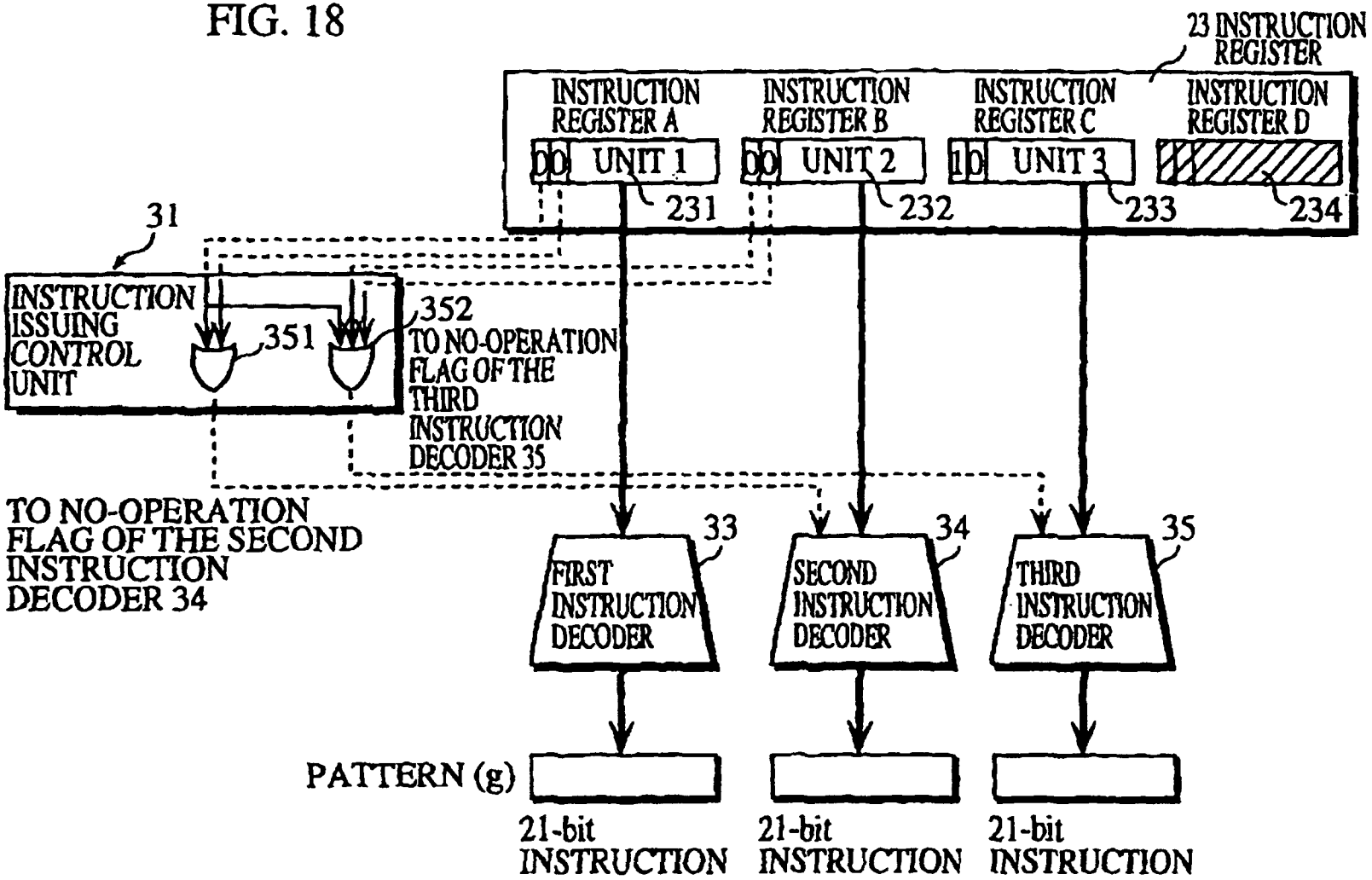
FIG. 18 shows the control content of the instruction issuing control unit 31, and the first instruction decoder 33–third instruction decoder 35 when the instruction pattern G shown in FIG. 7 is outputted to the first instruction decoder 33–third instruction decoder 35.

FIG. 18 shows the control content of the instruction issuing control unit 31, and the first instruction decoder 33~third instruction decoder 35 when the instruction pattern G shown in FIG. 7 is outputted to the first instruction decoder 33~third instruction decoder 35. In this figure, the parallel execution boundary information f10-format information f11 of unit1 stored in the instruction register A231 is "00", the parallel execution boundary information f10-format information f11 of unit2 stored in the instruction register B232 is "00", the parallel execution boundary information f10-format information f11 of unit3 stored in the instruction register C233 is "10". Since the format information f11 of unit1 is "0", unit1 stored in the instruction register A231 forms a separate 21-bit instruction. In the same way, the format information f11 of unit2 is "0", so that unit2 stored in the instruction register B232 forms a separate 21-bit instruction. Also, the format information f11 of unit3 is "0", so that unit3 stored in the instruction register C233 forms a separate 21-bit instruction. These three 21-bit instructions are decoded in parallel by the first instruction decoder 33~third instruction decoder 35.

Figure 19:
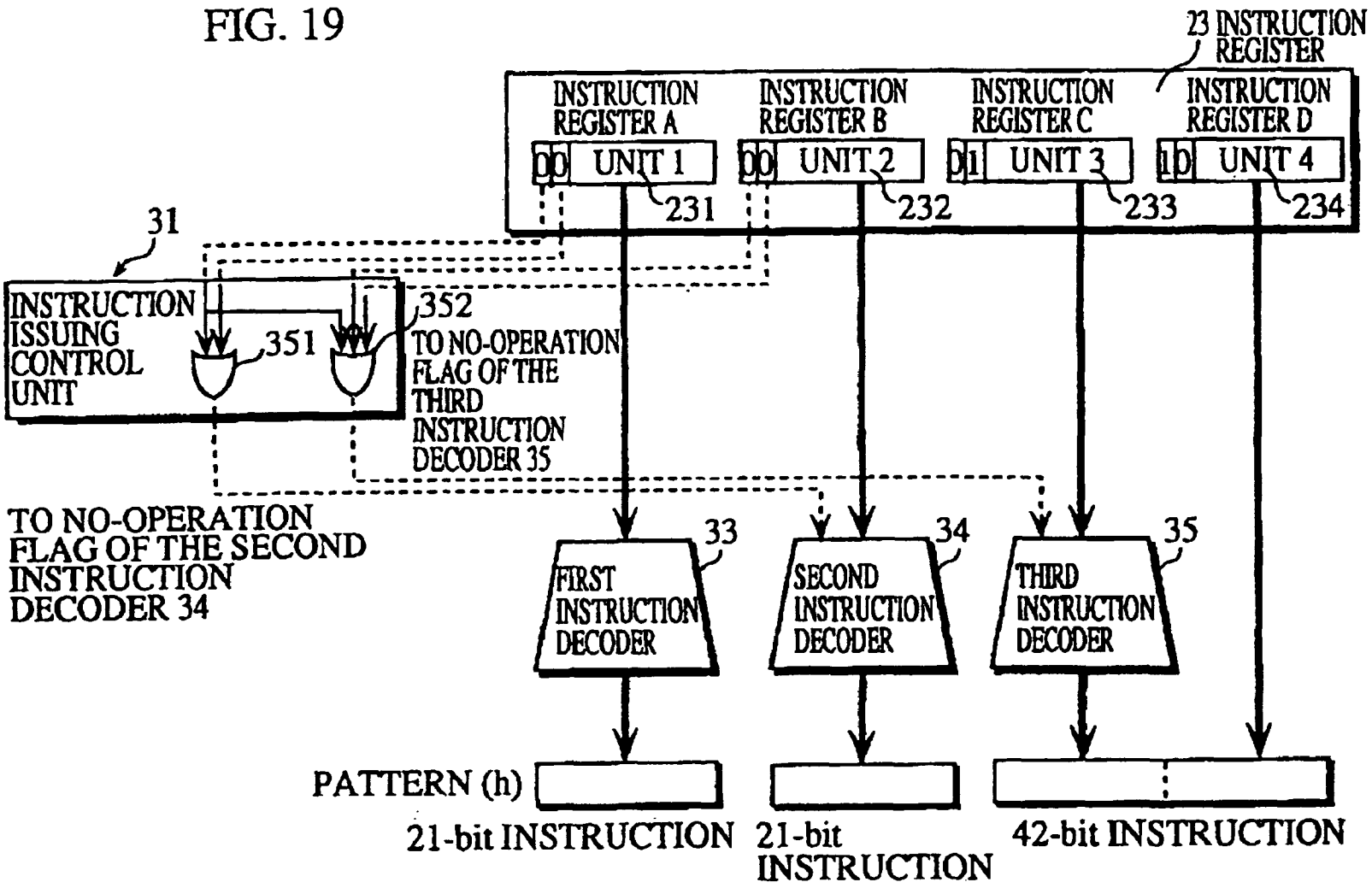
FIG. 19 shows the control content of the instruction issuing control unit 31, and the first instruction decoder 33–third instruction decoder 35 when the instruction pattern H shown in FIG. 7 is outputted to the first instruction decoder 33~third instruction decoder 35.

FIG. 19 shows the control content of the instruction issuing control unit 31, and the first instruction decoder 33~third instruction decoder 35 when the instruction pattern H shown in FIG. 7 is outputted to the first instruction decoder 33~third instruction decoder 35. In this figure, the parallel execution boundary information f10-format information f11 of unit1 stored in the instruction register A231 is "00", the parallel execution boundary information f10-format information f11 of unit2 stored in the instruction register B232 is "00", the parallel execution boundary information f10-format information f11 of unit3 stored in the instruction register C233 is "01", and the parallel execution boundary information f10-format information f11 of unit4 stored in the instruction register D234 is "10". Since the format information f11 of unit1 is "0", unit1 stored in the instruction register A231 forms a separate 21-bit instruction. In the same way, the format information f11 of unit2 is "0", so that unit2 stored in the instruction register B232 forms a separate 21-bit instruction. On the other hand, the format information f11 of unit3 is "1", so that together with unit4 in the instruction register D234, unit3 stored in the instruction register C233 forms a 42-bit instruction. These two 21-bit instructions and single 42-bit instruction are decoded in parallel by the first instruction decoder 33~third instruction decoder 35.

As described above, the processor of the present embodiment can decode up to four units in a sequence of units as instructions. This means that the patterns A–H shown in FIG. 7 can be issued, meaning that a maximum of four units can be issued at once. However, out of the possible patterns composed of four units, the patterns I–J in FIG. 7 have the opcode of the third instruction located in the instruction register 234D, so that these instructions cannot be decoded. However, out of the patterns that include one 42-bit instruction, even the pattern H in FIG. 7 can be executed in parallel. This means that even if a processor only has three decoders with 21-bit input ports, three instructions including one long instruction can still be executed in parallel.

Second Embodiment

In the processor of the first embodiment, instructions are supplied using packets that are outputted to the instruction buffer 22 and instructions are executed using "execution units" that are outputted from the instruction register 23. This second embodiment relates to an instruction conversion apparatus that generates a sequence of packets that are suited to the processor described in the first embodiment. This instruction conversion apparatus generates codes that correspond to the "execution units" described in the first embodiment, and then converts these codes into the object codes that correspond to the packets. These codes that correspond to "execution units" are called "parallel execution codes" in this second embodiment.

Figure 20:
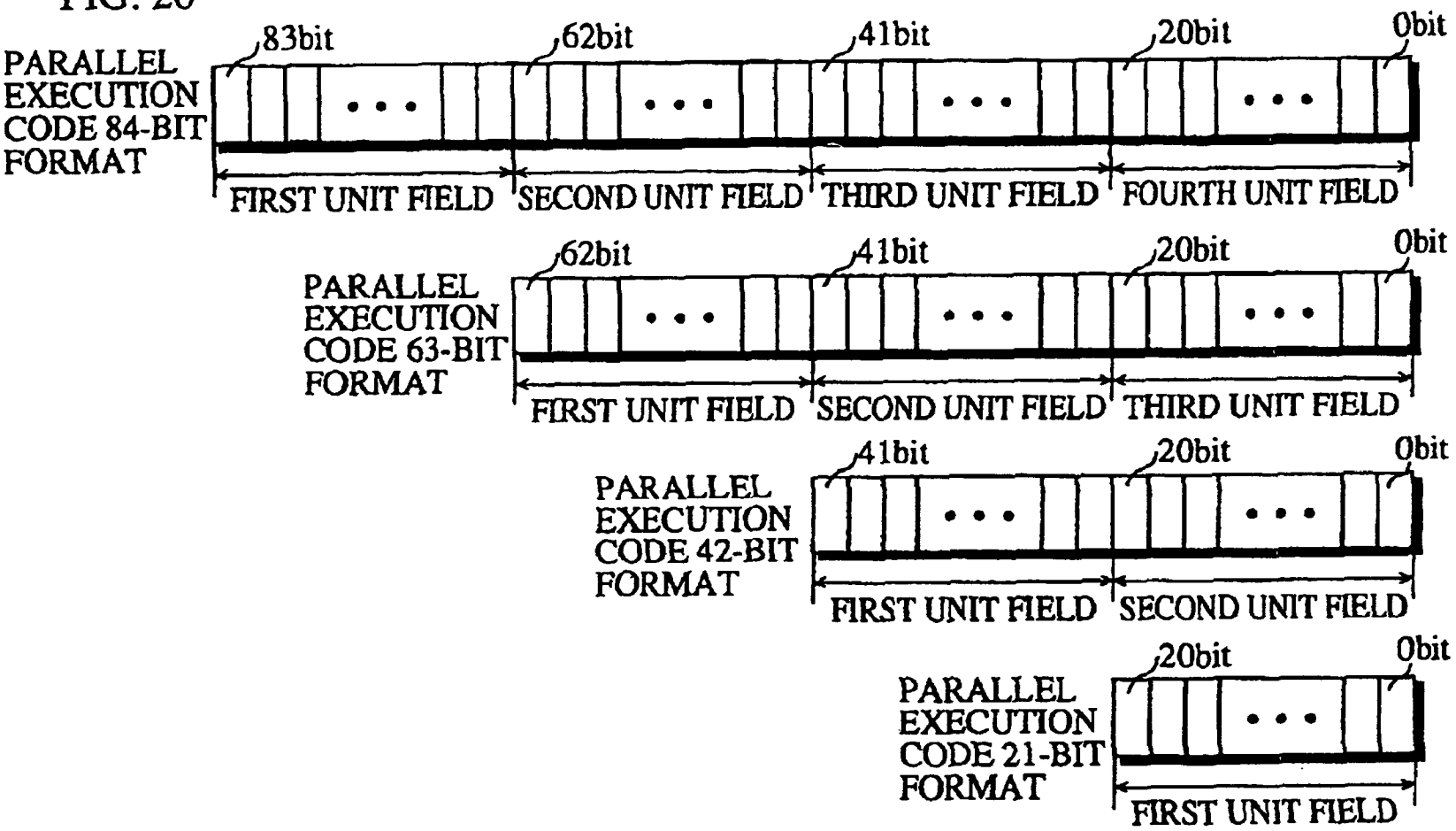
FIG. 20 shows the format of parallel execution codes.

FIG. 20 shows the format of parallel execution codes. In FIG. 20, the possible sizes of the parallel execution codes are 21 bits, 42 bits, 63 bits, and 84 bits. Here, 84-bit parallel execution codes can be used to assign the combinations of short and long instructions shown as patterns F, H, I and J in FIG. 7, and 63-bit parallel execution codes can be used to assign the combination of short and long instructions shown as patterns D, E, and G in FIG. 7. In the same way, 42-bit parallel execution codes can be used to assign the combinations of short and long instructions shown as patterns B and C in FIG. 7, and a 21-bit parallel execution code can be used to assign one short instruction, as shown by pattern A in FIG. 7. These parallel execution codes include internal fields (unit fields) that are each 21-bits in size. One 21-bit unit described in the first embodiment can be assigned to each of these unit fields. The unit fields in parallel execution code are assigned numbers starting from the MSB, and so are respectively called the first, the second, the third, and the fourth unit fields. Of these unit fields, the first to third unit fields can be decoded in order by the first instruction decoder 33~third instruction decoder 35.

When the pattern D in FIG. 7 is assigned, a short instruction is assigned to the first unit field of 63-bit parallel execution code and a long instruction is assigned to the second and third unit fields in the 63-bit parallel execution code. When the pattern E in FIG. 7 is assigned, a long instruction is assigned to the first and second unit field of 63-bit parallel execution code and a short instruction is assigned to the third unit field in the 63-bit execution code. When the pattern H in FIG. 7 is assigned, two short instructions are assigned to the first and second unit fields of 84-bit parallel execution code and a long instruction is assigned to the third and fourth unit fields in the 84-bit parallel execution code.

Note that when two or more instructions are assigned to a parallel execution code, there are cases where parallel execution is not possible. As one example, when the supplying of instructions from the instruction supplying/issuing unit 20 of the processor in the first embodiment cannot keep up with the decoding of instructions by the decoding unit 30, the two or more instructions assigned to the same parallel execution code will be executed in two or more cycles. This means that only an instruction positioned in the first unit field of the parallel execution code is executed in a first cycle, with the instruction positioned in the second unit field of the parallel execution code being executed in the next cycle. Accordingly, the instruction conversion apparatus has to assign short and long instructions to unit fields in a way that proper execution will be properly performed even if the plurality of instructions in a set of parallel execution code are executed in two or more cycles.

The setting of the lengths of sets of parallel execution code at 21, 42, 63, or 84 bits can be made by the instruction conversion apparatus setting the parallel execution boundaries shown in the first embodiment in the parallel execution codes. Parallel execution codes that can have one of four lengths are serially arranged, and are then divided into 63-bit lengths. In this way, the packet sequence shown in the first embodiment is obtained as a sequence of object codes.

The parallel execution codes generated in this way must satisfy the two conditions given below.

The first condition is that the plurality of instructions included in a parallel execution code do not violate the restrictions of the processor regarding the available computing resources.

The second condition is that the instructions are assigned within the parallel execution code in accordance with the restrictions on parallel execution by the processor.

The restrictions regarding the instructions that can be arranged between the parallel execution boundaries are as follows.

(1) The total number of instructions in a parallel execution code does not exceed three.

(2) The total number of resources in the processor used by the instructions in a parallel execution code does not exceed three ALUs, 1 LD/ST unit and a branch unit.

(3) The combination of instruction sizes in a parallel execution code is one of the patterns A~H shown in FIG. 7.

Construction of the Instruction Conversion Apparatus

The following describes the instruction conversion apparatus of the present embodiment, with reference to the drawings. This instruction conversion apparatus is of a format that is conventionally used in the art, which is to say, a recording medium storing executable software for a compiler and linker that have the equivalent functions of an instruction conversion apparatus. Such recording media are generally distributed and sold as software packages. A user can purchase and install such a software package into a general-purpose computer that can thereafter function as an instruction conversion apparatus simply by processing according to the installed software. Since this is the common method for implementing an instruction conversion apparatus, the software for achieving an instruction conversion apparatus is more important than the hardware resources, such as the processor and memory, of the general-purpose computer on which the software is run. Software that has such a complicated processing content is generally composed of a number of subroutines and work areas, so that each of these subroutines and work areas should be considered a separate construction element. However, it is common for such subroutines and work areas to be arranged into a library by a conventional operating system, compiler, or linker, and such components will not be explained here. Accordingly, the following explanation will focus on the functions of the subroutines and work areas that are required to achieve the functions of an instruction conversion apparatus.

Figure 21:
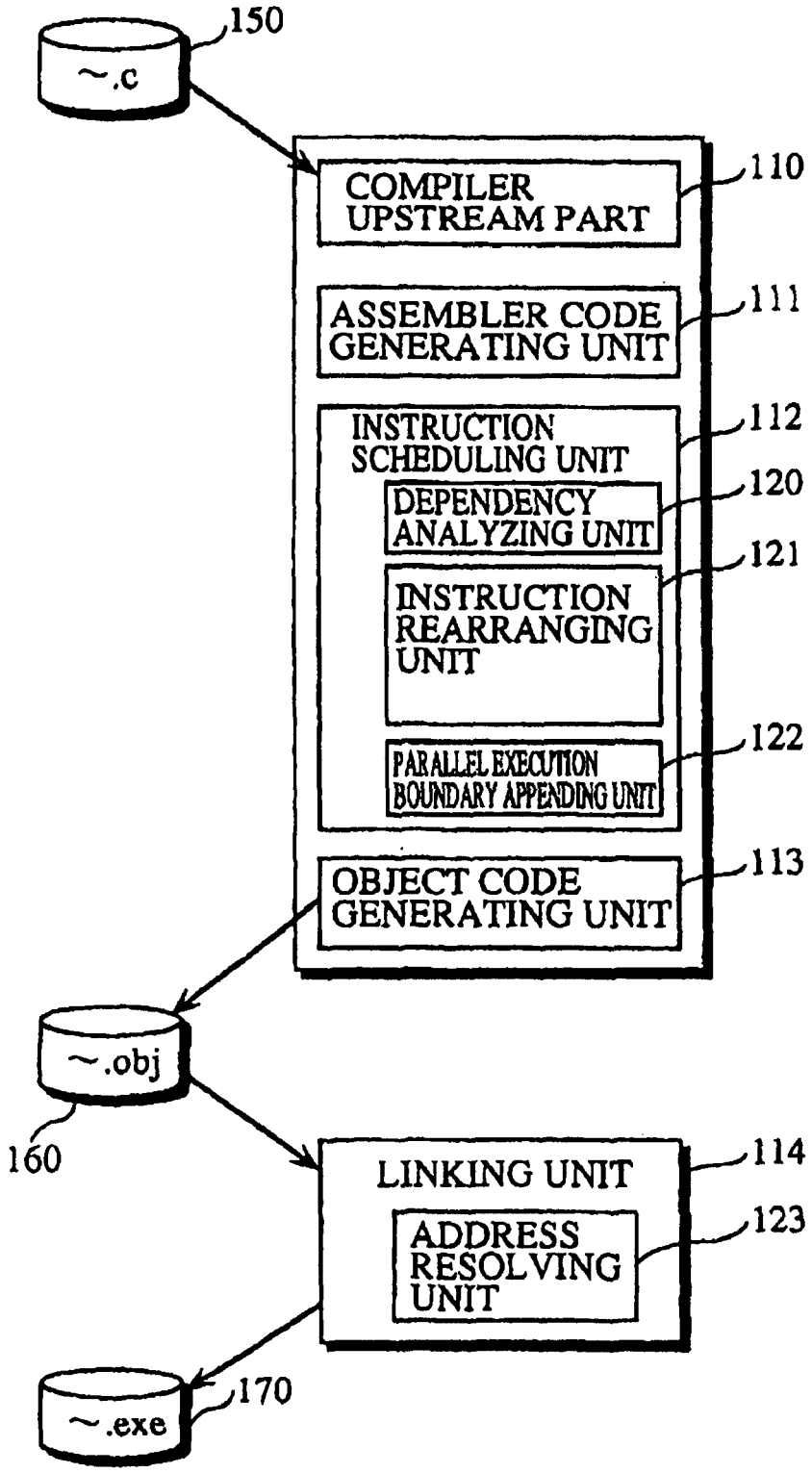
FIG. 21 is a block diagram showing the construction of the instruction conversion apparatus of the present embodiment and the related data.

FIG. 21 is a block diagram showing the construction of the instruction conversion apparatus of the present embodiment and the related data.

The construction of the present instruction conversion apparatus can be broadly divided into the following two groups. The first group generates object codes 160 from source codes 150 that are written in a high-level language, comprises the compiler upstream part 110, the assembler code generating unit 111, the instruction scheduling unit 112, and the object code generating unit 113, and corresponds to a conventional compiler. The second group links a plurality of object codes 160 and generates the final executable codes 70, comprises the linking unit 114, and corresponds to a conventional linker.

Compiler Upstream Part 110

The compiler upstream part 110 reads the source program 150 that is stored as a file. This source program 150 is written in a high-level language, so that the compiler upstream part 110 performs a syntactic and semantic analysis on the source program 150 and generates internal representation codes and an internal representation program composed of a plurality of internal representation codes. The compiler upstream part 110 also optimizes this internal representation program as necessary to reduce the code size and/or execution time of the executable codes that are finally generated.

Assembler Code Generating Unit 111

The assembler code generating unit 111 generates assembler codes from the internal representation codes that have been generated and optimized by the compiler upstream part 110 and by doing so generates an assembler program composed of a plurality of assembler codes.

The processing of the compiler upstream part 110 and assembler code generating unit 111 does not relate to the gist of the present invention and may be achieved through the processing performed by a conventional instruction conversion apparatus. Accordingly, such processing will not be described in this specification. When assembler codes are generated, it is assumed that it is possible to judge whether the assembler codes correspond to long instructions or short instructions. Note that assembler codes that include a displacement as an operand are provisionally assumed to short instructions at this stage.

Instruction Scheduling Unit 112

The instruction scheduling unit 112 analyzes dependencies between instructions in the assembler codes generated by the assembler code generating unit 111, performs instruction scheduling (reordering of instructions), and adds parallel execution boundaries, assigning assembler codes that can be executed in parallel to a same parallel execution code. When doing so, the instruction scheduling unit 112 also considers the case where instructions assigned to a same parallel execution code are executed separately in two cycles, and assigns instruction to unit fields so as to ensure that there will be no breakdown in the dependencies even if the instructions are executed in different cycles. To perform such assigning, the instruction scheduling unit 112 includes a dependency analyzing unit 120, an instruction rearranging unit 121, and a parallel execution boundary appending unit 122. To simplify the explanation, the instruction scheduling unit 112 is assumed here to process the assembler codes in basic block units.

The dependency analyzing unit 120 analyzes the dependencies between instructions in a basic block and produces a dependency graph. In this specification, there are the following three types of dependencies between instructions:

- data dependence—dependency between an instruction that defines a resource and an instruction that refers to the same resource;
- anti-dependence—dependency between an instruction that refers to a resource and an instruction that defines the same resource; and
- output dependence—dependency between an instruction that defines a resource and another instruction that defines the same resource.

Rearranging the original order of instructions so that instructions that exhibit any of the above types of dependencies are interchanged will affect the meaning of the program. Accordingly, such dependencies need to be maintained when rearranging the instructions.

The dependency analyzing unit 120 refers to the result of its analysis, generates a node for each instruction that is included in a basic block, and generates edges (arrows) joining pairs of instructions that exhibit a dependency. As one example, FIG. 22B shows a dependency graph that corresponds to the assembler codes shown in FIG. 22A. In FIG. 22A, instruction1 "ld (mem1),R0" and instruction2 "add 1,R0" have a data dependency regarding register R0. In the same way, instruction2 "add 1, R0" and instruction3 "st R0, (mem2)" have a data dependency regarding register R0.

Instruction3 "st R0,(mem2)" and instruction4 "mov R1,R0" have an anti-dependence regarding register R0.

In the same way, instruction4 "mov R1,R0" and instruction6 "add R3,R0" have a data dependency regarding register R0, instruction5 "mov R2,R3" and instruction6 "add R3,R0" have a data dependency regarding register R3, and instruction6 "add R3,R0" and instruction7 "st R0,(mem3)" have a data dependency regarding register R0.

Instructions that exhibit a data dependency are joined in FIG. 22B by solid lines, while instructions that exhibit an anti-dependence or an output dependence are joined by broken lines. In FIG. 22B, instruction4 "mov R1,R0", instruction5 "mov R2,R3", and instruction6 "add R3,R0" are joined in a Y shape, with instruction4 "mov R1,R0" being further joined by a broken line to instruction3 "st R0,(mem2)". In this dependency graph, the arrows are interpreted as the output order that should be respected when issuing instructions from the instruction registers A231–D234 to the instruction decoders 33~35.

A dependency graph may be generated according to a conventional method, such as that disclosed in the paper Instruction Scheduling in the TOBEY compiler (R. J. Blainey, IBMJ.RES.DEVELOP. Vol 38 No. 5 September 1994).

The instruction rearranging unit 121 refers to the dependency graph generated by the dependency analyzing unit 120 and rearranges the instructions in a basic block, assigning one or more instructions to each parallel execution code. This rearranging by the instruction rearranging unit 121 is analogous to a game where branches are cut off a tree. FIGS. 22A~22F show the procedure of this branch-cutting game. In the game, the dependency graph generated by the dependency analyzing unit 120 is considered to be a tree whose branches are combinations of nodes and edges. Nodes that are indicated by an edge but do not themselves indicate any other edges (nodes 1, 5, and 8 in FIG. 22C) are considered to be the end branches.

In FIG. 22D, the player selects node 1 out of the end branches and cuts off this node. Once node 1 has been removed, node 2 becomes an end branch, so that the player next selects and cuts off one node out of the end branches nodes 2, 5, and 8. In FIG. 22E, the player selects node 8 out of the end branches and cuts off this node.

The player continues to cut off branches as described above, with the nodes in the cut-off branches being arranged into a parallel execution code in the order in which the nodes are cut off. An arrangement of parallel execution codes that respects the dependencies in the program is obtained when all of the branches have been cut off the tree. The lower the number of parallel execution codes, the higher the score of the player (which is to say, the better the parallel execution codes). This completes the description of the branch-cutting game as an analogy to the procedure for rearranging nodes.

Figure 23A:
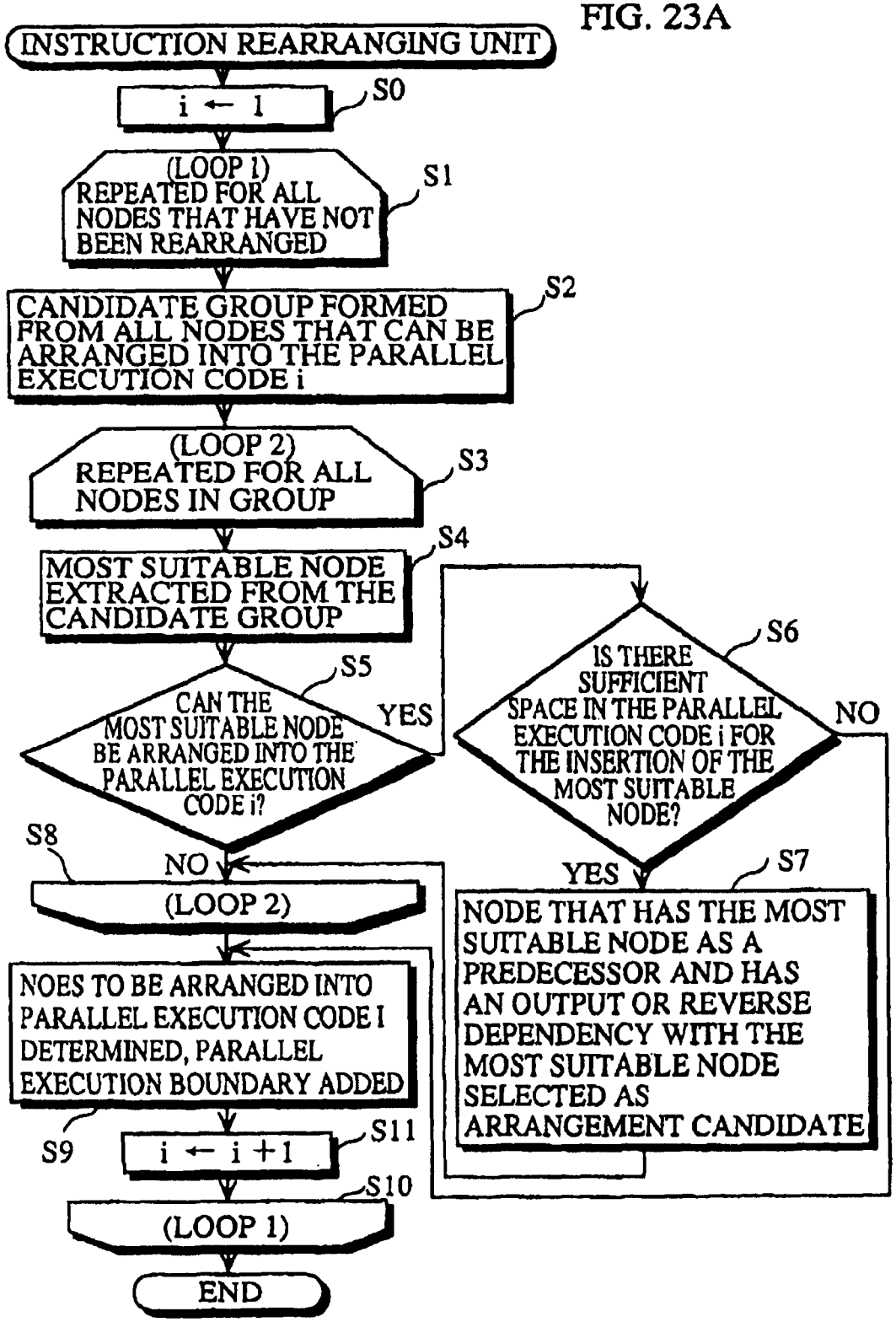
FIG. 23A is a flowchart showing the processing of the instruction rearranging unit 121.

The instruction rearranging unit 121 performs this rearranging in accordance with the procedure in the flowchart shown in FIG. 23A. In this explanation, the expression "arranging" refers to the processing that assigns up to three instructions in the four unit fields in a parallel execution code. An arrangement of instructions whose assignment to a parallel execution code may be changed is called a provisional arrangement, while an arrangement that will not be changed is called a definite arrangement.

The expression "arrangement candidate" refers to a node that corresponds to an end branch in the branch-cutting game described above, which can be a node that has no predecessors or a node whose predecessors have all been provisionally arranged. The nodes in the dependency graph that are currently arrangement candidates change as the process arranging instructions into parallel execution codes progresses.

The following explanation describes each step in the arrangement process. In step S0, the instruction rearranging unit 121 sets the variable i st "1". This variable i indicates one of the parallel execution codes included in the object program that will be generated by the processing hereafter. In this example, each parallel execution code has an initial length of 84 bits. The following step, step S1, forms a loop process (loop1) together with step S10. As a result, the processing in steps S2~S9 is repeated for each node in the dependency graph generated by the dependency analyzing unit 120.

In step S2, the instruction rearranging unit 121 extracts all nodes that are assignment candidates for a present parallel execution code from the dependency graph and forms an arrangement candidate group of such nodes. In the first iteration of loop1, nodes that have no predecessors are selected to form the arrangement candidate group.

Step S3~S8 include loop statements (loop2) forming a loop that determines which nodes in the arrangement candidate group formed in step S2 should be assigned to a same parallel execution code. This loop process can end due to any of two circumstances. The first circumstance is when all of the arrangement candidates in the arrangement candidate group have been arranged into a parallel execution code so that no assignment candidates remain. This corresponds in the branch-cutting game to a case where there are few end branches (which is to say, there are few arrangement candidates). There are cases where no assignment candidates remain after only one or two iterations of loop2. In such cases, loop2 ends due to this first circumstance.

The second circumstance is where the four unit fields in the present parallel execution code have been filled with arrangement candidates, so that there is no more room in the parallel execution code. In this second circumstance, some of the arrangement candidates in the arrangement candidate group cannot be arranged into the parallel execution code and so are left behind.

In step S9, the nodes that are to be arranged into the parallel execution code are determined, regardless of which of the two circumstances resulted in the exit from loop2. In detail, the instructions that correspond to the nodes in the arrangement candidate group are extracted from the original instruction sequence and parallel execution boundaries are added by the parallel execution boundary appending unit 122 shown in FIG. 21. When only one short instruction is determined as being arranged into the parallel execution code, in step S9 a parallel execution boundary is set for this short instruction. By doing so, the parallel execution code is set as having a data length of 21 bits. When one long instruction is determined as being arranged into the parallel execution code, in step S9 a parallel execution boundary is set for this long instruction. By doing so, the parallel execution code is set as having a data length of 42 bits. In the same way, when a combination of one short and one long instruction is determined as being arranged into the parallel execution code, in step S9 a parallel execution boundary is set for the long instruction in the combination. By doing so, the parallel execution code is set as having a data length of 63 bits.

When a short-short-long instruction combination is determined as being arranged into the parallel execution code, in step S9 a parallel execution boundary is set for the long instruction in the combination. By doing so, the parallel execution code is set as having a data length of 84 bits.

In step S1, variable is incremented by "1" so as to make it indicate the next parallel execution code into which instructions are to be arranged. The processing then returns to step S10.

When the processing moves to step S2 in a second or later iteration of loop1, the provisional arrangement of one of the instructions will be been completed. As a result, a node that has the provisionally arranged instruction as a predecessor can hereafter be selected as part of the arrangement candidate group.

When loop2 ends due to the second circumstance, the nodes that were not arranged and so were left behind are also selected as arrangement candidates. This shows that the nodes in the dependency graph that are selected as arrangement candidates change according to which nodes have been provisionally arranged into a parallel execution code and to which nodes could not be provisionally arranged into the parallel execution code and so were left behind.

In loop2, the instruction rearranging unit 121 performs the processing described below (steps S4–S7) for each arrangement candidate in the arrangement candidate group.

Step S4 corresponds to the player of the branch-cutting game selecting an end branch to cut. In step S4, the node that is considered to be the most suitable for arranging at the present time is taken from the arrangement candidate group. The instruction rearranging unit 121 selects this most suitable node by heuristically selecting an instruction whose arrangement is believed to cause the greatest reduction in execution time for all instructions in the basic block. Here, a node situated at an end of the branch in the dependency graph with the longest total execution time is selected. When more than one node (instruction) satisfy this criterion, the instruction that comes first in the original instruction sequence is selected.

Figure 23B:
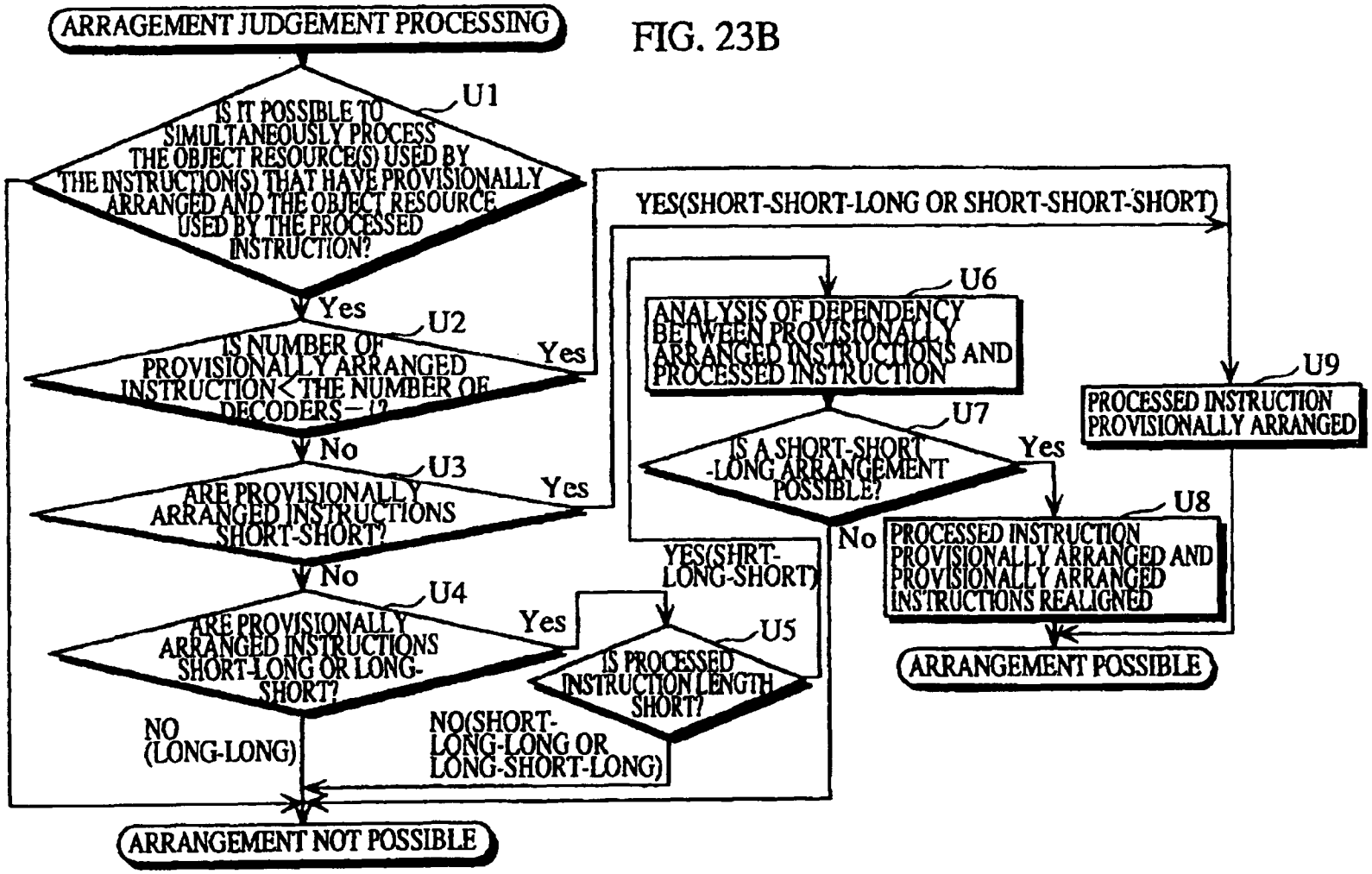
FIG. 23B is a flowchart showing the processing that judges whether arrangement is possible.

In step S5, the instruction rearranging unit 121 judges whether the most suitable node can be arranged into the present parallel execution code, according to the procedure shown in FIG. 23B. When this is not possible in steps S4~S7 will be performed for a different assignment candidate in the assignment candidate group.

When it is possible to arrange the most suitable node into the parallel execution code, the processes moves from step S5 to step S6, the instruction rearranging unit 121 judges whether there is sufficient space in the 84-bit parallel execution code to arrange the present arrangement candidate.

If not, the processing leaves loop2 and returns to step S9. If so, the judgement "Yes" is made in step S6 and the processing advances to step S7.

As a general rule, the processing in steps S4–S6 is repeated and the instructions are progressively assigned to parallel execution codes. It should be noted here that even if there is still space in a parallel execution code for the arrangement of another instruction, there will still be cases where no instruction will be arranged due to there being no more arrangement candidates. When there is only one assignment candidate, processing of all the assignment candidates will be completed by a single iteration of loop2, so that the processing will then return to step S9. However, if nodes could somehow be added as assignment candidates when the number of assignment candidates is low, further iterations of loop2 would be possible. Nodes that have an anti-dependence or an output dependence with the most suitable node are nodes that were not selected as arrangement candidates in step S2 but which may be later added as assignment candidates. Such nodes cannot be executed before the most suitable node, but can be executed in the same cycle as the most suitable node. As a result, when the judgement "Yes" is given in the flowchart in FIG. 23A, the processing moves to step S7 and nodes that have only the most suitable node that is presently being arranged as a predecessor and have an anti- or an output dependence with the most suitable node are added to the arrangement candidate group as arrangement candidates. After this, the processing moves to step S8 so that the processing in steps S4–S7 is performed for the newly added arrangement candidates.

The following describes method used in FIG. 5 to judge whether arrangement is possible, with reference to the flowchart shown in FIG. 23B.

In step U1, the instruction rearranging unit 121 checks whether the instructions included in the present parallel execution code satisfy the restrictions set by the number of calculating resources. In detail, the instruction rearranging unit 121 judges whether the processor will be able to simultaneously process the instruction being judged in addition to the instructions that have already been provisionally arranged into the parallel execution code. If not possible, the instruction rearranging unit 121 judges that the present instruction cannot be arranged into the parallel execution code.

Next, in step U2, the instruction rearranging unit 121 judges whether the number of instructions that have already been provisionally arranged into the present parallel execution code is less than the number of decoders in the processor minus one. If so, the instruction rearranging unit 121 judges that the present instruction can be arranged into the parallel execution code and the processing advances to step U9. In this example, the number of decoders provided in the processor of the first embodiment is three, so that the judgement in step U2 is satisfied if 0 or 1 instructions have been provisionally arranged. When this is the case, the instruction presently being analyzed (also referred to as the "processed instruction") will definitely fit into the parallel execution code regardless of whether it is a short or long instruction, so that the processing proceeds to step U9.

When the number of instructions that have already been provisionally arranged into the present parallel execution code is not less than the number of decoders in the processor minus one, the judgement "No" is given in step U2 and the processing proceeds to step U3. In step U3, the number of instructions that have already been provisionally arranged is two, so that a judgement is performed to see whether both instructions are short instructions. Here, when two short instructions have already been arranged into the parallel execution code i, the processed instruction will definitely fit into the parallel execution code i regardless of whether it is a short instruction or a long instruction. This is because the target processor is capable of executing both short-short-short and short-short-long instruction combinations. Consequently, the processing advances to step U9.

In step U9, the processed instruction is provisionally arranged into the parallel execution code. When no instructions have yet been arranged into the parallel execution code i, the processed instruction is arranged into the first unit field in the parallel execution code. When instructions have been arranged into the first–third unit fields of the parallel execution code i, the processed instruction is arranged into the first open unit field in the parallel execution code i. In detail, when an instruction has already been arranged into the first unit field, the processed instruction is arranged into the second unit field. Conversely, when one or two instructions have already been arranged into the first and second unit fields, the processed instruction is arranged into the third unit field.

When the judgement in step U3 is negative, the processing advances to step U4. In step U4, the instruction rearranging unit 121 judges whether the instructions arranged into the first~third unit fields in the parallel execution code i are a short-long instruction combination or a long-short instruction combination. Here, if the provisionally arranged instructions are a long-long combination, it will not be possible for a further instruction to be executed in parallel, so that the arrangement of the processed instruction is judged to be impossible. Conversely, when the provisionally arranged instructions are one of the two combinations given above, the processing advances to step U5.

In step U5, the instruction rearranging unit 121 judges whether the processed instruction that it is trying to arrange is a short instruction. If the processed instruction is a long instruction, arrangement of this instruction will produce a long-short-long or short-long-long instruction combination in the parallel execution code i, neither of which can be executed by the target processor. Consequently, the instruction rearranging unit 121 judges that arrangement is impossible.

On finding that the processed instruction in step U5 is a short instruction, the instruction rearranging unit 121 uses the dependency graph to analyze any dependencies between the processed instruction and instructions in the program that have already been provisionally arranged. Here, dependencies between the arrangement candidates are analyzed because arrangement candidates may have been added in step S7 in FIG. 23A. In detail, if the processed instruction is a node that was added in step S7, there is a possibility that this processed instruction will have an anti-dependence or output dependence with one or more of the provisionally arranged instructions. In the example shown in FIG. 22B, a broken-line edge is present between instruction3 "st R0,(mem2)" and instruction4 "mov R1,R0", showing that an anti-dependence exists between these instructions. In this dependency graph, there will be no problems if instruction3 "st R0,(mem2)"—instruction5 "mov R2,R3" are assigned to the unit fields of the parallel execution code i in the order instruction3 "st R0,(mem2)"-instruction5 "mov R2,R3"-instruction4 "mov R1,R0". This is because even if the circumstances of the target processor dictate that instruction3 "st R0,(mem2)" is executed in a different cycle to instruction5 "mov R2,R3" and instruction4 "mov R1,R0", instruction3 "st R0,(mem2)" will be executed first, with instruction5 "mov R2,R3" and instruction4 "mov R1,R0" being executed later. Consequently, the anti-dependence between the instructions is properly maintained.

If instruction3 "st R0,(mem2)"~instruction5 "mov R2,R3" are assigned to the unit fields of the parallel execution code i in the order instruction4 "mov R1,R0" instruction5 "mov R2,R3"-instruction3 "st R0,(mem2), however, there is the risk that the anti-dependent will be broken. This is because the circumstances of the target processor may dictate that instruction4 "mov R1,R0" is executed in a different cycle to instruction5 "mov R2,R3" and instruction3 "st R0,(mem2)". If so, instruction4 "mov R1,R0" will be executed first, with instruction5 "mov R2,R3" and instruction3 "st R0,(mem2)" being executed later. This results in the anti-dependence being broken. In this way, when two arrangement candidates that exhibit dependency are arranged into the same parallel execution code, there is the risk of an anti-dependence being broken, so that the analysis of dependencies in step U6 is required.

In step U7, the instruction rearranging unit 121 refers to the results of the analysis performed in step U6 and judges whether it is possible to rearrange the instructions that have been provisionally arranged and the processed instruction to produce a short-short-long instruction arrangement. When there is no anti-dependence or output dependence in the program between the processed instruction and the provisionally arranged instructions, these instructions may be rearranged to produce a short-short-long instruction arrangement, so that the instruction rearranging unit 121 rearranges the instructions in this way. Conversely, when there is anti-dependence or output dependence in the program between the processed instruction and the provisionally arranged instructions, a short-short-long arrangement where the anti- or output dependence is not broken is selected. If the anti- or output dependence is broken regardless of how the short instructions are arranged, arrangement of the processed instruction in the present parallel execution code is judged to be impossible. If there is an arrangement where the dependency is not broken, the instruction are rearranged in accordance with such arrangement.

Step U8 is performed if the judgement in step S7 is affirmative. The instruction rearranging unit 121 arranges the processed instruction and rearranges the provisionally arranged instructions into the alignment that satisfies the criteria judged in step U7.

Object Code Generating Unit 113

The following explanation returns to FIG. 21 to describe the components of the instruction conversion apparatus. The object code generating unit 113 divides the parallel execution codes, which have been assigned instructions and given parallel execution boundaries by the instruction scheduling unit 112, into packet units. The packet sequence that is made up of the packets produced by this division are then stored in a file as relocatable object codes and the resulting file is outputted.

Linking Unit 114

The linking unit 114 links a plurality of relocatable object codes that were generated in different compiling units to produce one linked sequence, refers to symbol information and calculates the final address of each label, and determines the size of each label. The symbol information referred to here is information showing the actual address of the parallel execution code to which each label in the object code is assigned.

The linking unit 114 of the present invention differs from a conventional linker by including an address resolving unit 123. The address resolving unit 123 resolves addresses in object code that include unresolved addresses and can be realized by software the executes the procedure shown in FIG. 24.

Figure 24:
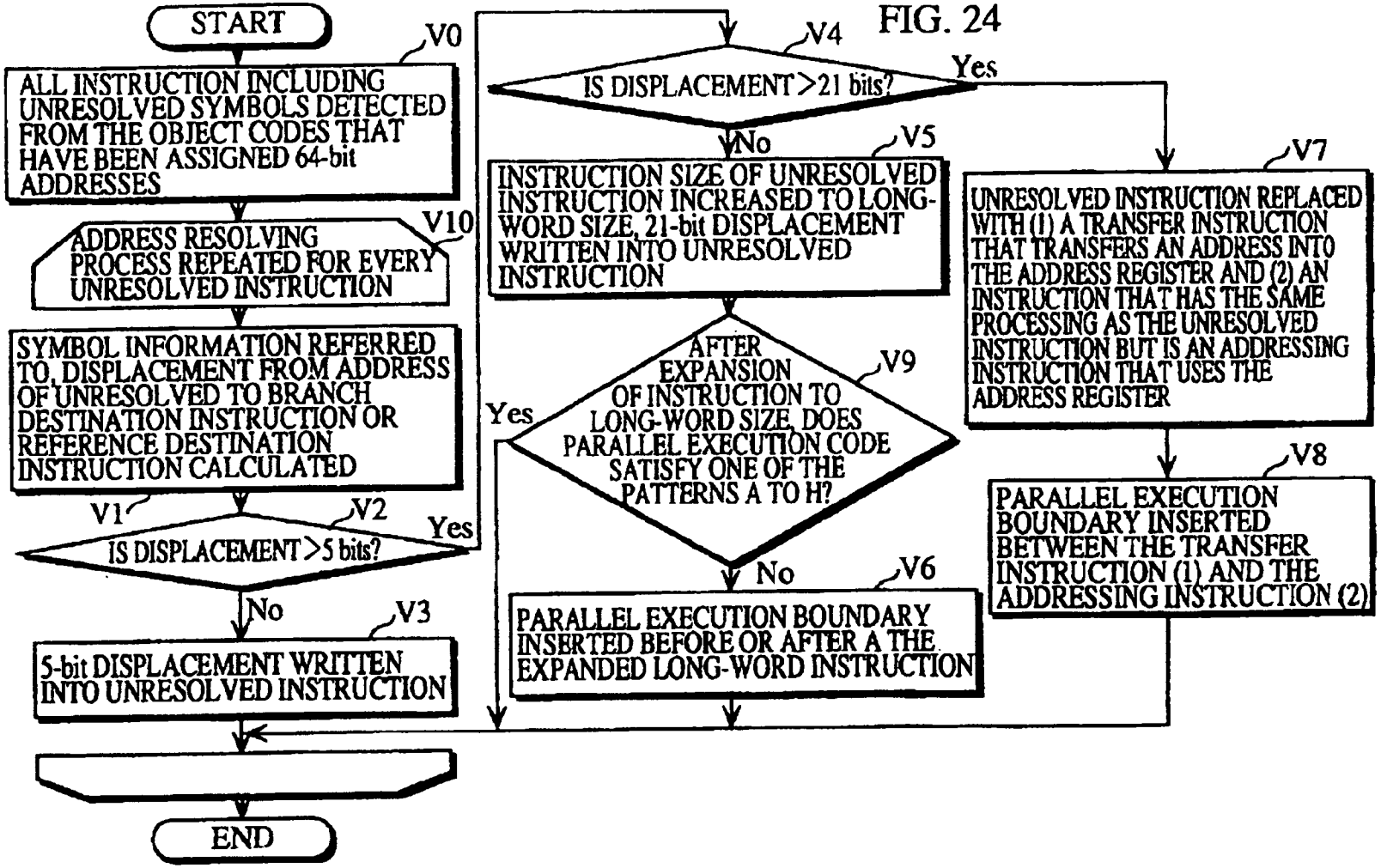
FIG. 24 is a flowchart showing the processing of the address resolving unit 123 provided inside the linking unit 114.

FIG. 24 is a flowchart showing the procedure executed by the address resolving unit 123 which forms part of the linking unit 114.

In step V0, the address resolving unit 123 extracts all instructions (hereafter called "unresolved instructions") that include an unresolved label from the object codes that have been assigned addresses. Step V10 is a loop statement for having the processing in step V1–step V9 repeated for each instruction extracted in step V0. In step V1, the address resolving unit 123 refers to the symbol information and calculates a displacement to the branch or reference destination from the address of the unresolved instruction. When the address of the unresolved instruction is close to the branch or reference destination, a small value will be given as the displacement, while the address of the unresolved instruction is far from the branch or reference destination, a large value will be given as the displacement.

Once the displacement has been calculated, the processing advances to step V2, where the address resolving unit 123 judges whether the displacement can be expressed by a 5-bit value. If so, the processing advances to step V3.

When the assembler codes are rearranged, instructions that include displacements are regarded as short instructions and are arranged into parallel execution codes as such. When the displacement can be expressed by a 5-bit value, the displacement can be written into the operand of a short instruction without causing any problems. As a result, the determined displacement is written into the unresolved instruction, thereby completing the processing of the present unresolved instruction.

On the other hand, when the determined displacement cannot be expressed by a 5-bit value, the displacement cannot be written into the operand of a short instruction. As a result, the judgement "Yes" is given in step V2 and the processing proceeds to step V4. In step V4, the address resolving unit 123 judges whether the displacement cannot be expressed by a 21-bit value. If not, the judgement "No" is given and the processing advances to step V5. In other words, the displacement can be written as an operand if the unresolved instruction is converted to a long instruction, so that in step V5, the instruction size of the unresolved instruction is increased to make the unresolved instruction a long instruction, and the displacement is written in the long instruction as a 21-bit value. Note that there can be cases where this extension of an unresolved instruction results in the parallel execution code including the unresolved instruction violating the restrictions governing the possible combinations of instructions in a parallel execution code, meaning that simultaneous execution will no longer be possible for the instruction in the parallel execution code. As a result, once an unresolved instruction has been extended to become a long instruction, step V9 judges whether the parallel execution code still satisfies one of the patterns in A~H shown in FIG. 7. If this is not the case, the processing proceeds to step V6 where a parallel execution boundary is inserted before or after the unresolved instruction to ensure that parallel execution will still be possible.

When the calculated displacement cannot be expressed by a 21-bit value, the judgement "Yes" is given in step V4 and the processing proceeds to step V7. When the calculated displacement exceeds 21 bits, the displacement cannot be written even if the unresolved instruction is expanded to become a long instruction. In this case, the unresolved instruction is processed by replacing it with a long instruction (1) and a short instruction (2). The processing content of these instructions is as follows.

Long instruction (1): transfer instruction that transfers an address into a register.

Short instruction (2) instruction that executes the same processing as the unresolved instruction in addressing mode using the register into which the address has been transferred.

The register that is used in addressing mode is specially reserved for this division of instructions.

In step V7, there is a data dependency over the register between the long instruction (1) and the short instruction (2) used to replace the unresolved instruction, meaning that these instructions cannot be executed simultaneously. Consequently, step V8 inserts a parallel execution boundary between the long instruction (1) and the short instruction (2).

As a result of the above processing, even if the determination of an unresolved address in the linking process results in a change in the length of instructions, it is still guaranteed that parallel execution codes which can be executed by the target processor will be outputted.

As described above, when three instructions to be executed in parallel are composed of two short and one long instructions, the instruction conversion apparatus of the present invention rearranges the instructions into a short-short-long instruction pattern. Since both short instructions and long instructions have their opcodes located in the first instruction unit, the above instruction pattern has all opcodes arranged in the first three instruction units. In such case, the decoders of the target processor can decode the first three units in a parallel execution code and so have the processor execute the maximum of three instructions in parallel.

Operation of the Processor

The following describes the operation of the processor of the first embodiment when decoding and executing specific instructions.

Figure 25:
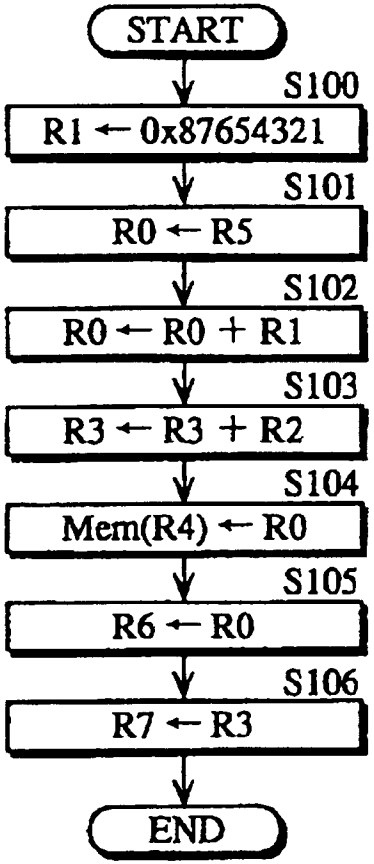
FIG. 25 is a flowchart showing an example of a process that handles a 32-bit constant.

FIG. 25 is a flowchart showing an example of a process that handles a 32-bit constant.

In FIG. 25, the 32-bit constant "0×87654321" is transferred into register R1 (step S100). The stored value of register R5 is transferred to register R0 (step 101). The stored value of register R0 is added to the stored value of register R1 (step S102). The stored value of register R3 is added to the stored value of register R2 (step S103). The stored value of register R0 is stored at the address in the memory shown by the stored value of register R4 (step S104). The stored value of register R0 is transferred to register R6 (step S105). Finally, the stored value of register R3 is transferred to register R7 (step S106).

Figure 26A:
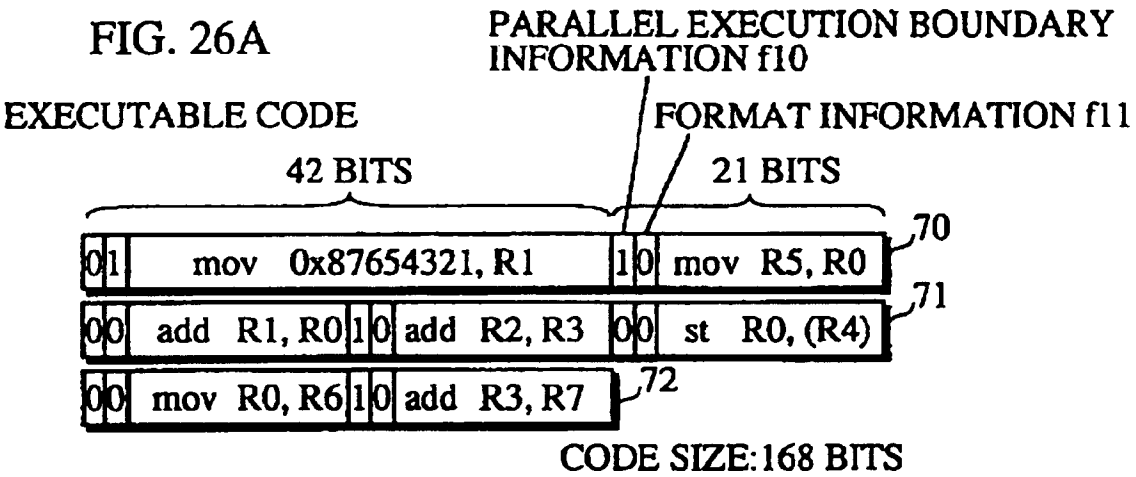
FIG. 26A and FIG. 26B respectively show an example of the executable codes to a program that has the present processor execute the processing shown in FIG. 25 and an execution image.
Figure 26B:
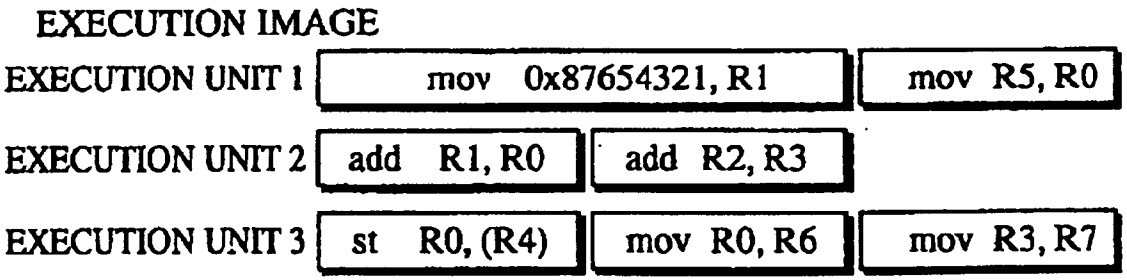

FIG. 26A shows an example of the executable codes in a program that has the present processor execute the processing shown in FIG. 25, and FIG. 26B shows an execution image.

The program is composed of seven instructions. These instructions are supplied in the three packets 70~72. The processing in each instruction is expressed by the mnemonics located in each field of the executable codes. As specific examples, the mnemonic "mov" represents the transfer of a constant or the stored value of a register into a register, the mnemonic "add" represents the addition of a constant or the stored value of a register to the stored value of a register, and the mnemonic "st" represents the transfer of the stored value of a register into memory.

Note that constants are expressed in hexadecimal. Also, the expression "Rn (n=0–31)" indicates one of the registers in the register file 43. The parallel execution boundary information f10 and the format information f11 are each expressed as "1" or "0".

The following describes the operation of the processor for each execution unit shown in FIG. 26B when processing according to the flowchart shown in FIG. 25.

Execution Unit 1

Packet 70 is supplied from the memory, and the units in packet 70 are transferred to the instruction register 23 in order. After this, the instruction issuing control unit 31 refers to the parallel execution boundary information f10 and format information f11 of each unit and controls the issuing of instructions. In detail, the format information f11 of the first unit is "1", so that the instruction issuing control unit 31 links the first unit and second unit and treats them as one instruction. The no operation instruction flag of the second instruction decoder 34 is set at "1", and the decoding of the second unit as an instruction is invalidated. The parallel execution boundary information f10 of the first unit is "0", and the parallel execution boundary information f10 of the third unit is "1", so that the instruction issuing control unit 31 issues the first~third units as two instructions. Since all of the supplied units are issued, no units are accumulated in the instruction buffer 22.

The executing unit 40 transfers the constant "0×87654321" to register R1 and transfers the stored value of register R5 to register R0.

Execution Unit 2

Packet 71 is supplied from memory, and the units in packet 71 are transferred to the instruction register 23 in order. The format information f11 of all three units is "0", so that each unit forms a 21-bit instruction. The parallel execution boundary information f10 of the first unit is "0", and the parallel execution boundary information f10 of the second unit is "1", so that the instruction issuing control unit 31 issues the first and second units as two instructions. The third unit is not issued and so is accumulated in the instruction buffer 22.

The executing unit 40 adds the stored value of register R0 to the stored value of register R1 and stores the result in register R0. The executing unit 40 also adds the stored value of register R3 to the stored value of register R2 and stores the result in register R3.

Execution Unit 3

Packet 72 is supplied from memory, and one unit accumulated in the instruction buffer 22 and the two units in packet 72 are transferred to the instruction register 23 in order. The format information f11 of all three units is "0", so that each unit forms a 21-bit instruction. The parallel execution boundary information f10 of the first unit and the second unit is "0", and the parallel execution boundary information f10 of the third unit is "1", so that the instruction issuing control unit 31 issues all three units as three separate instructions. In this case, all of the supplied units are issued as instructions.

The executing unit 40 transfers the stored value of register R0 to the address in the memory shown by the stored value of register R4, transfers the stored value of register R0 to register R6, and transfers the stored value of register R3 to register R7.

As described above, the program that has the present processor execute the processing shown in FIG. 25 in three execution units. The executable codes are composed of one 42-bit instruction and 6 21-bit instructions, so that the total code size is 168 bits.

Supplementary Explanation for the Instruction Conversion Apparatus of the Second Embodiment First Specific Example of the Operation of the Instruction Conversion Apparatus The following describes the operation of the characteristic components of the present instruction conversion apparatus, with reference to specific instructions.

FIG. 27A shows assembler codes that are generated by the assembler code generating unit 111 when source codes are inputted into the compiler upstream part 110. The instruction scheduling unit 112 receives an input of the codes shown in FIG. 25. The meaning of each instruction shown in FIG. 27A is as follows.

Instruction 1: the constant 0×1000 ("0×" showing that the value is in hexadecimal) is transferred to the register R0.

Instruction 2: the content of register R0 is stored in the memory address indicated by the stack pointer SP.

Instruction 3: the content of register R1 is transferred to register R2.

Instruction 4: the content of register R3 is transferred to register R4.

Instruction 5: the content of register R2 is added to register R4.

The following explain the operation of the instruction scheduling unit 112 with reference to FIGS. 27B~27E. First, the dependency analyzing unit 120 is activated and the dependency graph shown in FIG. 27B is generated from the codes shown in FIG. 27A. Next, the instruction rearranging unit 121 is activated. When loop2 composed of steps S3~S8 ends, the processing moves to step S9 where the instruction rearranging unit 121 determines a group including one or more instructions as the arranged nodes. The unit for determining such groups is called a "cycle".

First Cycle

First, the arrangement candidate group is selected (step S2). At this point, the nodes with no predecessors are nodes 1, 3, and 4. Next, the most suitable node is selected (step S4). In this example, node 1 is selected. Next, it is judged whether node 1 can be arranged (step S5). In this example, arrangement of node 1 is judged possible (steps U1, U2), so that node 1 is provisionally arranged (step U9).

At this point, the parallel execution code is as shown on the top level of FIG. 27C. Next, the arrangement state is judged (step S6). Since the parallel execution code at this point is as shown on the top level of FIG. 27C, further arrangement is judged as being possible. Since no new arrangement candidates are generated (step S7), the processing returns to the start of loop2 (step S8). Since there are still nodes remaining in the arrangement candidate group, loop2 is repeated (step S3). Next, the most suitable node is selected (step S4). In this example, node 3 is selected. Next, it is judged whether node 3 can be arranged (step S5). In this example, arrangement of node 3 is judged possible (steps U1, U2), so that node 3 is provisionally arranged (step U9).

At this point, the parallel execution code is as shown on the second level of FIG. 27C. Next, the arrangement state is judged (step S6). Since the parallel execution code at this point is as shown on the second level of FIG. 27C, further arrangement is judged as being possible. Since no new arrangement candidates are generated (step S7), the processing returns to the start of loop2 (step S8). Since there are still nodes remaining in the arrangement candidate group, loop2 is repeated (step S3). Next, the most suitable node is selected (step S4). In this example, only node 4 is left, so this is selected. Next, it is judged whether node 4 can be arranged (step S5). In this example, the present parallel execution code is as shown on the second level of FIG. 27C, with two instructions having been provisionally arranged in a long-short pattern. As a result, the processing advances to step U5 via steps U1~U4. The present processed instruction is a short instruction, so that the judgement "Yes" is given in step U5 and the processing advances to step U6.

In step U6, dependencies between the provisionally arranged instruction (nodes 1 and 3) and the processed instruction (node 4) are investigated. As can be understood from the dependency graph, no dependency exists between these instructions, so that instructions 1, 3, and 4 may be executed in any order. As a result, the judgement "Yes" is given in step U7, and the instructions in the present parallel execution code are rearranged into the order 3, 4, 1 in step U8. The arranged state is then examined (step S6). At this point, the parallel execution code is as shown by the third level in FIG. 27C, and since the number of provisionally assigned instructions has reached three, the maximum number of instructions that can be executed in parallel by the processor of the first embodiment, assignment of further instructions is judged to be impossible. Accordingly, loop2 ends and the processing moves to step S9. In step S9, the instruction that have been provisionally arranged are confirmed as being arranged into the present parallel execution code. At this point, the processing of the first cycle is complete. Since unassigned nodes remain, however, loop 1 is repeated (steps S10, S1).

Second Cycle

First, the arrangement candidate group is selected (step S2). At this point, the nodes with no predecessors, nodes 2 and 5, are set as the selection candidates. The following processing is the same as in the first cycle and so will not be explained. This processing in the second cycle results in these two nodes being arranged as arranged instructions.

Next, the instruction rearranging unit 121 inserts a parallel execution boundary at the first instruction of each cycle. After these parallel execution boundaries have been inserted, the codes are as shown in FIG. 27D.

After this, the object code generating unit 113 is activated. In the present example, the codes shown in FIG. 27D are outputted as the object file.

Finally, the linking unit 114 is activated. Since address resolution is not required for the codes shown in FIG. 27D, the final executable codes are obtained via the same processing as a conventional linker. An image of the executable codes is shown in FIG. 27E. The actual executable codes are bit sequences that have been divided into 64-bit units.

FIG. 28A shows assembler codes that are generated by the assembler code generating unit 111 when source codes are inputted into the compiler upstream part 110. The instruction scheduling unit 112 receives an input of the codes shown in FIG. 28A. The meaning of each instruction shown in FIG. 28A is as follows.

Instruction 6: the content of the memory indicated by the label "mem1" is loaded into the register R0.

Instruction 7: the content of register R0 is stored in the memory address indicated by the stack pointer SP.

Instruction 8: the content of register R1 is transferred to register R2.

Instruction 9: the content of register R3 is transferred to register R4.

Instruction 10: the content of register R2 is added to register R4.

First, the dependency analyzing unit 120 is activated and the dependency graph shown in FIG. 28B is generated from the code shown in FIG. 28A. Next, the instruction rearranging unit 121 and the parallel execution boundary appending unit 122 are activated. The processing result for the instruction scheduling unit 112 is transferred to the object code generating unit 113 and the resulting code shown in FIG. 28C is outputted as the object file. This processing is the same as in the first embodiment, so only the result is given.

Next, the linking unit 114 is activated. The codes shown in FIG. 28C include an unresolved address, so that the address resolving unit 123 in the linking unit 114 is activated. First, in step V1, the address resolving unit 123 determines the address, so that the address "0×F000" is determined as "mem1". Since "0×F000" is a value that exceeds 21 bits, the judgement "Yes" is given in both step V2 and step V4, so that the processing advances to step V7. In step V7, the instruction "ld(mem1),R0" is divided in the instructions "mov mem1,R31" and "ld (R31),R0". In this example, register R31 is the register that is reserved for use when the instruction conversion apparatus divides instructions. Here, the reason the instruction "ld(mem1),R0" is divided is that the only instructions of the processor that can handle a 32-bit value are transfer instructions that transfer a value to a register, with there being no load instruction that can directly handle a 32-bit address. Next, in step V8, a parallel execution boundary is inserted between the instructions "mov mem1,R31" and "ld (R31),R0". This results in the final executable codes being as shown in FIG. 28D.

Comparison with a Conventional Fixed-Length VLIW Processor

The following compares, for the processing shown in FIG. 25, the operation of the present processor to the operation of a VLIW processor that uses fixed-length instructions as one example of the conventional art.

For a simple VLIW processor that issues a fixed number of instructions with a fixed instruction length in each cycle, the setting of instruction length at a suitable value for the transfer of a 32-bit constant to be indicated by one instruction will result in an extremely large increase in overall code size. As a result, instruction length is set at 32 bits, and the transfer of a 32-bit constant is performed by dividing it into two transfer instructions that each transfer 16 bits.

Figure 29A:
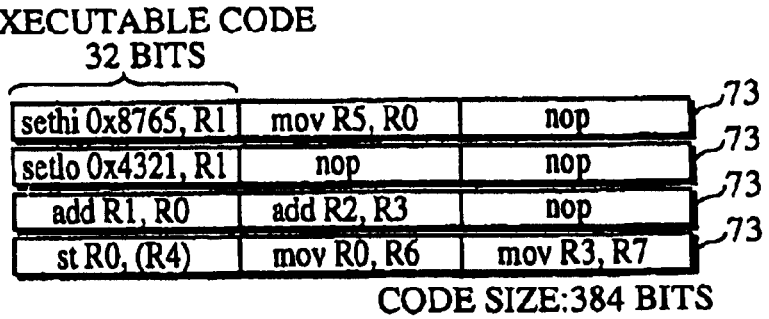

FIGS. 29A and 29B show an example of the executable codes in a program executed by a VLIW processor that executes instructions of a fixed length of 32 bits and an execution image.

The program is composed of four packets 73~76. As in FIG. 26A, the processing content of each field is shown using mnemonics. Here, however, the mnemonic "sethi" refers to the storing of a 16-bit constant in the upper 16 bits of a register and the mnemonic "setlo" refers to the storing of a 16-bit constant in the lower 16 bits of a register. The mnemonic "NOP" refers to an instruction with no operation content.

As can be seen from comparing the executable codes in FIG. 29A with the execution image in FIG. 29B, all instructions supplied in one cycle are issued in the same cycle under VLIW methods. In other words, three 32-bit instructions are issued in each cycle. When no instructions that can be executed in parallel exist, NOP instructions must be inserted in advance by software. Four NOP instructions are inserted in the present example, making a total of twelve 32-bit instructions and a total code size of 384 bits. This is much larger than the code size of the code used by the processor of the first embodiment.

Since the transfer of a 32-bit constant into a register is divided into two instructions, a new dependency is created, so that the number of execution units in increased to four. No matter how the instructions are rearranged, this number cannot be reduced. As a result, one more execution cycle is required than when the same processing is performed by the processor of the first embodiment.

Comparison With a Conventional Processor Where Parallel Execution Boundary Information is Present in Fixed-Length Instructions The following compares, for the processing shown in FIG. 25, the operation of the present processor to the operation of a processor with fixed-length instructions including information showing whether there is a parallel execution boundary as another example of the conventional art.

This conventional art will be explained with reference to a model that executes 32-bit instructions and a model that executes 40-bit instructions. Like the VLIW method shown in FIG. 29, the model that executes 32-bit instructions performs the transfer of a 32-bit constant using two instructions. However, the model that executes 40-bit instructions can perform operations including the transfer of a 32-bit value into a register using only one instruction.

Figure 30A:
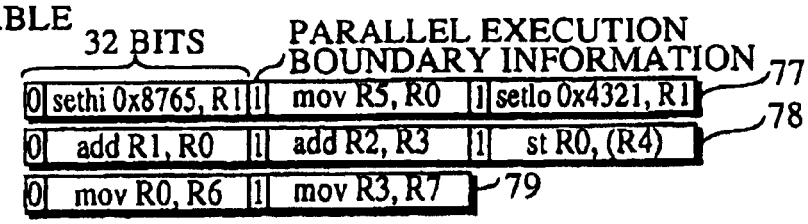
Figure 30A:
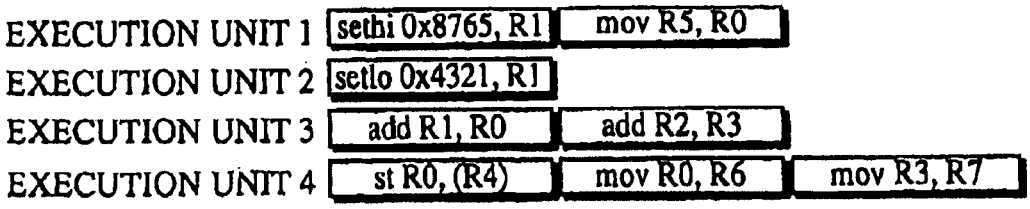

FIGS. 30A and 30B show an example of the executable codes and an execution image for a program executed by a processor that executes instructions which have a fixed length of 32 bits and include parallel execution boundary information.

The program is composed of eight instructions that are supplied as the three packets 77–79. The processing in each instruction is shown by the mnemonics that have been placed into each field of the executable codes. As in the VLIW method with 32-bit instructions that was shown in FIG. 29, the transfer of a 32-bit constant into a register is performed in 16-bit units by two instructions.

Figure 29A:
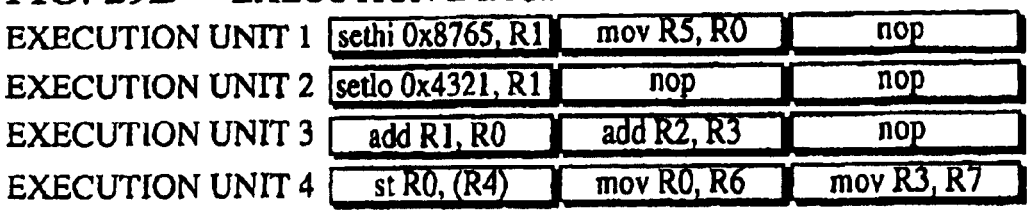

As can be seen from FIGS. 30A and 30B, the transfer of a 32-bit constant into a register is performed in 16-bit units by two instructions, which, as with the VLIW method of FIG. 29, generates a new dependency. This means that one more execution cycle is required than when the processor of the first embodiment is used.

Since no NOP instructions need to be inserted, the code size is equal to that of the VLIW method shown in FIG. 29 minus the code size attributable to the NOP instructions. This means that eight 32-bit instructions are used, making the total code size 256 bits. However, this is still larger that the code size of the code used by the processor of the first embodiment.

The following compares the processor of the first embodiment to a model that uses instructions of a fixed length of 40 bits.

Figure 31A:
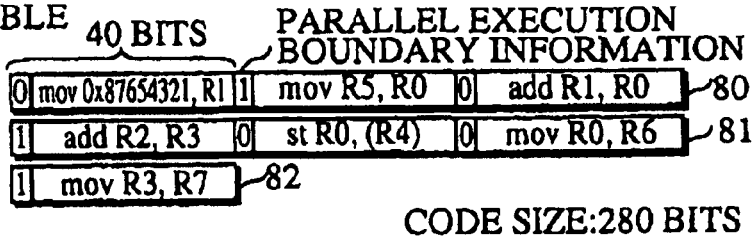
Figure 31A:
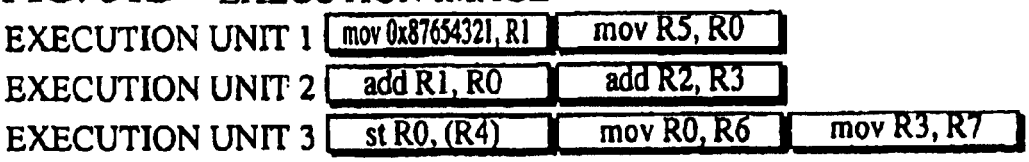

FIGS. 31A and 31B show an example of the executable codes and an execution image for a program executed by a processor that executes instructions which have a fixed length of 40 bits and include parallel execution boundary information.

The program is composed of seven instructions that are supplied as the three packets 80~82. The processing in each instruction is shown by the mnemonics that have been placed into each field of the executable codes. Here, the transfer of a 32-bit constant into a register can be performed by one instruction.

As can be seen from FIGS. 31A and 31B, the transfer of a 32-bit constant into a register is performed by one instruction. This means that a total of three execution cycles are required, which is the same as when the processor of the first embodiment is used.

While this conventional art uses the same number of instructions as the processor of the first embodiment, the conventional processor has an instruction length of 40 bits which is used for all instructions. The processor of the first embodiment has instructions that do not require a large number of bits defined as 21-bit instructions. The program for the conventional processor is composed of seven 40-bit instructions, giving a total code size of 280 bits. This is larger than the code used by the processor of the first embodiment.

The processor of the present embodiment has been above by way of embodiments, although the processor should not be construed as being limited to these embodiments. Several example modifications are given below.

(1) The above embodiments use a premise that scheduling is performed statically, although this is not a limitation for the present invention. In other words, the present invention can also be adopted by a processor that dynamically schedules instructions, such as a superscalar processor. When doing so, parallel execution boundary information is not provided in the instructions, and the decoder is provided with a parallel execution investigating apparatus for dynamically investigating whether instructions can be executed in parallel. The control in the above embodiments that was performed by the instruction issuing control unit referring to the parallel execution boundary information can be performed by referring to the output of the parallel execution investigating apparatus. Such a construction reduces the amount of hardware used by a processor executing variable length instructions, thereby maintaining the effect of the present invention.

(2) The above embodiments describe the case where a maximum of three instructions are executed simultaneously, although the present invention is not limited to this number. As one example, a construction where two instructions are simultaneously issued may be used. When doing so, suitable changes only need to be made to the construction of the decoding unit and periphery of the instruction register, and to the calculators in the executing unit.

(3) As can be seen from the instruction formats given in FIGS. 6A~6F, the above embodiments handle instructions that are composed of one or two units. However, this is not a restriction for the present invention, so that instruction formats where three or more units are linked to form one instruction may also be defined. As one example, when instructions are composed of up to four instruction units, two bits can be used as the format information of each instruction.

(4) As can be seen from the instruction formats given in FIGS. 6A~6F, the above embodiments handle instructions that are composed of one or two units. However, instructions composed of a single unit do not need to be used. As an alternative example, one instruction may be composed of two or three units. In such case, only the wiring between the instruction register, the instruction decoder, and the constant operand needs to be changed.

(5) As can be seen from the instruction formats given in FIGS. 6A~6F, the instructions described in the above embodiments include information showing whether there is a parallel execution boundary. This information may not be provided, however. In such case, instructions only include format information, and a NOP instruction is inserted whenever no instruction that cannot be executed in parallel is present. In such an arrangement, the major effect of the present invention, namely, the ability to indicate instructions using an instruction format of only the necessary length is still achieved.

(6) As can be seen from the instruction formats shown in FIGS. 6A~6F, the above embodiments describe a case where only part of a constant operand can be positioned in the second of the two units used to compose a 42-bit instruction, although an opcode may alternatively be positioned into this unit. As a result, the construction shown in FIG. 5 may be changed so that the unit that was directly outputted as part of the constant operand may be inputted into the instruction decoder, and the input bit width of the instruction decoder may be increased.

(7) In the above embodiments, the instruction buffer was described as having the construction shown in FIG. 8, although the present invention is not restricted to this construction or to this buffer size. As one example, one instruction buffer with a simple queue structure may be used.

(8) Software that achieves the functioning of the instruction conversion apparatus described in the second embodiment may be distributed having been stored on a recording medium such as a floppy disk, a hard disk, a CD-ROM, an MO (Magnetic-Optical) disc, or a DVD (Digital Versatile Disc).

The executable program generated by the instruction conversion apparatus of the above embodiments of the present invention may be distributed having been recorded onto a floppy disk, a hard disk, a CD-ROM, an MO disc, a DVD, or a semiconductor memory.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. An instruction conversion apparatus that converts an instruction sequence into parallel execution codes that are executable by a target processor, the target processor having predetermined limitations regarding combinations of instructions capable of being executed in parallel, the instruction conversion apparatus comprising:

assigning means for successively assigning instructions in the instruction sequence to parallel execution codes; and control means for controlling the assigning means so that a combination of a plurality of instructions that have already been assigned to a parallel execution code and an instruction that the assigning means is about to assign to the parallel execution code satisfy the predetermined limitations of the target processor;

wherein the target processor includes (1) a fetch means for successively fetching parallel execution codes that each include a plurality of unit fields from outside the target processor, (2) s+k−1 (where s,k are integers no smaller than 2) registers for storing s+k−1 unit fields included in at least two parallel execution codes that have been fetched by the fetch means, (3) decoding means, including s decoders that correspond to $1^{st}$ to $s^{th}$ registers in the s+k−1 registers, the decoders decoding at least one opcode stored in any of the $1^{st}$ to $s^{th}$ registers, and (4) operation executing means, connected to the s+k−1 registers for executing operations in accordance with a decoding result of the s decoders, the assigning means assigning, when instructions to be assigned to a parallel execution code include a long instruction whose word length is equal to at least two but no more than k unit fields, one of an opcode and an operand of the long instruction to a $u^{th}$ (where u is any integer such that 1<u<s) unit field between the $1^{st}$ unit field and the $s^{th}$ unit field, and only an operand of the long instruction to unit fields from a $(u+1)^{th}$ unit field to $(u+k-1)^{th}$ unit field.

2. The instruction conversion apparatus of claim 1, further comprising:

grouping means for forming an instruction group of a plurality of instructions that do not exhibit a dependency relation (hereafter "data dependency relation"), a data dependency relation being a relation between an instruction defining a resource and an instruction referring to the same resource; and first detecting means for detecting, when a $1^{st}$ to an $s^{th}$ unit field in a parallel execution code have been assigned at least one instruction by the assigning means and an instruction (hereafter "short instruction") with a shorter word length than a long instruction is left in the instruction group, a long instruction assigned to unit fields between the $1^{st}$ unit field and the $s^{th}$ unit field, wherein the control means includes a first control unit for controlling the assigning means to rearrange instructions that have already been assigned to the parallel execution code so that the detected long instruction is assigned to unit fields between the $s^{th}$ unit field and the $(s+k-1)^{th}$ unit field and the short instruction remaining in the instruction group is assigned to a unit field between the $1^{st}$ unit field and the $(s-1)^{th}$ unit field.

3. The instruction conversion apparatus of claim 2, wherein the instruction group includes instructions that exhibit an anti-dependence and instructions that exhibit an output dependence, an anti-dependence being a relation between an instruction that refers to a resource and an instruction that thereafter defines the resource, and an output dependence being a relation between an instruction that defines a resource and another instruction that defines the resource, the control means including a search unit for searching for a combination pattern, composed of a plurality of instructions in the instruction group, that is unaffected by an anti-dependence and an output dependence, and the first control unit controlling the assigning means to rearrange the plurality of instructions in accordance with the combination pattern found by the search unit, to assign the long instruction found by the detecting means to unit fields from the $s^{th}$ unit field to the $(s+k-1)^{th}$ unit field, and to assign a short instruction left in the instruction group to a unit field between the $1^{st}$ unit field and the $(s-1)^{th}$ unit field.

4. The instruction conversion apparatus of claim 3, further comprising:

flag setting means for setting a parallel execution boundary flag at each boundary that marks a position at which the predetermined limitations of the target processor dictate that parallel execution is not possible.

5. The instruction conversion apparatus of claim 4, further comprising:

address resolving means for assigning a real address to a parallel execution code; and second detecting means for detecting, when a real address has been assigned to a parallel execution code, an instruction including the real address that is not capable of being expressed by an original word length of the instruction, the flag setting means setting the boundary flag at a unit field located one of before and after unit fields to which the instruction detected by the second detecting means has been assigned.

6. The instruction conversion apparatus of claim 5, further comprising:

replacing means for replacing an instruction detected by the second detecting means with a transfer instruction that transfers an address to a register and an addressing instruction that performs the same processing as the replaced instruction using the register, the assigning means assigning the two instructions substituted by the replacing means to a plurality of unit fields, and the flag setting means setting a boundary flag at one of the plurality of unit fields to which the two substituted instructions have been assigned to show a parallel execution boundary.

7. A processor, comprising:

fetch means for successively fetching parallel execution codes that include a plurality of unit fields from outside the processor;

a register set for storing a combination of a plurality of instructions included in at least two parallel execution codes that have been fetched by the fetch means;

decoding means for decoding, when the combination of instructions stored in the register set satisfies predetermined restrictions, the instructions in the combination in parallel; and operation execution means for executing a plurality of operations in parallel in accordance with a decoding result of the decoding means;

s+k−1 (where s,k are integers no smaller than 2) registers for storing s+k−1 unit fields included in at least two parallel execution codes that have been fetched by the fetch means, the decoding means including a decoders that correspond to $1^{st}$ to $s^{th}$ registers in the s+k−1 registers and decode at least one opcode stored in any of the $1^{st}$ to $s^{th}$ registers, and the operation executing means being connected to the s+k−1 registers and executing operations in accordance with a decoding result of the s decoders.

8. The processor of claim 7, wherein a long instruction whose word length is equal to at least two but no more than k unit fields is stored in any of the s+k−1 registers with a first of the at least two but no more than k unit fields storing an opcode of the long instruction, the decoding means including:

a decoding control unit which, when an opcode of a long instruction in stored in a $u^{th}$ ($1<u<s$) unit field between the $1^{st}$ unit field the $s^{th}$ unit field, has the $u^{th}$ decoder decode the opcode stored in the $u^{th}$ register and a value stored between the $u^{th}$ register and the $(u+k-1)^{th}$ register outputted to the operation execution means as an operand of the long instruction.

9. The processor of claim 7, wherein the first unit field that stores the opcode of the long instruction has a format flat set at ON to show that the unit field forms part of a long instruction, the decoding control unit detecting a register that stores a unit field whose format flag is set at ON as the $u^{th}$ register, and the decoding control unit having the uth decoder decode an operand stored in the $u^{th}$ register and having a stored value between the $u^{th}$ register and the $(u+k-1)^{th}$ register outputted to the operation execution means as an operand of the long instruction.

10. The processor of claim 7, wherein the decoding control unit performs control to invalidate a decoding operation of every decoder from the $(u+1)^{th}$ decoder onwards when a value stored between the $(u+1)^{th}$ register and the $(u+k-1)^{th}$ register is outputted to the operation execution means as an operand of a long instruction.

11. A recording medium storing executable code for a processor, the processor including (1) a fetch means for successively fetching parallel execution codes that each include a plurality of unit fields from outside the target processor, (2) s+k−1 (where s,k are integers no smaller than 2) registers for storing s+k−1 unit fields included in at least two parallel execution codes that have been fetched by the fetch means, (3) decoding means, including a decoders that correspond to $1^{st}$ to $s^{th}$ registers in the s+k−1 registers, the decoders decoding at least one opcode stored in any of the $1^{st}$ to $s^{th}$ registers, and (4) operation executing means, connected to the s+k−1 registers for executing operations in accordance with a decoding result of the s decoders, the executable code stored on the recording medium being arranged such that at least one of an opcode and an operand of a long instruction having a word length of at least two but no more than k unit fields is arranged into a $u^{th}$ (where u is any integer such that $1 \leqq u \leqq s$) into to a $u^{th}$ (where u is any integer such that $1 \leqq u \leqq s$) unit field between the $1^{st}$ unit field and the $s^{th}$ unit field, and only an operand of the long instruction is arranged in unit fields from a $(u+1)^{th}$ unit field to a $(u+k-1)^{th}$ unit field.

12. A computer-readable recording medium storing an instruction conversion program that converts an instruction sequence into parallel execution codes that are executable by a target processor, the target processor having predetermined limitations regarding combinations of instructions that can be executed in parallel, the instruction conversion program comprising:

an assigning step for successively assigning instructions in the instruction sequence to parallel execution codes; and a control step for controlling the assigning step so that a combination of a plurality of instructions that have already been assigned to a parallel execution code and an instruction that the assigning step is about to assign to the parallel execution code satisfy the predetermined limitations of the target processor;

wherein the target processor includes (1) a fetch means for successively fetching parallel execution codes that each include a plurality of unit fields from outside the target processor, (2) s+k−1 (where s,k are integers no smaller than 2) registers for storing s+k−1 unit fields included in at least two parallel execution codes that have been fetched by the fetch means, (3) decoding means, including a decoders that correspond to $1^{st}$ to $s^{th}$ registers in the s+k−1 registers, the decoders decoding at least one opcode stored in any of the $1^{st}$ to $s^{th}$ registers, and (4) operation executing means, connected to the s+k−1 registers for executing operations in accordance with a decoding result of the s decoders, the assigning step assigning, when instructions to be assigned to a parallel execution code include a long instruction whose word length is equal to at least two but no more than k unit fields, at least one of an opcode and an operand of the long instruction to a $u^{th}$ (where u is any integer such that 1<u<s) unit field between the $1^{st}$ unit field the $s^{th}$ unit field, and only an operand of the long instruction to unit fields from a $(u+1)^{th}$ unit field to a $(u+k-1)^{th}$ unit field.

13. The computer-readable recording medium of claim 12, wherein the instruction conversion program further comprises:

a grouping step for forming an instruction group of a plurality of instructions that do not exhibit a dependency relation (hereafter "data dependency relation"), a data dependency relation being a relation between an instruction defining a resource and an instruction referring to the same resource; and a first detecting step for detecting, when a $1^{st}$ to an $s^{th}$ unit field in a parallel execution code have been assigned at least one instruction by the assigning step and an instruction (hereafter "short instruction") with a shorter word length than a long instruction is left in the instruction group, a long instruction assigned to unit fields between the $1^{st}$ unit field and the $s^{th}$ unit field, wherein the control step includes a first control substep for controlling the assigning step to rearrange instructions that have already been assigned to the parallel execution code so that the detected long instruction is assigned to unit fields between the $s^{th}$ unit field and the $(s+k-1)^{th}$ unit field and the short instruction remaining in the instruction group is assigned to a unit field between the $1^{st}$ unit field and the $(s-1)^{th}$ unit field.

14. The computer-readable recording medium of claim 13, wherein the instruction group includes instructions that exhibit an anti-dependence and instructions that exhibit an output dependence, an anti-dependence being a relation between an instruction that refers to a resource and an instruction that thereafter defines the resource, and an output dependence being a relation between an instruction that defines a resource and another instruction that defines the resource, the control step including a search substep for searching for a combination pattern, composed of a plurality of instructions in the instruction group, that is unaffected by an anti-dependence and an output dependence, and the first control substep controlling the assigning step to rearrange the plurality of instructions in accordance with the combination pattern found by the search substep, to assign the long instruction found by the detecting step to unit fields from the $s^{th}$ unit field to the $(s+k-1)$ unit field, and to assign a short instruction left in the instruction group to a unit field between the $1^{st}$ unit field and the $(s-1)^{th}$ unit field.

15. The computer-readable recording medium of claim 14, wherein the instruction conversion program further comprises:

a flag setting step for setting a parallel execution boundary flag at each boundary that marks a position at which the predetermined limitations of the target processor dictate that parallel execution is not possible.

16. The computer-readable recording medium of claim 15, wherein the instruction conversion program further comprises:

an address resolving step for assigning a real address to a parallel execution code; and a second detecting step for detecting, when a real address has been assigned to a parallel execution code, an instruction including the real address that cannot be expressed by an original word length of the instruction, the flag setting step setting the boundary flag at a unit field located one of before and after unit fields to which the instruction detected by the second detecting step has been assigned.

17. The computer-readable recording medium of claim 16, wherein the instruction conversion program further comprises:

a replacing step for replacing an instruction detected by the second detecting step with a transfer instruction that transfers an address to a register and an addressing instruction that performs the same processing as the replaced instruction using the register, the assigning step assigning the two instructions substituted by the replacing step to a plurality of unit fields, and the flag setting step setting a boundary flag at one of the plurality of unit fields to which the two substituted instructions have been assigned to show a parallel execution boundary.

18. An instruction conversion apparatus that converts an instruction sequence into parallel execution codes that are executable by a target processor, the target processor having predetermined limitations regarding combinations of instructions capable of being executed in parallel, the instruction conversion apparatus comprising:

an assigning unit for successively assigning instructions in the instruction sequence to parallel execution codes; and a control unit for controlling the assigning unit so that a combination of a plurality of instructions that have already been assigned to a parallel execution code and an instruction that the assigning unit is about to assign to the parallel execution code satisfy the predetermined limitations of the target processor;

wherein the target processor includes (1) a fetch unit for successively fetching parallel execution codes that each include a plurality of unit fields from outside the target processor, (2) s+k−1 (where s,k are integers no smaller than 2) registers for storing s+k−1 unit fields included in at least two parallel execution codes that have been fetched by the fetch unit, (3) a decoding unit, including a decoders that correspond to $1^{st}$ to $s^{th}$ registers in the s+k−1 registers, the decoders decoding at least one opcode stored in any of the $1^{st}$ to $s^{th}$ registers, and (4) an operation executing unit, connected to the s+k−1 registers for executing operations in accordance with a decoding result of the s decoders, the assigning unit assigning, when instructions to be assigned to a parallel execution code include a long instruction whose word length is equal to at least two but no more than k unit fields, one of an opcode and an operand of the long instruction to a $u^{th}$ (where u is any integer such that 1<u<s) unit field between the $1^{st}$ unit field and the $s^{th}$ unit field, and only an operand of the long instruction to unit fields from a $(u+1)^{th}$ unit field to a $(u+k-1)^{th}$ unit field.

19. The instruction conversion apparatus of claim 18, further comprising:

a grouping unit for forming an instruction group of a plurality of instructions that do not exhibit a dependency relation (hereafter "data dependency relation"), a data dependency relation being a relation between an instruction defining a resource and an instruction referring to the same resource; and a first detecting unit for detecting, when a $1^{st}$ to an $s^{th}$ unit field in a parallel execution code have been assigned at least one instruction by the assigning unit and an instruction (hereafter "short instruction") with a shorter word length than a long instruction is left in the instruction group, a long instruction assigned to unit fields between the $1^{st}$ unit field and the $s^{th}$ unit field, wherein the control unit includes a first control unit for controlling the assigning unit to rearrange instructions that have already been assigned to the parallel execution code so that the detected long instruction is assigned to unit fields between the $s^{th}$ unit field and the $(s+k-1)^{th}$ unit field and the short instruction remaining in the instruction group is assigned to a unit field between the $1^{st}$ unit field and the $(s-1)^{th}$ unit field.

20. The instruction conversion apparatus of claim 19, wherein the instruction group includes instructions that exhibit an anti-dependence and instructions that exhibit an output dependence, an anti-dependence being a relation between an instruction that refers to a resource and an instruction that thereafter defines the resource, and an output dependence being a relation between an instruction that defines a resource and another instruction that defines the resource, the control unit including a search unit for searching for a combination pattern, composed of a plurality of instructions in the instruction group, that is unaffected by an anti-dependence and an output dependence, and the first control unit controlling the assigning unit to rearrange the plurality of instructions in accordance with the combination pattern found by the search unit, to assign the long instruction found by the detecting unit to unit fields from the $s^{th}$ unit field to the $(s+k-1)^{th}$ unit field, and to assign a short instruction left in the instruction group to a unit field between the $1^{st}$ unit field and the $(s-1)^{th}$ unit field.

21. The instruction conversion apparatus of claim 20, further comprising:

a flag setting unit for setting a parallel execution boundary flag at each boundary that marks a position at which the predetermined limitations of the target processor dictate that parallel execution is not possible.

22. The instruction conversion apparatus of claim 21, further comprising:

an address resolving unit for assigning a real address to a parallel execution code; and a second detecting unit for detecting, when a real address has been assigned to a parallel execution code, an instruction including the real address that is not capable of being expressed by an original word length of the instruction, the flag setting unit setting the boundary flag at a unit field located one of before and after unit fields to which the instruction detected by the second detecting unit has been assigned.

23. The instruction conversion apparatus of claim 22, further comprising:

a replacing unit for replacing an instruction detected by the second detecting unit with a transfer instruction that transfers an address to a register and an addressing instruction that performs the same processing as the replaced instruction using the register, the assigning unit assigning the two instructions substituted by the replacing unit to a plurality of unit fields, and the flag setting unit setting a boundary flag at one of the plurality of unit fields to which the two substituted instructions have been assigned to show a parallel execution boundary.

24. A processor, comprising:

a fetch unit for successively fetching parallel execution codes that include a plurality of unit fields from outside the processor;

a register set for storing a combination of a plurality of instructions included in at least two parallel execution codes that have been fetched by the fetch unit;

a decoding unit for decoding, when the combination of instructions stored in the register set satisfies predetermined restrictions, the instructions in the combination in parallel; and an operation execution unit for executing a plurality of operations in parallel in accordance with a decoding result of the decoding unit;

s+k−1 (where s,k are integers no smaller than 2) registers for storing s+k−1 unit fields included in at least two parallel execution codes that have been fetched by the fetch unit, the decoding unit including a decoders that correspond to $1^{st}$ to $s^{th}$ registers in the s+k−1 registers and decode at least one opcode stored in any of the $1^{st}$ to $s^{th}$ registers, and the operation executing unit being connected to the s+k−1 registers and executing operations in accordance with a decoding result of the s decoders.

25. The processor of claim 24, wherein a long instruction whose word length is equal to at least two but no more than k unit fields is stored in any of the s+k−1 registers with a first of the at least two but no more than k unit fields storing an opcode of the long instruction, the decoding unit including:

a decoding control unit which, when an opcode of a long instruction in stored in a $u^{th}$ ($1<u<s$) unit field between the $1^{st}$ unit field the $s^{th}$ unit field, has the $u^{th}$ decoder decode the opcode stored in the $u^{th}$ register and a value stored between the $u^{th}$ register and the $(u+k-1)^{th}$ register outputted to the operation execution unit as an operand of the long instruction.

26. The processor of claim 24 wherein the decoding control unit performs control to invalidate a decoding operation of every decoder from the $(u+1)^{th}$ decoder onwards when a value stored between the $(u+1)^{th}$ register and the $(u+k-1)^{th}$ register is outputted to the operation execution unit as an operand of a long instruction.

27. A recording medium storing executable code for a processor, the processor including (1) a fetch unit for successively fetching parallel execution codes that each include a plurality of unit fields from outside the target processor, (2) s+k−1 (where s,k are integers no smaller than 2) registers for storing s+k−1 unit fields included in at least two parallel execution codes that have been fetched by the fetch unit, (3) a decoding unit, including a decoders that correspond to $1^{st}$ to $s^{th}$ registers in the s+k−1 registers, the decoders decoding at least one opcode stored in any of the $1^{st}$ to $s^{th}$ registers, and (4) an operation executing unit, connected to the s+k−1 registers for executing operations in accordance with a decoding result of the s decoders, the executable code stored on the recording medium being arranged such that at least one of an opcode and an operand of a long instruction having a word length of at least two but no more than k unit fields is arranged into to a $u^{th}$ (where u is any integer such that 1<u<s) unit field between the $1^{st}$ unit field and the $s^{th}$ unit field and the $s^{th}$ unit field, and only an operand of the long instruction is arranged in unit fields from a $(u+1)^{th}$ unit field to a $(u+k-1)^{th}$ unit field.

28. A computer-readable recording medium storing an instruction conversion program that converts an instruction sequence into parallel execution codes that are executable by a target processor, the target processor having predetermined limitations regarding combinations of instructions that can be executed in parallel, the instruction conversion program comprising:

an assigning step for successively assigning instructions in the instruction sequence to parallel execution codes; and a control step for controlling the assigning step so that a combination of a plurality of instructions that have already been assigned to a parallel execution code and an instruction that the assigning step is about to assign to the parallel execution code satisfy the predetermined limitations of the target processor;

wherein the target processor includes (1) a fetch unit for successively fetching parallel execution codes that each include a plurality of unit fields from outside the target processor, (2) s+k−1 (where s,k are integers no smaller than 2) registers for storing s+k−1 unit fields included in at least two parallel execution codes that have been fetched by the fetch unit, (3) a decoding unit, including s decoders that correspond to $1^{st}$ to $s^{th}$ registers in the s+k−1 registers, the decoders decoding at least one opcode stored in any of the $1^{st}$ to $s^{th}$ registers, and (4) an operation executing unit, connected to the s+k−1 registers for executing operations in accordance with a decoding result of the s decoders, the assigning step assigning, when instructions to be assigned to a parallel execution code include a long instruction whose word length is equal to at least two but no more than k unit fields, at least one of an opcode and an operand of the long instruction to a $u^{th}$ (where u is any integer such that 1<u<s) unit field between the $1^{st}$ unit field the $s^{th}$ unit field, and only an operand of the long instruction to unit fields from a $(u+1)^{th}$ unit field to a $(u+k-1)^{th}$ unit field.

29. The computer-readable recording medium of claim 28, wherein the instruction conversion program further comprises:

a grouping step for forming an instruction group of a plurality of instructions that do not exhibit a dependency relation (hereafter "data dependency relation"), a data dependency relation being a relation between an instruction defining a resource and an instruction referring to the same resource; and a first detecting step for detecting, when a $1^{st}$ and an $s^{th}$ unit field in a parallel execution code have been assigned at least one instruction by the assigning step and an instruction (hereafter "short instruction") with a shorter word length than a long instruction is left in the instruction group, a long instruction assigned to unit fields between the $1^{st}$ unit field and the $s^{th}$ unit field, wherein the control step includes a first control substep for controlling the assigning step to rearrange instructions that have already been assigned to the parallel execution code so that the detected long instruction is assigned to unit fields between the $s^{th}$ unit field and the $(s+k-1)^{th}$ unit field and the short instruction remaining in the instruction group is assigned to a unit field between the $1^{st}$ unit field and the $(s-1)^{th}$ unit field.

30. The computer-readable recording medium of claim 29, wherein the instruction group includes instructions that exhibit an anti-dependence and instructions that exhibit an output dependence, an anti-dependence being a relation between an instruction that refers to a resource and an instruction that thereafter defines the resource, and an output dependence being a relation between an instruction that defines a resource and another instruction that defines the resource, the control step including a search substep for searching for a combination pattern, composed of a plurality of instructions in the instruction group, that is unaffected by an anti-dependence and an output dependence, and the first control substep controlling the assigning step to rearrange the plurality of instructions in accordance with the combination pattern found by the search substep, to assign the long instruction found by the detecting step to unit fields from the $s^{th}$ unit field to the $(s+k-1)^{th}$ unit field, and to assign a short instruction left in the instruction group to a unit field between the $1^{st}$ unit field and the $(s-1)^{th}$ unit field.

31. The computer-readable recording medium of claim 30, wherein the instruction conversion program further comprises:

a flag setting step or setting a parallel execution boundary flag at each boundary that marks a position at which the predetermined limitations of the target processor dictate that parallel execution is not possible.

32. The computer-readable recording medium of claim 31, wherein the instruction conversion program further comprises:

an address resolving step for assigning a real address to a parallel execution code; and a second detecting step for detecting, when a real address has been assigned to a parallel execution code, an instruction including the real address that cannot be expressed by an original word length of the instruction, the flag setting step setting the boundary flat at a unit field located one of before and after unit fields to which the instruction detected by the second detecting step has been assigned.

33. The computer-readable recording medium of claim 32, wherein the instruction conversion program further comprises:

a replacing step for replacing an instruction detected by the second detecting step with a transfer instruction that transfers an address to a register and an addressing instruction that performs the same processing as the replaced instruction using the register, the assigning step assigning the two instructions substituted by the replacing step to a plurality of unit fields, and the flag setting step setting a boundary flag at one of the plurality of unit fields to which the two substituted instructions have been assigned to show a parallel execution boundary.

*34. A processor comprising:*

*an execution unit which executes up to N number of instructions having a variable bit length in parallel, N being an integer which is at least two, wherein the maximum bit length of an instruction that is executed in parallel is M bits, M being an integer;*

*an instruction supplying/issuing unit which fetches an instruction sequence in a unit of a first bit length of code and outputs the instruction sequence in a unit of a second bit length of code;*

*a decoding unit which decodes the instruction sequence in a unit of a variable bit length of code which is at least a part of the second bit length of code outputted by the instruction supplying/issuing unit, and outputting a decoding result to the execution unit; and*

*an instruction bus formed between the instruction supplying/issuing unit and the decoding unit, wherein the total bit width of the instruction bus is shorter than M*N bits,*

*wherein the decoding unit decodes a plurality of instructions executed in parallel, and all of the instructions decoded in parallel at the same cycle pass through the instruction bus.*

*35. The processor of claim 34,*

*wherein the instruction sequence is converted by a certain instruction conversion apparatus.*

*36. The processor of claim 35,*

*wherein the instruction sequence is written in a high-level language before being converted by the instruction conversion apparatus.*

*37. The processor of claim 34,*

*wherein the first bit length is shorter than the second bit length.*

*38. The processor of claim 34,*

*wherein at least a part of the instructions have a special bit which instructs the processor to execute a plurality of instructions in parallel.*

*39. The processor of claim 34,*

*wherein the decoding unit comprises:*

*an instruction issuing control unit which identifies instruction boundaries executed in parallel.*

*40. The processor of claim 34,*

*wherein the instruction supplying/issuing unit comprises:*

*a fetch unit for successively fetching the instruction sequence; and*

*a plurality of instruction buffers for temporally storing instructions.*

*41. A processor comprising:*

*an instruction fetching unit that fetches instructions, each instruction having a variable bit length, wherein the maximum bit length of an instruction that is executed in parallel is M bits, M being an integer;*

*a decoding unit that decodes a plurality of instructions executed in parallel;*

*an execution unit that executes up to N number of decoded instructions from the decoding unit in parallel, N being an integer which is at least two; and*

*an instruction bus formed between the instruction fetching unit and the decoding unit, wherein the total bit width of the instruction bus is shorter than M*N bits,*

*wherein the total bit length of the decoded instructions that are executed in parallel is variable which is not related to the bit length of the fetched instructions, and all of the instructions decoded in parallel at the same cycle pass through the instruction bus.*

*42. The processor of claim 41,*

*wherein the instruction are converted by a certain instruction conversion apparatus.*

*43. The processor of claim 42,*

*wherein the instructions are written in a high-level language before being converted by the instruction conversion apparatus.*

*44. The processor of claim 41,*

*wherein the instruction fetching unit fetches an instruction sequence in a unit of a first bit length of code and outputs the instruction sequence in a unit of a second bit length of code, the first bit length being shorter than the second bit length.*

*45. The processor of claim 41,*

*wherein at least a part of the instructions have a special bit which instructs the target processor to execute a plurality of instructions in parallel.*

*46. The processor of claim 41,*

*wherein the decoding unit comprises:*

*an instruction issuing control unit which identifies instruction boundaries executed in parallel.*

*47. The processor of claim 41, further comprising:*

*a plurality of operation execution units capable of executing a plurality of instructions in parallel in accordance with a decoding result of the decoding unit.*

*48. The processor of claim 41,*

*wherein the instruction fetching unit comprises:*

*a fetch unit for successively fetching the instruction sequence; and*

*a plurality of instruction buffers for temporally storing instructions.*

*49. The processor of claim 34,*

*wherein the decoding result directly controls the execution unit.*

*50. The processor of claim 41,*

*wherein the decoding result directly controls the execution unit.*

* * * * *